(12) United States Patent
Klosterman et al.

(10) Patent No.: US 8,776,125 B2
(45) Date of Patent: Jul. 8, 2014

(54) METHOD AND SYSTEM FOR DISPLAYING ADVERTISEMENTS IN AN ELECTRONIC PROGRAM GUIDE

(75) Inventors: Brian Lee Klosterman, San Ramon, CA (US); Steven Schein, Menlo Park, CA (US)

(73) Assignee: Starsight Telecast Inc., Santa Clara, CA (US)

( * ) Notice: Subject to any disclaimer, the term of this patent is extended or adjusted under 35 U.S.C. 154(b) by 96 days.

(21) Appl. No.: 11/894,620

(22) Filed: Aug. 20, 2007

(65) Prior Publication Data

US 2008/0127264 A1 May 29, 2008

Related U.S. Application Data

(63) Continuation of application No. 10/401,299, filed on Mar. 27, 2003, now Pat. No. 7,480,929, which is a continuation of application No. 09/352,669, filed on Jul. 9, 1999, now abandoned, which is a continuation of application No. 08/846,801, filed on Apr. 30, 1997, now Pat. No. 5,940,073.

(60) Provisional application No. 60/016,871, filed on May 3, 1996, provisional application No. 60/032,038, filed on Nov. 26, 1996.

(51) Int. Cl.
*G06F 3/00* (2006.01)

(52) U.S. Cl.
USPC .................................. 725/42; 725/43; 725/51

(58) Field of Classification Search
USPC .................... 725/40–45, 47, 51, 52
See application file for complete search history.

(56) References Cited

U.S. PATENT DOCUMENTS

| | | |
|---|---|---|
| 2,200,935 A | 5/1940 | Rodriguez |
| 3,153,543 A | 10/1964 | Magyar |
| 3,235,282 A | 2/1966 | Bostick |
| 3,440,427 A | 4/1969 | Kammer |
| 3,492,577 A | 1/1970 | Reiter et al. |
| 3,493,674 A | 2/1970 | Houghton |
| 3,729,581 A | 4/1973 | Anderson |
| 3,833,757 A | 9/1974 | Kirk, Jr. et al. |
| 3,891,792 A | 6/1975 | Kimura |
| 3,936,868 A | 2/1976 | Thorpe |
| 3,990,713 A | 11/1976 | Hokanson |
| 3,996,583 A | 12/1976 | Hutt et al. |
| 4,004,085 A | 1/1977 | Makino et al. |

(Continued)

FOREIGN PATENT DOCUMENTS

| | | |
|---|---|---|
| AU | 56198/98 | 7/1998 |
| AU | 731010 | 7/1998 |

(Continued)

OTHER PUBLICATIONS

U.S. Appl. No. 09/034,934, filed Mar. 4, 1998, Ellis et al.

(Continued)

*Primary Examiner* — Chris Parry
(74) *Attorney, Agent, or Firm* — Ropes & Gray LLP

(57) ABSTRACT

A system and method for displaying an electronic program schedule guide is provided. The system has areas for displaying program schedule information. In addition, the system also has areas that may be used for advertising programs, products or services. In another embodiment, the system has areas for displaying messages to the user.

28 Claims, 27 Drawing Sheets

(56) References Cited

U.S. PATENT DOCUMENTS

| | | |
|---|---|---|
| 4,016,361 A | 4/1977 | Pandey |
| 4,024,401 A | 5/1977 | Bernstein et al. |
| 4,026,555 A | 5/1977 | Kirschner et al. |
| 4,031,548 A | 6/1977 | Kato et al. |
| 4,052,719 A | 10/1977 | Hutt et al. |
| 4,058,830 A | 11/1977 | Guinet et al. |
| 4,070,693 A | 1/1978 | Shutterly |
| 4,079,419 A | 3/1978 | Siegle et al. |
| 4,081,753 A | 3/1978 | Miller |
| 4,081,754 A | 3/1978 | Jackson |
| 4,096,524 A | 6/1978 | Scott |
| 4,134,127 A | 1/1979 | Campioni |
| 4,139,860 A | 2/1979 | Micic et al. |
| 4,150,254 A | 4/1979 | Schussler et al. |
| 4,154,850 A | 5/1979 | Morgan et al. |
| 4,156,850 A | 5/1979 | Beyers, Jr. |
| 4,161,728 A | 7/1979 | Insam |
| 4,162,513 A | 7/1979 | Beyers, Jr. et al. |
| 4,170,782 A | 10/1979 | Miller |
| 4,186,413 A | 1/1980 | Mortimer |
| 4,189,781 A | 2/1980 | Douglas |
| 4,203,130 A | 5/1980 | Doumit et al. |
| 4,205,343 A | 5/1980 | Barrett |
| 4,218,698 A | 8/1980 | Bart et al. |
| 4,228,543 A | 10/1980 | Jackson |
| 4,231,031 A | 10/1980 | Crowther et al. |
| 4,233,628 A | 11/1980 | Ciciora |
| 4,234,204 A | 11/1980 | Tibbals |
| 4,249,211 A | 2/1981 | Baba et al. |
| 4,249,213 A | 2/1981 | Imaide et al. |
| 4,261,006 A | 4/1981 | Weintraub et al. |
| 4,264,924 A | 4/1981 | Freeman |
| 4,264,925 A | 4/1981 | Freeman et al. |
| 4,270,145 A | 5/1981 | Farina |
| 4,271,532 A | 6/1981 | Wine |
| 4,276,597 A | 6/1981 | Dissly et al. |
| 4,280,148 A | 7/1981 | Saxena |
| 4,283,787 A | 8/1981 | Chambers |
| 4,288,809 A | 9/1981 | Yabe |
| 4,290,142 A | 9/1981 | Schnee et al. |
| 4,300,040 A | 11/1981 | Gould et al. |
| 4,305,101 A | 12/1981 | Yarbrough et al. |
| 4,313,124 A | 1/1982 | Hara |
| 4,329,684 A | 5/1982 | Monteath et al. |
| 4,331,974 A | 5/1982 | Cogswell et al. |
| 4,337,480 A | 6/1982 | Bourassin et al. |
| 4,337,483 A | 6/1982 | Guillou |
| 4,344,090 A | 8/1982 | Belisomi et al. |
| 4,345,262 A | 8/1982 | Shirato et al. |
| 4,367,559 A | 1/1983 | Tults |
| 4,375,651 A | 3/1983 | Templin et al. |
| 4,381,522 A | 4/1983 | Lambert |
| 4,388,645 A | 6/1983 | Cox et al. |
| 4,390,901 A | 6/1983 | Keiser |
| 4,393,376 A | 7/1983 | Thomas |
| 4,403,285 A | 9/1983 | Kikuchi |
| 4,405,946 A | 9/1983 | Knight |
| 4,412,244 A | 10/1983 | Shanley, II |
| 4,413,281 A | 11/1983 | Thonnart |
| 4,420,769 A | 12/1983 | Novak |
| 4,425,579 A | 1/1984 | Merrell |
| 4,425,581 A | 1/1984 | Schweppe et al. |
| 4,429,385 A | 1/1984 | Cichelli et al. |
| 4,439,784 A | 3/1984 | Furukawa et al. |
| 4,449,249 A | 5/1984 | Price |
| 4,456,925 A | 6/1984 | Skerlos et al. |
| 4,458,333 A | 7/1984 | Smith |
| 4,458,907 A | 7/1984 | Meredith |
| 4,459,600 A | 7/1984 | Sato et al. |
| 4,463,359 A | 7/1984 | Ayata et al. |
| 4,466,017 A | 8/1984 | Banker |
| 4,477,830 A | 10/1984 | Lindman et al. |
| 4,488,179 A | 12/1984 | Kruger et al. |
| 4,495,654 A | 1/1985 | Deiss |
| 4,496,171 A | 1/1985 | Cherry |
| 4,496,804 A | 1/1985 | Hung |
| 4,496,976 A | 1/1985 | Swanson et al. |
| 4,510,623 A | 4/1985 | Bonneau et al. |
| 4,520,404 A | 5/1985 | Von Kohorn |
| 4,523,228 A | 6/1985 | Banker |
| 4,527,194 A | 7/1985 | Sirazi |
| 4,531,020 A | 7/1985 | Wechselberger et al. |
| 4,533,910 A | 8/1985 | Sukonick et al. |
| 4,536,791 A | 8/1985 | Campbell et al. |
| 4,547,804 A | 10/1985 | Greenberg |
| 4,554,584 A | 11/1985 | Elam et al. |
| 4,555,755 A | 11/1985 | Kurosawa et al. |
| 4,555,775 A | 11/1985 | Pike |
| 4,566,034 A | 1/1986 | Harger et al. |
| 4,573,072 A | 2/1986 | Freeman |
| 4,587,520 A | 5/1986 | Astle |
| 4,595,951 A | 6/1986 | Filliman |
| 4,595,952 A | 6/1986 | Filliman |
| 4,598,288 A | 7/1986 | Yarbrough et al. |
| 4,602,279 A | 7/1986 | Freeman |
| 4,605,964 A | 8/1986 | Chard |
| 4,605,973 A | 8/1986 | Von Kohorn |
| 4,608,577 A | 8/1986 | Hori |
| 4,608,859 A | 9/1986 | Rockley |
| 4,611,269 A | 9/1986 | Suzuki et al. |
| 4,620,229 A | 10/1986 | Amano et al. |
| 4,622,545 A | 11/1986 | Atkinson |
| 4,625,080 A | 11/1986 | Scott |
| 4,635,109 A | 1/1987 | Comeau |
| 4,635,121 A | 1/1987 | Hoffman |
| 4,641,205 A | 2/1987 | Beyers, Jr. |
| 4,645,873 A | 2/1987 | Chomet |
| 4,677,466 A | 6/1987 | Lert, Jr. et al. |
| 4,685,131 A | 8/1987 | Horne |
| 4,689,022 A | 8/1987 | Peers et al. |
| 4,691,351 A | 9/1987 | Hayashi et al. |
| 4,694,490 A | 9/1987 | Harvey et al. |
| 4,701,794 A | 10/1987 | Froling et al. |
| 4,704,725 A | 11/1987 | Harvey et al. |
| 4,706,121 A | 11/1987 | Young |
| 4,712,105 A | 12/1987 | Kohler |
| 4,714,919 A | 12/1987 | Foster |
| 4,718,107 A | 1/1988 | Hayes |
| 4,723,129 A | 2/1988 | Endo et al. |
| RE32,632 E | 3/1988 | Atkinson |
| 4,729,027 A | 3/1988 | Hakamada et al. |
| 4,734,769 A | 3/1988 | Davis |
| 4,740,796 A | 4/1988 | Endo et al. |
| 4,745,549 A | 5/1988 | Hashimoto |
| 4,746,983 A | 5/1988 | Hakamada |
| 4,748,618 A | 5/1988 | Brown et al. |
| 4,750,036 A | 6/1988 | Martinez |
| 4,750,213 A | 6/1988 | Novak |
| 4,751,578 A | 6/1988 | Reiter et al. |
| 4,754,326 A | 6/1988 | Kram et al. |
| 4,761,684 A | 8/1988 | Clark et al. |
| 4,768,228 A | 8/1988 | Clupper et al. |
| 4,772,882 A | 9/1988 | Mical |
| 4,775,935 A | 10/1988 | Yourick |
| 4,785,408 A | 11/1988 | Britton et al. |
| 4,787,063 A | 11/1988 | Muguet |
| 4,799,702 A | 1/1989 | Wang |
| 4,812,834 A | 3/1989 | Wells |
| 4,814,883 A | 3/1989 | Perine et al. |
| 4,821,102 A | 4/1989 | Ichikawa et al. |
| 4,821,211 A | 4/1989 | Torres |
| 4,829,558 A | 5/1989 | Welsh |
| 4,847,604 A | 7/1989 | Doyle |
| 4,847,700 A | 7/1989 | Freeman |
| 4,847,744 A | 7/1989 | Araki |
| 4,855,813 A | 8/1989 | Russell et al. |
| 4,857,999 A | 8/1989 | Welsh |
| 4,862,268 A | 8/1989 | Campbell et al. |
| 4,864,429 A | 9/1989 | Eigeldinger et al. |
| 4,873,584 A | 10/1989 | Hashimoto |
| 4,873,623 A | 10/1989 | Lane et al. |
| 4,882,732 A | 11/1989 | Kaminaga et al. |
| 4,884,223 A | 11/1989 | Ingle et al. |
| 4,888,796 A | 12/1989 | Olivo, Jr. |

(56) References Cited

U.S. PATENT DOCUMENTS

| | | |
|---|---|---|
| 4,890,168 A | 12/1989 | Inoue et al. |
| 4,890,320 A | 12/1989 | Monslow et al. |
| 4,890,321 A | 12/1989 | Seth/Smith et al. |
| 4,894,789 A | 1/1990 | Yee |
| 4,899,136 A | 2/1990 | Beard et al. |
| 4,899,139 A | 2/1990 | Ishimochi et al. |
| 4,905,094 A | 2/1990 | Pocock et al. |
| 4,908,707 A | 3/1990 | Kinghorn |
| 4,908,713 A | 3/1990 | Levine |
| 4,908,859 A | 3/1990 | Bennett et al. |
| 4,914,517 A | 4/1990 | Duffield |
| 4,914,732 A | 4/1990 | Henderson et al. |
| 4,918,531 A | 4/1990 | Johnson |
| 4,930,158 A | 5/1990 | Vogel |
| 4,930,160 A | 5/1990 | Vogel |
| 4,931,783 A | 6/1990 | Atkinson |
| 4,935,865 A | 6/1990 | Rowe et al. |
| 4,937,821 A | 6/1990 | Boulton |
| 4,937,863 A | 6/1990 | Robert et al. |
| 4,939,507 A | 7/1990 | Beard et al. |
| 4,942,391 A | 7/1990 | Kikuta |
| 4,954,882 A | 9/1990 | Kamemoto |
| 4,959,719 A | 9/1990 | Strubbe et al. |
| 4,959,720 A | 9/1990 | Duffield et al. |
| 4,963,994 A | 10/1990 | Levine |
| 4,965,825 A | 10/1990 | Harvey et al. |
| 4,977,455 A | 12/1990 | Young |
| 4,987,486 A | 1/1991 | Johnson et al. |
| 4,991,011 A | 2/1991 | Johnson et al. |
| 4,991,012 A | 2/1991 | Yoshino |
| 4,991,066 A | 2/1991 | McCowan |
| 4,992,782 A | 2/1991 | Sakamoto et al. |
| 4,992,940 A | 2/1991 | Dworkin |
| 4,995,078 A | 2/1991 | Monslow et al. |
| 4,996,642 A | 2/1991 | Hey |
| 4,998,171 A | 3/1991 | Kim et al. |
| 5,003,384 A | 3/1991 | Durden et al. |
| 5,005,084 A | 4/1991 | Skinner |
| 5,008,853 A | 4/1991 | Bly et al. |
| 5,014,125 A | 5/1991 | Pocock et al. |
| 5,016,273 A | 5/1991 | Hoff |
| 5,023,721 A | 6/1991 | Moon-Hwan |
| 5,027,400 A | 6/1991 | Baji et al. |
| 5,031,045 A | 7/1991 | Kawasaki |
| 5,036,314 A | 7/1991 | Barillari et al. |
| 5,038,211 A | 8/1991 | Hallenbeck |
| 5,040,067 A | 8/1991 | Yamazaki |
| 5,045,947 A | 9/1991 | Beery |
| 5,047,867 A | 9/1991 | Strubbe et al. |
| 5,058,160 A | 10/1991 | Banker et al. |
| 5,062,060 A | 10/1991 | Kolnick |
| 5,068,734 A | 11/1991 | Beery |
| 5,072,412 A | 12/1991 | Henderson, Jr. et al. |
| 5,075,771 A | 12/1991 | Hashimoto et al. |
| 5,083,205 A | 1/1992 | Arai |
| 5,083,800 A | 1/1992 | Lockton |
| 5,089,885 A | 2/1992 | Clark |
| 5,090,049 A | 2/1992 | Chen |
| 5,091,785 A | 2/1992 | Canfield et al. |
| 5,093,921 A | 3/1992 | Bevins, Jr. |
| 5,099,319 A | 3/1992 | Esch et al. |
| 5,103,314 A | 4/1992 | Keenan |
| 5,105,184 A | 4/1992 | Pirani et al. |
| 5,109,279 A | 4/1992 | Ando |
| 5,113,259 A | 5/1992 | Romesburg et al. |
| 5,119,188 A | 6/1992 | McCalley et al. |
| 5,121,476 A | 6/1992 | Yee |
| 5,123,046 A | 6/1992 | Levine |
| 5,126,851 A | 6/1992 | Yoshimura |
| 5,128,766 A | 7/1992 | Choi |
| 5,132,992 A | 7/1992 | Yurt et al. |
| 5,146,335 A | 9/1992 | Kim et al. |
| 5,148,154 A | 9/1992 | Mackay et al. |
| 5,148,275 A | 9/1992 | Blatter et al. |
| 5,151,782 A | 9/1992 | Ferraro |
| 5,151,789 A | 9/1992 | Young |
| 5,152,012 A | 9/1992 | Schwob |
| 5,155,591 A | 10/1992 | Wachob |
| 5,155,806 A | 10/1992 | Hoeber et al. |
| 5,157,768 A | 10/1992 | Hoeber et al. |
| 5,161,019 A | 11/1992 | Emanuel |
| 5,161,023 A | 11/1992 | Keenan |
| 5,162,905 A | 11/1992 | Itoh et al. |
| 5,170,388 A | 12/1992 | Endoh et al. |
| 5,172,111 A | 12/1992 | Olivo, Jr. |
| 5,172,413 A | 12/1992 | Bradley et al. |
| 5,177,604 A | 1/1993 | Martinez |
| 5,179,439 A | 1/1993 | Hashimoto et al. |
| 5,179,654 A | 1/1993 | Richards et al. |
| 5,182,646 A | 1/1993 | Keenan |
| 5,187,589 A | 2/1993 | Kono et al. |
| 5,189,630 A | 2/1993 | Barstow et al. |
| 5,191,423 A | 3/1993 | Yoshida et al. |
| 5,194,941 A | 3/1993 | Grimaldi et al. |
| 5,195,092 A | 3/1993 | Wilson et al. |
| 5,195,134 A | 3/1993 | Inoue |
| 5,200,823 A | 4/1993 | Yoneda et al. |
| 5,204,897 A | 4/1993 | Wyman |
| 5,206,722 A | 4/1993 | Kwan |
| 5,210,611 A | 5/1993 | Yee et al. |
| 5,212,553 A | 5/1993 | Maruoka |
| 5,214,622 A | 5/1993 | Nemoto et al. |
| 5,216,515 A | 6/1993 | Steele et al. |
| 5,220,420 A | 6/1993 | Hoarty et al. |
| 5,223,924 A | 6/1993 | Strubbe |
| 5,227,874 A | 7/1993 | Von Kohorn |
| 5,231,493 A | 7/1993 | Apitz |
| 5,231,494 A | 7/1993 | Wachob |
| RE34,340 E | 8/1993 | Freeman |
| 5,233,423 A | 8/1993 | Jernigan et al. |
| 5,233,654 A | 8/1993 | Harvey et al. |
| 5,235,415 A | 8/1993 | Bonicel et al. |
| 5,236,199 A | 8/1993 | Thompson, Jr. |
| 5,237,411 A | 8/1993 | Fink et al. |
| 5,237,417 A | 8/1993 | Hayashi et al. |
| 5,237,418 A | 8/1993 | Kaneko |
| 5,239,540 A | 8/1993 | Rovira et al. |
| 5,245,420 A | 9/1993 | Harney et al. |
| 5,247,347 A | 9/1993 | Litteral et al. |
| 5,247,364 A | 9/1993 | Banker et al. |
| 5,247,580 A | 9/1993 | Kimura et al. |
| 5,251,034 A | 10/1993 | Na |
| 5,253,066 A | 10/1993 | Vogel |
| 5,253,067 A | 10/1993 | Chaney et al. |
| 5,260,778 A | 11/1993 | Kauffman et al. |
| 5,260,788 A | 11/1993 | Takano et al. |
| 5,260,999 A | 11/1993 | Wyman |
| 5,262,860 A | 11/1993 | Fitzpatrick et al. |
| 5,283,561 A | 2/1994 | Lumelsky et al. |
| 5,283,639 A | 2/1994 | Esch et al. |
| 5,283,819 A | 2/1994 | Glick et al. |
| 5,285,265 A | 2/1994 | Choi |
| 5,285,278 A | 2/1994 | Holman |
| 5,293,357 A | 3/1994 | Hallenbeck |
| 5,296,931 A | 3/1994 | Na |
| 5,299,006 A | 3/1994 | Kim |
| 5,301,028 A | 4/1994 | Banker et al. |
| 5,307,173 A | 4/1994 | Yuen et al. |
| 5,311,423 A | 5/1994 | Clark |
| 5,313,282 A | 5/1994 | Hayashi |
| 5,315,392 A | 5/1994 | Ishikawa et al. |
| 5,317,403 A | 5/1994 | Keenan |
| 5,319,445 A | 6/1994 | Fitts |
| 5,323,234 A | 6/1994 | Kawasaki |
| 5,323,240 A | 6/1994 | Amano et al. |
| 5,325,183 A | 6/1994 | Rhee |
| 5,325,423 A | 6/1994 | Lewis |
| 5,335,277 A | 8/1994 | Harvey et al. |
| 5,343,239 A | 8/1994 | Lappington et al. |
| 5,347,167 A | 9/1994 | Singh |
| 5,347,632 A | 9/1994 | Filepp et al. |
| 5,351,075 A | 9/1994 | Herz et al. |
| 5,353,121 A | 10/1994 | Young et al. |
| 5,355,162 A | 10/1994 | Yazolino et al. |

(56) References Cited

U.S. PATENT DOCUMENTS

| | | |
|---|---|---|
| 5,357,276 A | 10/1994 | Banker et al. |
| 5,359,367 A | 10/1994 | Stockill |
| 5,359,601 A | 10/1994 | Wasilewski et al. |
| 5,365,282 A | 11/1994 | Levine |
| 5,367,316 A | 11/1994 | Ikezaki |
| 5,367,330 A | 11/1994 | Haave et al. |
| 5,373,288 A | 12/1994 | Blahut |
| 5,374,942 A | 12/1994 | Gilligan et al. |
| 5,374,951 A | 12/1994 | Welsh |
| 5,377,317 A | 12/1994 | Bates et al. |
| 5,377,319 A | 12/1994 | Kitahara et al. |
| 5,382,983 A | 1/1995 | Kwoh et al. |
| 5,384,910 A | 1/1995 | Torres |
| 5,387,945 A | 2/1995 | Takeuchi |
| 5,389,964 A | 2/1995 | Oberle et al. |
| 5,390,027 A | 2/1995 | Henmi et al. |
| 5,396,546 A | 3/1995 | Remillard |
| 5,398,074 A | 3/1995 | Duffield et al. |
| 5,398,138 A | 3/1995 | Tomita |
| 5,404,393 A | 4/1995 | Remillard |
| 5,410,326 A | 4/1995 | Goldstein |
| 5,410,343 A | 4/1995 | Coddington et al. |
| 5,410,344 A | 4/1995 | Graves et al. |
| 5,410,367 A | 4/1995 | Zahavi et al. |
| 5,412,720 A | 5/1995 | Hoarty |
| 5,414,756 A | 5/1995 | Levine |
| 5,416,508 A | 5/1995 | Sakuma et al. |
| 5,419,570 A | 5/1995 | Bollotte |
| 5,423,555 A | 6/1995 | Kidrin |
| 5,424,770 A | 6/1995 | Schmelzer et al. |
| 5,425,101 A | 6/1995 | Woo et al. |
| 5,426,555 A | 6/1995 | Lundquist |
| 5,428,406 A | 6/1995 | Terasawa |
| 5,432,561 A | 7/1995 | Strubbe |
| 5,434,625 A | 7/1995 | Willis |
| 5,434,626 A | 7/1995 | Hayashi et al. |
| 5,434,678 A | 7/1995 | Abecassis |
| 5,436,676 A | 7/1995 | Pint et al. |
| 5,438,355 A | 8/1995 | Palmer |
| 5,438,372 A | 8/1995 | Tsumori et al. |
| 5,440,678 A | 8/1995 | Eisen et al. |
| 5,444,499 A | 8/1995 | Saitoh et al. |
| 5,446,919 A | 8/1995 | Wilkins |
| 5,452,012 A | 9/1995 | Saitoh |
| 5,453,146 A | 9/1995 | Kemper |
| 5,453,796 A | 9/1995 | Duffield et al. |
| 5,455,570 A | 10/1995 | Cook et al. |
| 5,459,522 A | 10/1995 | Pint |
| 5,461,415 A | 10/1995 | Wolf et al. |
| 5,465,113 A | 11/1995 | Gilboy |
| 5,465,385 A | 11/1995 | Ohga et al. |
| 5,469,206 A | 11/1995 | Strubbe et al. |
| 5,473,442 A | 12/1995 | Kim |
| 5,477,262 A | 12/1995 | Banker et al. |
| 5,479,266 A | 12/1995 | Young et al. |
| 5,479,268 A | 12/1995 | Young et al. |
| 5,479,497 A | 12/1995 | Kovarik |
| 5,481,296 A | 1/1996 | Cragun et al. |
| 5,483,278 A | 1/1996 | Strubbe et al. |
| 5,485,197 A | 1/1996 | Hoarty |
| 5,485,219 A | 1/1996 | Woo |
| 5,485,221 A | 1/1996 | Banker et al. |
| 5,485,518 A | 1/1996 | Hunter et al. |
| 5,488,409 A | 1/1996 | Yuen et al. |
| 5,495,295 A | 2/1996 | Long |
| 5,502,504 A | 3/1996 | Marshall et al. |
| 5,515,098 A | 5/1996 | Carles |
| 5,515,106 A | 5/1996 | Chaney et al. |
| 5,515,511 A | 5/1996 | Nguyen et al. |
| 5,517,254 A | 5/1996 | Monta et al. |
| 5,517,256 A | 5/1996 | Hashimoto |
| 5,523,791 A | 6/1996 | Berman |
| 5,523,794 A | 6/1996 | Mankovitz et al. |
| 5,523,795 A | 6/1996 | Ueda |
| 5,523,796 A | 6/1996 | Marshall et al. |
| 5,524,195 A | 6/1996 | Clanton, III et al. |
| 5,526,034 A | 6/1996 | Hoarty et al. |
| 5,526,257 A | 6/1996 | Lerner |
| 5,528,304 A | 6/1996 | Cherrick et al. |
| 5,532,735 A | 7/1996 | Blahut et al. |
| 5,532,754 A | 7/1996 | Young et al. |
| 5,534,911 A | 7/1996 | Levitan |
| 5,537,141 A | 7/1996 | Harper et al. |
| 5,539,479 A | 7/1996 | Bertram |
| 5,539,822 A | 7/1996 | Lett |
| 5,541,662 A | 7/1996 | Adams et al. |
| 5,541,738 A | 7/1996 | Mankovitz |
| 5,544,321 A | 8/1996 | Theimer et al. |
| 5,546,521 A | 8/1996 | Martinez |
| 5,550,576 A | 8/1996 | Klosterman |
| 5,550,578 A | 8/1996 | Hoarty et al. |
| 5,550,863 A | 8/1996 | Yurt et al. |
| 5,553,221 A | 9/1996 | Reimer et al. |
| 5,557,338 A | 9/1996 | Maze et al. |
| 5,557,721 A | 9/1996 | Fite et al. |
| 5,557,724 A | 9/1996 | Sampat et al. |
| 5,559,548 A | 9/1996 | Davis et al. |
| 5,559,549 A | 9/1996 | Hendricks et al. |
| 5,559,550 A | 9/1996 | Mankovitz |
| 5,559,942 A | 9/1996 | Gough et al. |
| 5,561,471 A | 10/1996 | Kim et al. |
| 5,561,709 A | 10/1996 | Remillard |
| 5,563,665 A | 10/1996 | Chang |
| 5,570,295 A | 10/1996 | Isenberg et al. |
| 5,572,442 A | 11/1996 | Schulhof et al. |
| 5,574,962 A | 11/1996 | Fardeau et al. |
| 5,576,755 A | 11/1996 | Davis et al. |
| 5,576,951 A | 11/1996 | Lockwood |
| 5,579,055 A | 11/1996 | Hamilton et al. |
| 5,579,239 A | 11/1996 | Freeman et al. |
| 5,581,479 A | 12/1996 | McLaughlin et al. |
| 5,582,364 A | 12/1996 | Trulin et al. |
| 5,583,560 A | 12/1996 | Florin et al. |
| 5,583,561 A | 12/1996 | Baker |
| 5,583,563 A | 12/1996 | Wanderscheid et al. |
| 5,583,576 A | 12/1996 | Perlman et al. |
| 5,584,025 A | 12/1996 | Keithley et al. |
| 5,585,838 A | 12/1996 | Lawler et al. |
| 5,585,858 A | 12/1996 | Harper et al. |
| 5,585,865 A | 12/1996 | Amano et al. |
| 5,585,866 A | 12/1996 | Miller et al. |
| 5,589,892 A | 12/1996 | Knee et al. |
| 5,592,551 A | 1/1997 | Lett et al. |
| 5,594,490 A | 1/1997 | Dawson et al. |
| 5,594,492 A | 1/1997 | O'Callaghan et al. |
| 5,594,509 A | 1/1997 | Florin et al. |
| 5,594,661 A | 1/1997 | Bruner et al. |
| 5,596,373 A | 1/1997 | White et al. |
| 5,596,705 A | 1/1997 | Reimer et al. |
| 5,600,364 A | 2/1997 | Hendricks et al. |
| 5,600,365 A | 2/1997 | Kondo et al. |
| 5,600,366 A | 2/1997 | Schulman |
| 5,600,573 A | 2/1997 | Hendricks et al. |
| 5,602,582 A | 2/1997 | Wanderscheid et al. |
| 5,602,596 A | 2/1997 | Claussen et al. |
| 5,602,597 A | 2/1997 | Bertram |
| 5,602,598 A | 2/1997 | Shintani |
| 5,602,600 A | 2/1997 | Queinnec |
| 5,606,374 A | 2/1997 | Bertram |
| 5,608,448 A | 3/1997 | Smoral et al. |
| 5,610,653 A | 3/1997 | Abecassis |
| 5,610,664 A | 3/1997 | Bobert |
| 5,616,876 A | 4/1997 | Cluts |
| 5,617,526 A | 4/1997 | Oran et al. |
| 5,617,565 A | 4/1997 | Augenbraun et al. |
| 5,619,247 A | 4/1997 | Russo |
| 5,619,249 A | 4/1997 | Billock et al. |
| 5,619,274 A | 4/1997 | Roop et al. |
| 5,621,456 A | 4/1997 | Florin et al. |
| 5,623,613 A | 4/1997 | Rowe et al. |
| 5,625,406 A | 4/1997 | Newberry et al. |
| 5,625,693 A | 4/1997 | Rohatgi et al. |
| 5,627,940 A | 5/1997 | Rohra et al. |
| 5,629,733 A | 5/1997 | Youman et al. |

(56) References Cited

U.S. PATENT DOCUMENTS

| | | |
|---|---|---|
| 5,630,119 A | 5/1997 | Aristides et al. |
| 5,631,995 A | 5/1997 | Weissensteiner et al. |
| 5,633,683 A | 5/1997 | Rosengren et al. |
| 5,634,051 A | 5/1997 | Thomson |
| 5,635,978 A | 6/1997 | Alten et al. |
| 5,635,979 A | 6/1997 | Kostreski et al. |
| 5,635,989 A | 6/1997 | Rothmuller |
| 5,636,346 A | 6/1997 | Saxe |
| 5,640,484 A | 6/1997 | Mankovitz |
| 5,640,501 A | 6/1997 | Turpin |
| 5,640,577 A | 6/1997 | Scharmer |
| 5,642,153 A | 6/1997 | Chaney et al. |
| 5,648,813 A | 7/1997 | Tanigawa et al. |
| 5,648,824 A | 7/1997 | Dunn et al. |
| 5,650,826 A | 7/1997 | Eitz |
| 5,650,831 A | 7/1997 | Farwell |
| 5,652,613 A | 7/1997 | Lazarus et al. |
| 5,652,615 A | 7/1997 | Bryant et al. |
| 5,654,748 A | 8/1997 | Matthews, III |
| 5,654,886 A | 8/1997 | Zereski, Jr. et al. |
| 5,657,072 A | 8/1997 | Aristides et al. |
| 5,657,091 A | 8/1997 | Bertram |
| 5,659,350 A | 8/1997 | Hendricks et al. |
| 5,659,366 A | 8/1997 | Kerman |
| 5,659,742 A | 8/1997 | Beattie et al. |
| 5,661,516 A | 8/1997 | Carles |
| 5,661,517 A | 8/1997 | Budow et al. |
| 5,663,757 A | 9/1997 | Morales |
| 5,664,111 A | 9/1997 | Nahan et al. |
| 5,666,293 A | 9/1997 | Metz et al. |
| 5,666,498 A | 9/1997 | Amro |
| 5,666,645 A | 9/1997 | Thomas et al. |
| 5,668,592 A | 9/1997 | Spaulding, II |
| 5,671,276 A | 9/1997 | Eyer et al. |
| 5,671,411 A | 9/1997 | Watts et al. |
| 5,675,390 A | 10/1997 | Schindler et al. |
| 5,675,752 A | 10/1997 | Scott et al. |
| 5,677,708 A | 10/1997 | Matthews, III et al. |
| 5,677,981 A | 10/1997 | Kato et al. |
| 5,682,195 A | 10/1997 | Hendricks et al. |
| 5,682,206 A | 10/1997 | Wehmeyer et al. |
| 5,682,525 A | 10/1997 | Bouve et al. |
| 5,684,525 A | 11/1997 | Klosterman |
| 5,686,954 A | 11/1997 | Yoshinobu et al. |
| 5,687,331 A | 11/1997 | Volk et al. |
| 5,689,648 A | 11/1997 | Diaz et al. |
| 5,689,663 A | 11/1997 | Williams |
| 5,689,666 A | 11/1997 | Berquist et al. |
| 5,691,476 A | 11/1997 | Madaras |
| 5,692,214 A | 11/1997 | Levine |
| 5,694,163 A | 12/1997 | Harrison |
| 5,694,176 A | 12/1997 | Bruette et al. |
| 5,694,381 A | 12/1997 | Sako |
| 5,696,905 A | 12/1997 | Reimer et al. |
| 5,699,052 A | 12/1997 | Miyahara |
| 5,699,107 A | 12/1997 | Lawler et al. |
| 5,699,125 A | 12/1997 | Rzeszewski et al. |
| 5,699,528 A | 12/1997 | Hogan et al. |
| 5,708,478 A | 1/1998 | Tognazzini |
| 5,708,767 A | 1/1998 | Yeo et al. |
| 5,708,780 A | 1/1998 | Levergood et al. |
| 5,710,601 A | 1/1998 | Marshall et al. |
| 5,710,815 A | 1/1998 | Ming et al. |
| 5,710,884 A | 1/1998 | Dedrick |
| 5,715,314 A | 2/1998 | Payne et al. |
| 5,715,399 A | 2/1998 | Bezos |
| 5,717,452 A | 2/1998 | Janin et al. |
| 5,717,923 A | 2/1998 | Dedrick |
| 5,721,829 A | 2/1998 | Dunn et al. |
| 5,722,041 A | 2/1998 | Freadman |
| 5,724,103 A | 3/1998 | Batchelor |
| 5,724,521 A | 3/1998 | Dedrick |
| 5,724,525 A | 3/1998 | Beyers et al. |
| 5,724,567 A | 3/1998 | Rose et al. |
| 5,726,702 A | 3/1998 | Hamaguchi et al. |
| 5,727,060 A | 3/1998 | Young |
| 5,727,163 A | 3/1998 | Bezos |
| 5,731,844 A | 3/1998 | Rauch et al. |
| 5,734,444 A | 3/1998 | Yoshinobu |
| 5,734,720 A | 3/1998 | Salganicoff |
| 5,734,853 A | 3/1998 | Hendricks et al. |
| 5,734,893 A | 3/1998 | Li |
| 5,737,028 A | 4/1998 | Bertram et al. |
| 5,737,030 A | 4/1998 | Hong et al. |
| 5,737,552 A | 4/1998 | Lavallee et al. |
| 5,740,231 A | 4/1998 | Cohn et al. |
| 5,740,549 A | 4/1998 | Reilly et al. |
| 5,742,816 A | 4/1998 | Barr et al. |
| 5,745,710 A | 4/1998 | Clanton et al. |
| 5,748,191 A | 5/1998 | Rozak et al. |
| 5,748,716 A | 5/1998 | Levine |
| 5,749,043 A | 5/1998 | Worthy |
| 5,749,081 A | 5/1998 | Whiteis |
| 5,751,282 A | 5/1998 | Girard et al. |
| 5,752,159 A | 5/1998 | Faust et al. |
| 5,752,160 A | 5/1998 | Dunn |
| 5,754,258 A | 5/1998 | Hanaya et al. |
| 5,754,771 A | 5/1998 | Epperson et al. |
| 5,754,939 A | 5/1998 | Herz et al. |
| 5,757,417 A | 5/1998 | Aras et al. |
| 5,758,257 A | 5/1998 | Herz et al. |
| 5,758,259 A | 5/1998 | Lawler |
| 5,760,821 A | 6/1998 | Ellis et al. |
| 5,761,372 A | 6/1998 | Yoshinobu et al. |
| 5,761,601 A | 6/1998 | Nemirofsky et al. |
| 5,761,606 A | 6/1998 | Wolzien |
| 5,768,528 A | 6/1998 | Stumm |
| 5,771,354 A | 6/1998 | Crawford |
| 5,774,170 A | 6/1998 | Hite et al. |
| 5,774,357 A | 6/1998 | Hoffberg et al. |
| 5,774,534 A | 6/1998 | Mayer |
| 5,774,664 A | 6/1998 | Hidary et al. |
| 5,774,859 A | 6/1998 | Houser et al. |
| 5,774,887 A | 6/1998 | Wolff et al. |
| 5,778,181 A | 7/1998 | Hidary et al. |
| 5,778,182 A | 7/1998 | Cathey et al. |
| 5,781,226 A | 7/1998 | Sheehan |
| 5,781,245 A | 7/1998 | Weij et al. |
| 5,781,246 A | 7/1998 | Alten et al. |
| 5,781,734 A | 7/1998 | Ohno et al. |
| 5,784,258 A | 7/1998 | Quinn |
| 5,787,259 A | 7/1998 | Haroun et al. |
| 5,788,507 A | 8/1998 | Redford et al. |
| 5,790,201 A | 8/1998 | Antos |
| 5,790,202 A | 8/1998 | Kummer et al. |
| 5,790,426 A | 8/1998 | Robinson |
| 5,790,753 A | 8/1998 | Krishnamoorthy et al. |
| 5,790,835 A | 8/1998 | Case et al. |
| 5,790,935 A | 8/1998 | Payton |
| 5,793,364 A | 8/1998 | Bolanos et al. |
| 5,793,409 A | 8/1998 | Tetsumura |
| 5,793,438 A | 8/1998 | Bedard |
| 5,793,964 A | 8/1998 | Rogers et al. |
| 5,793,972 A | 8/1998 | Shane |
| 5,797,011 A | 8/1998 | Kroll et al. |
| 5,798,785 A | 8/1998 | Hendricks et al. |
| 5,801,747 A | 9/1998 | Bedard |
| 5,801,785 A | 9/1998 | Crump et al. |
| 5,801,787 A | 9/1998 | Schein et al. |
| 5,802,284 A | 9/1998 | Karlton et al. |
| 5,805,154 A | 9/1998 | Brown |
| 5,805,167 A | 9/1998 | van Cruyningen |
| 5,805,235 A | 9/1998 | Bedard |
| 5,805,763 A | 9/1998 | Lawler et al. |
| 5,805,804 A | 9/1998 | Laursen et al. |
| 5,805,806 A | 9/1998 | McArthur |
| 5,808,608 A | 9/1998 | Young et al. |
| 5,808,694 A | 9/1998 | Usui et al. |
| 5,809,204 A | 9/1998 | Young et al. |
| 5,809,214 A | 9/1998 | Nureki et al. |
| 5,809,242 A | 9/1998 | Shaw et al. |
| 5,809,471 A | 9/1998 | Brodsky |
| 5,812,124 A | 9/1998 | Eick et al. |
| 5,812,205 A | 9/1998 | Milnes et al. |

(56) References Cited

U.S. PATENT DOCUMENTS

| | | |
|---|---|---|
| 5,812,931 A | 9/1998 | Yuen |
| 5,815,145 A | 9/1998 | Matthews, III |
| 5,815,671 A | 9/1998 | Morrison |
| 5,818,438 A | 10/1998 | Howe et al. |
| 5,818,439 A | 10/1998 | Nagasaka et al. |
| 5,818,441 A | 10/1998 | Throckmorton et al. |
| 5,818,511 A | 10/1998 | Farry et al. |
| 5,818,541 A | 10/1998 | Matsuura et al. |
| 5,818,935 A | 10/1998 | Maa |
| 5,819,019 A | 10/1998 | Nelson |
| 5,819,156 A | 10/1998 | Belmont |
| 5,819,284 A | 10/1998 | Farber et al. |
| 5,819,285 A | 10/1998 | Damico et al. |
| 5,822,123 A | 10/1998 | Davis et al. |
| 5,825,407 A | 10/1998 | Cowe et al. |
| 5,828,402 A | 10/1998 | Collings |
| 5,828,419 A | 10/1998 | Bruette et al. |
| 5,828,420 A | 10/1998 | Marshall et al. |
| 5,828,839 A | 10/1998 | Moncreiff |
| 5,828,945 A | 10/1998 | Klosterman |
| 5,830,068 A | 11/1998 | Brenner et al. |
| 5,832,223 A | 11/1998 | Hara et al. |
| 5,833,468 A | 11/1998 | Guy et al. |
| 5,835,717 A | 11/1998 | Karlton et al. |
| 5,838,314 A | 11/1998 | Neel et al. |
| 5,838,383 A | 11/1998 | Chimoto et al. |
| 5,842,010 A | 11/1998 | Jain et al. |
| 5,842,199 A | 11/1998 | Miller et al. |
| 5,844,552 A | 12/1998 | Gaughan et al. |
| 5,844,620 A | 12/1998 | Coleman et al. |
| 5,848,352 A | 12/1998 | Dougherty et al. |
| 5,848,396 A | 12/1998 | Gerace |
| 5,848,397 A | 12/1998 | Marsh et al. |
| 5,850,218 A | 12/1998 | LaJoie et al. |
| 5,852,437 A | 12/1998 | Wugofski et al. |
| 5,861,881 A | 1/1999 | Freeman et al. |
| 5,861,906 A | 1/1999 | Dunn et al. |
| 5,862,292 A | 1/1999 | Kubota et al. |
| 5,864,823 A | 1/1999 | Levitan |
| 5,867,226 A | 2/1999 | Wehmeyer et al. |
| 5,867,227 A | 2/1999 | Yamaguchi |
| 5,867,233 A | 2/1999 | Tanaka |
| 5,870,543 A | 2/1999 | Ronning |
| 5,870,754 A | 2/1999 | Dimitrova et al. |
| 5,872,588 A | 2/1999 | Aras et al. |
| 5,873,660 A | 2/1999 | Walsh et al. |
| 5,874,985 A | 2/1999 | Matthews, III |
| 5,875,108 A | 2/1999 | Hoffberg et al. |
| 5,877,906 A | 3/1999 | Nagasawa et al. |
| 5,880,720 A | 3/1999 | Iwafune et al. |
| 5,880,768 A | 3/1999 | Lemmons et al. |
| 5,883,677 A | 3/1999 | Hofmann ............... 725/49 |
| 5,886,691 A | 3/1999 | Furuya et al. |
| 5,886,731 A | 3/1999 | Ebisawa |
| 5,886,732 A | 3/1999 | Humpleman |
| 5,889,950 A | 3/1999 | Kuzma |
| 5,892,498 A | 4/1999 | Marshall et al. |
| 5,892,535 A | 4/1999 | Allen et al. |
| 5,892,536 A | 4/1999 | Logan et al. |
| 5,892,767 A | 4/1999 | Bell et al. |
| 5,895,474 A | 4/1999 | Maarek et al. |
| 5,900,905 A | 5/1999 | Shoff et al. |
| 5,903,314 A | 5/1999 | Niijima et al. |
| 5,903,545 A | 5/1999 | Sabourin et al. |
| 5,903,816 A | 5/1999 | Broadwin et al. |
| 5,905,497 A | 5/1999 | Vaughan et al. |
| 5,905,865 A | 5/1999 | Palmer et al. |
| 5,907,322 A | 5/1999 | Kelly et al. |
| 5,907,323 A | 5/1999 | Lawler et al. ............ 725/41 |
| 5,907,366 A | 5/1999 | Farmer et al. |
| 5,912,664 A | 6/1999 | Eick |
| 5,913,040 A | 6/1999 | Rakavy et al. |
| 5,914,712 A | 6/1999 | Sartain et al. |
| 5,914,746 A | 6/1999 | Matthews, III et al. |
| 5,915,026 A | 6/1999 | Mankovitz |
| 5,915,250 A | 6/1999 | Jain et al. |
| 5,917,481 A | 6/1999 | Rzeszewski et al. |
| 5,917,830 A | 6/1999 | Chen et al. |
| 5,918,014 A | 6/1999 | Robinson |
| 5,920,700 A | 7/1999 | Gordon et al. |
| 5,923,848 A | 7/1999 | Goodhand et al. |
| 5,929,849 A | 7/1999 | Kikinis |
| 5,929,850 A | 7/1999 | Broadwin et al. |
| 5,929,932 A | 7/1999 | Otsuki et al. |
| 5,931,905 A | 8/1999 | Hashimoto et al. |
| 5,936,614 A | 8/1999 | An et al. |
| 5,936,679 A | 8/1999 | Kasahara et al. |
| 5,937,160 A | 8/1999 | Davis et al. |
| 5,940,073 A | 8/1999 | Klosterman et al. |
| 5,940,572 A | 8/1999 | Balaban et al. |
| 5,940,614 A | 8/1999 | Allen et al. |
| 5,945,988 A | 8/1999 | Williams et al. |
| 5,946,386 A | 8/1999 | Rogers et al. |
| 5,949,954 A | 9/1999 | Young et al. |
| 5,951,642 A | 9/1999 | Onoe et al. |
| 5,953,005 A | 9/1999 | Liu |
| 5,955,988 A | 9/1999 | Blonstein et al. |
| 5,956,716 A | 9/1999 | Kenner et al. |
| 5,959,688 A | 9/1999 | Schein et al. |
| 5,960,411 A | 9/1999 | Hartman et al. |
| 5,973,683 A | 10/1999 | Cragun et al. |
| 5,974,222 A | 10/1999 | Yuen et al. |
| 5,977,964 A | 11/1999 | Williams et al. |
| 5,983,236 A | 11/1999 | Yager et al. |
| 5,986,650 A | 11/1999 | Ellis et al. |
| 5,988,078 A | 11/1999 | Levine |
| 5,990,890 A | 11/1999 | Etheredge |
| 5,990,927 A | 11/1999 | Hendricks et al. |
| 5,991,799 A | 11/1999 | Yen et al. |
| 5,999,912 A | 12/1999 | Wodarz et al. |
| 6,002,393 A | 12/1999 | Hite et al. |
| 6,002,394 A | 12/1999 | Schein et al. |
| 6,002,443 A | 12/1999 | Iggulden |
| 6,002,444 A | 12/1999 | Marshall et al. |
| 6,003,030 A | 12/1999 | Kenner et al. |
| 6,005,561 A | 12/1999 | Hawkins et al. |
| 6,005,562 A | 12/1999 | Shiga et al. |
| 6,005,563 A | 12/1999 | White et al. |
| 6,005,565 A | 12/1999 | Legall et al. |
| 6,005,566 A | 12/1999 | Jones et al. |
| 6,005,597 A | 12/1999 | Barrett et al. |
| 6,006,257 A | 12/1999 | Slezak |
| 6,008,802 A | 12/1999 | Iki et al. |
| 6,008,803 A | 12/1999 | Rowe et al. |
| 6,011,546 A | 1/2000 | Bertram |
| 6,012,086 A | 1/2000 | Lowell |
| 6,014,137 A | 1/2000 | Burns |
| 6,014,184 A | 1/2000 | Knee et al. |
| 6,014,502 A | 1/2000 | Moraes |
| 6,016,141 A | 1/2000 | Knudson et al. |
| 6,018,372 A | 1/2000 | Etheredge |
| 6,018,768 A | 1/2000 | Ullman et al. |
| 6,020,883 A | 2/2000 | Herz et al. |
| 6,020,929 A | 2/2000 | Marshall et al. |
| 6,023,267 A | 2/2000 | Chapuis et al. |
| 6,025,837 A | 2/2000 | Matthews, III et al. |
| 6,025,886 A | 2/2000 | Koda |
| 6,027,198 A | 2/2000 | Tanaka et al. |
| 6,028,599 A | 2/2000 | Yuen et al. |
| 6,028,600 A | 2/2000 | Rosin et al. |
| 6,029,045 A | 2/2000 | Picco et al. |
| 6,029,176 A | 2/2000 | Cannon |
| 6,029,195 A | 2/2000 | Herz |
| 6,035,304 A | 3/2000 | Machida et al. |
| 6,047,317 A | 4/2000 | Bisdikian et al. |
| 6,049,824 A | 4/2000 | Simonin |
| 6,052,145 A | 4/2000 | Macrae et al. |
| 6,058,238 A | 5/2000 | Ng |
| 6,061,060 A | 5/2000 | Berry et al. |
| 6,061,082 A | 5/2000 | Park |
| 6,061,097 A | 5/2000 | Satterfield |
| 6,064,376 A | 5/2000 | Berezowski et al. |
| 6,064,980 A | 5/2000 | Jacobi et al. |
| 6,065,047 A | 5/2000 | Carpenter et al. |

(56) References Cited

U.S. PATENT DOCUMENTS

| | | |
|---|---|---|
| 6,067,303 A | 5/2000 | Aaker et al. |
| 6,067,561 A | 5/2000 | Dillon |
| 6,072,460 A | 6/2000 | Marshall et al. |
| 6,075,526 A | 6/2000 | Rothmuller |
| 6,075,551 A | 6/2000 | Berezowski et al. |
| 6,075,575 A | 6/2000 | Schein et al. |
| 6,078,348 A | 6/2000 | Klosterman et al. |
| 6,081,750 A | 6/2000 | Hoffberg et al. |
| 6,081,830 A | 6/2000 | Schindler |
| 6,088,722 A | 7/2000 | Herz et al. |
| 6,091,883 A | 7/2000 | Artigalas et al. |
| 6,097,441 A | 8/2000 | Allport |
| 6,097,499 A | 8/2000 | Casey et al. |
| 6,098,065 A | 8/2000 | Skillen et al. |
| 6,104,334 A | 8/2000 | Allport |
| 6,104,705 A | 8/2000 | Ismail et al. |
| 6,108,042 A | 8/2000 | Adams et al. |
| 6,111,614 A | 8/2000 | Mugura et al. |
| 6,112,186 A | 8/2000 | Bergh et al. |
| 6,115,057 A | 9/2000 | Kwoh et al. |
| 6,118,492 A | 9/2000 | Milnes et al. |
| 6,119,098 A | 9/2000 | Guyot et al. |
| 6,119,101 A | 9/2000 | Peckover |
| 6,122,011 A | 9/2000 | Dias et al. ............... 348/569 |
| 6,124,854 A | 9/2000 | Sartain et al. |
| 6,125,230 A | 9/2000 | Yaginuma |
| 6,130,726 A | 10/2000 | Darbee et al. |
| 6,133,909 A | 10/2000 | Schein et al. |
| 6,139,177 A | 10/2000 | Venkatraman et al. |
| 6,141,003 A | 10/2000 | Chor et al. |
| 6,144,376 A * | 11/2000 | Connelly ............... 725/44 |
| 6,147,714 A | 11/2000 | Terasawa et al. ........... 348/564 |
| 6,147,715 A | 11/2000 | Yuen et al. |
| 6,151,059 A | 11/2000 | Schein et al. |
| 6,151,643 A | 11/2000 | Cheng et al. |
| 6,154,203 A | 11/2000 | Yuen et al. |
| 6,157,411 A | 12/2000 | Williams et al. |
| 6,157,413 A | 12/2000 | Hanafee et al. |
| 6,160,545 A | 12/2000 | Eyer et al. |
| 6,160,546 A | 12/2000 | Thompson et al. |
| 6,160,570 A | 12/2000 | Sitnik |
| 6,160,989 A | 12/2000 | Hendricks et al. |
| 6,163,316 A | 12/2000 | Killian |
| 6,163,345 A | 12/2000 | Noguchi et al. |
| 6,169,542 B1 | 1/2001 | Hooks et al. |
| 6,172,674 B1 | 1/2001 | Etheredge |
| 6,172,677 B1 | 1/2001 | Stautner et al. |
| 6,173,271 B1 | 1/2001 | Goodman et al. |
| 6,177,931 B1 | 1/2001 | Alexander et al. |
| 6,178,446 B1 | 1/2001 | Gerszberg et al. |
| 6,181,335 B1 | 1/2001 | Hendricks et al. |
| 6,184,877 B1 | 2/2001 | Dodson et al. |
| 6,186,287 B1 | 2/2001 | Heidenreich et al. |
| 6,186,443 B1 | 2/2001 | Shaffer |
| 6,191,780 B1 | 2/2001 | Martin et al. |
| 6,201,536 B1 | 3/2001 | Hendricks et al. |
| 6,202,212 B1 | 3/2001 | Sturgeon et al. |
| 6,208,384 B1 | 3/2001 | Schultheiss |
| 6,209,129 B1 | 3/2001 | Carr et al. |
| 6,209,130 B1 | 3/2001 | Rector, Jr. et al. |
| 6,212,553 B1 | 4/2001 | Lee et al. |
| 6,216,264 B1 | 4/2001 | Maze et al. |
| 6,233,734 B1 | 5/2001 | Macrae et al. |
| 6,234,973 B1 | 5/2001 | Meador et al. |
| 6,237,049 B1 | 5/2001 | Ludtke |
| 6,237,145 B1 | 5/2001 | Narasimhan et al. |
| 6,237,146 B1 | 5/2001 | Richards et al. |
| 6,239,794 B1 | 5/2001 | Yuen et al. |
| 6,240,555 B1 | 5/2001 | Shoff et al. |
| 6,253,203 B1 | 6/2001 | O'Flaherty et al. |
| 6,256,071 B1 | 7/2001 | Hiroi |
| 6,256,785 B1 | 7/2001 | Klappert et al. |
| 6,257,268 B1 | 7/2001 | Hope et al. |
| 6,262,721 B1 | 7/2001 | Tsukidate et al. |
| 6,262,722 B1 | 7/2001 | Allison et al. |
| 6,262,772 B1 | 7/2001 | Shen et al. |
| 6,263,501 B1 | 7/2001 | Schein et al. |
| 6,263,507 B1 | 7/2001 | Ahmad et al. |
| 6,266,814 B1 | 7/2001 | Lemmons et al. |
| 6,268,849 B1 | 7/2001 | Boyer et al. |
| 6,275,268 B1 | 8/2001 | Ellis et al. |
| 6,279,157 B1 | 8/2001 | Takasu |
| 6,282,713 B1 | 8/2001 | Kitsukawa et al. |
| 6,285,713 B1 | 9/2001 | Nakaya et al. |
| 6,286,140 B1 | 9/2001 | Ivanyi |
| 6,289,346 B1 | 9/2001 | Milewski et al. |
| 6,298,482 B1 | 10/2001 | Seidman et al. |
| 6,305,016 B1 | 10/2001 | Marshall et al. |
| 6,310,886 B1 | 10/2001 | Barton |
| 6,311,877 B1 | 11/2001 | Yang et al. |
| 6,312,336 B1 | 11/2001 | Handelman et al. |
| 6,317,885 B1 | 11/2001 | Fries |
| 6,320,588 B1 | 11/2001 | Palmer et al. |
| 6,323,911 B1 | 11/2001 | Schein et al. |
| 6,323,931 B1 | 11/2001 | Fujita et al. |
| 6,327,049 B1 | 12/2001 | Ohtsuka |
| 6,331,877 B1 | 12/2001 | Bennington et al. |
| 6,335,963 B1 | 1/2002 | Bosco |
| 6,341,195 B1 | 1/2002 | Mankovitz et al. |
| 6,341,374 B2 | 1/2002 | Schein et al. |
| 6,342,926 B1 | 1/2002 | Hanafee et al. |
| 6,348,033 B1 | 2/2002 | Catlett |
| 6,357,042 B2 | 3/2002 | Srinivasan et al. |
| 6,357,043 B1 | 3/2002 | Ellis et al. |
| 6,359,636 B1 | 3/2002 | Schindler et al. |
| 6,363,525 B1 | 3/2002 | Dougherty et al. |
| 6,366,890 B1 | 4/2002 | Usrey |
| 6,373,528 B1 | 4/2002 | Bennington et al. |
| 6,381,582 B1 | 4/2002 | Walker et al. |
| 6,388,714 B1 | 5/2002 | Schein et al. |
| 6,389,593 B1 | 5/2002 | Yamagishi |
| 6,392,710 B1 | 5/2002 | Gonsalves et al. |
| 6,396,546 B1 | 5/2002 | Men et al. |
| 6,400,407 B1 | 6/2002 | Zigmond et al. |
| 6,405,371 B1 | 6/2002 | Oosterhout et al. |
| 6,408,437 B1 | 6/2002 | Hendricks et al. |
| 6,411,308 B1 | 6/2002 | Blonstein et al. |
| 6,411,696 B1 | 6/2002 | Iverson et al. |
| 6,412,110 B1 | 6/2002 | Schein et al. |
| 6,418,556 B1 | 7/2002 | Bennington et al. ............. 725/40 |
| 6,421,067 B1 | 7/2002 | Kamen et al. |
| 6,437,836 B1 | 8/2002 | Huang et al. |
| 6,446,261 B1 | 9/2002 | Rosser |
| 6,453,471 B1 | 9/2002 | Klosterman |
| 6,463,585 B1 | 10/2002 | Hendricks et al. |
| 6,469,753 B1 | 10/2002 | Klosterman et al. |
| 6,470,497 B1 | 10/2002 | Ellis et al. |
| 6,477,579 B1 | 11/2002 | Kunkel et al. |
| 6,477,705 B1 | 11/2002 | Yuen et al. |
| 6,486,920 B2 | 11/2002 | Arai et al. |
| 6,487,362 B1 | 11/2002 | Yuen et al. |
| 6,493,876 B1 | 12/2002 | DeFreese et al. |
| 6,498,895 B2 | 12/2002 | Young et al. |
| 6,505,348 B1 | 1/2003 | Knowles et al. |
| 6,509,908 B1 | 1/2003 | Croy et al. |
| 6,515,680 B1 | 2/2003 | Hendricks et al. |
| 6,516,323 B1 | 2/2003 | Kamba |
| 6,516,467 B1 | 2/2003 | Schindler et al. |
| 6,526,577 B1 | 2/2003 | Knudson et al. |
| 6,530,082 B1 | 3/2003 | Del Sesto et al. |
| 6,539,548 B1 | 3/2003 | Hendricks et al. |
| 6,542,169 B1 | 4/2003 | Marshall et al. |
| 6,545,722 B1 | 4/2003 | Schultheiss et al. |
| 6,546,399 B1 | 4/2003 | Reed et al. |
| 6,546,556 B1 | 4/2003 | Kataoka et al. |
| 6,564,378 B1 | 5/2003 | Satterfield et al. |
| 6,564,379 B1 | 5/2003 | Knee et al. |
| 6,567,982 B1 | 5/2003 | Howe et al. |
| 6,571,390 B1 | 5/2003 | Dunn et al. |
| 6,574,424 B1 | 6/2003 | Dimitri et al. |
| 6,588,013 B1 | 7/2003 | Lumley et al. |
| 6,600,364 B1 | 7/2003 | Liang et al. |
| 6,600,503 B2 | 7/2003 | Stautner et al. |
| 6,606,128 B2 | 8/2003 | Hanafee et al. |

(56) References Cited

U.S. PATENT DOCUMENTS

| | | |
|---|---|---|
| 6,611,654 B1 | 8/2003 | Shteyn |
| 6,622,306 B1 | 9/2003 | Kamada |
| 6,631,523 B1 | 10/2003 | Matthews et al. ............... 725/53 |
| 6,637,029 B1 | 10/2003 | Maissel et al. |
| 6,651,251 B1 | 11/2003 | Shoff et al. |
| 6,660,503 B2 | 12/2003 | Kierulff |
| 6,661,468 B2 | 12/2003 | Alten et al. |
| 6,665,869 B1 | 12/2003 | Ellis et al. |
| 6,675,385 B1 | 1/2004 | Wang |
| 6,675,386 B1 | 1/2004 | Hendricks et al. |
| 6,678,706 B1 | 1/2004 | Fishel |
| 6,687,906 B1 | 2/2004 | Yuen et al. |
| 6,696,373 B2 | 2/2004 | Kinn et al. |
| 6,698,020 B1 | 2/2004 | Zigmond et al. |
| 6,704,931 B1 | 3/2004 | Schaffer et al. |
| 6,718,551 B1 | 4/2004 | Swix et al. |
| 6,728,967 B2 | 4/2004 | Bennington et al. |
| 6,732,369 B1 | 5/2004 | Leftwich et al. |
| 6,738,978 B1 | 5/2004 | Hendricks et al. |
| 6,742,183 B1 | 5/2004 | Reynolds et al. |
| 6,751,800 B1 | 6/2004 | Fukuda et al. |
| 6,754,904 B1 | 6/2004 | Cooper et al. |
| 6,756,997 B1 | 6/2004 | Ward et al. ..................... 715/716 |
| 6,757,906 B1 | 6/2004 | Look et al. |
| 6,760,537 B2 | 7/2004 | Mankovitz |
| 6,769,128 B1 | 7/2004 | Knee et al. |
| 6,792,618 B1 | 9/2004 | Bendinelli et al. |
| 6,799,326 B2 | 9/2004 | Boylan, III et al. |
| 6,799,327 B1 | 9/2004 | Reynolds et al. |
| 6,828,993 B1 | 12/2004 | Hendricks et al. |
| 6,847,387 B2 | 1/2005 | Roth |
| 6,850,693 B2 | 2/2005 | Young et al. |
| 6,857,131 B1 | 2/2005 | Yagawa et al. |
| 6,865,746 B1 | 3/2005 | Herrington et al. |
| 6,868,551 B1 | 3/2005 | Lawler et al. |
| 6,898,762 B2 | 5/2005 | Ellis et al. |
| 6,925,567 B1 | 8/2005 | Hirata |
| 6,938,208 B2 | 8/2005 | Reichardt |
| 6,973,669 B2 | 12/2005 | Daniels |
| 6,983,478 B1 | 1/2006 | Grauch et al. |
| 6,983,483 B2 | 1/2006 | Maze et al. |
| 7,003,792 B1 | 2/2006 | Yuen |
| 7,013,478 B1 | 3/2006 | Hendricks et al. |
| 7,028,326 B1 | 4/2006 | Westlake et al. |
| 7,039,935 B2 | 5/2006 | Knudson et al. |
| 7,047,547 B2 | 5/2006 | Alten et al. |
| 7,047,550 B1 | 5/2006 | Yasukawa et al. |
| 7,050,988 B2 | 5/2006 | Atcheson et al. |
| 7,058,635 B1 | 6/2006 | Shah-Nazaroff et al. |
| 7,069,576 B1 | 6/2006 | Knudson et al. |
| 7,100,185 B2 | 8/2006 | Bennington et al. |
| 7,117,518 B1 | 10/2006 | Takahashi et al. |
| 7,165,098 B1 | 1/2007 | Boyer et al. |
| 7,185,355 B1 | 2/2007 | Ellis et al. |
| 7,187,847 B2 | 3/2007 | Young et al. |
| 7,225,455 B2 | 5/2007 | Bennington et al. |
| 7,243,139 B2 | 7/2007 | Ullman et al. |
| 7,266,833 B2 | 9/2007 | Ward et al. |
| 7,287,267 B2 | 10/2007 | Knudson |
| 7,293,276 B2 | 11/2007 | Phillips et al. |
| 7,328,450 B2 | 2/2008 | Macrae et al. |
| 7,349,976 B1 | 3/2008 | Glaser et al. |
| 7,363,645 B1 | 4/2008 | Hendricks |
| 7,392,532 B2 | 6/2008 | White et al. |
| 7,398,541 B2 | 7/2008 | Bennington et al. |
| 7,437,751 B2 | 10/2008 | Daniels |
| 7,480,929 B2 | 1/2009 | Klosterman et al. |
| 7,487,528 B2 | 2/2009 | Satterfield et al. |
| 7,487,529 B1 | 2/2009 | Orlick |
| 7,493,641 B2 | 2/2009 | Klosterman et al. |
| 7,503,055 B2 | 3/2009 | Reynolds et al. |
| 7,540,010 B2 | 5/2009 | Hanaya et al. |
| 7,552,459 B2 | 6/2009 | Klosterman et al. |
| 7,634,786 B2 | 12/2009 | Knee et al. |
| 7,636,123 B2 | 12/2009 | Fukui et al. |
| 7,665,109 B2 | 2/2010 | Matthews et al. |
| 7,721,307 B2 | 5/2010 | Hendricks et al. |
| 7,757,254 B2 | 7/2010 | Shoff et al. |
| 7,770,196 B1 | 8/2010 | Hendricks |
| 7,779,437 B2 | 8/2010 | Barton |
| 8,078,751 B2 | 12/2011 | Janik et al. |
| 8,112,776 B2 | 2/2012 | Schein |
| 8,397,259 B2 | 3/2013 | Knudson et al. |
| 2001/0001160 A1 | 5/2001 | Shoff et al. ..................... 725/51 |
| 2001/0019338 A1 | 9/2001 | Roth |
| 2001/0027562 A1 | 10/2001 | Schein et al. |
| 2001/0029610 A1 | 10/2001 | Corvin et al. |
| 2001/0042246 A1 | 11/2001 | Yuen et al. |
| 2001/0047298 A1 | 11/2001 | Moore et al. |
| 2001/0049820 A1 | 12/2001 | Barton |
| 2001/0054181 A1 | 12/2001 | Corvin |
| 2002/0026496 A1 | 2/2002 | Boyer et al. |
| 2002/0032907 A1 | 3/2002 | Daniels |
| 2002/0042913 A1 | 4/2002 | Ellis et al. |
| 2002/0042914 A1 | 4/2002 | Walker et al. |
| 2002/0042918 A1 | 4/2002 | Townsend et al. |
| 2002/0049973 A1 | 4/2002 | Alten et al. |
| 2002/0056098 A1 | 5/2002 | White |
| 2002/0059599 A1 | 5/2002 | Schein et al. |
| 2002/0059602 A1 | 5/2002 | Macrae et al. |
| 2002/0073424 A1 | 6/2002 | Ward, III et al. |
| 2002/0078450 A1 | 6/2002 | Bennington et al. |
| 2002/0083439 A1 | 6/2002 | Eldering |
| 2002/0092017 A1 | 7/2002 | Klosterman et al. |
| 2002/0112249 A1 | 8/2002 | Hendricks et al. |
| 2002/0120933 A1 | 8/2002 | Knudson et al. |
| 2002/0124249 A1 | 9/2002 | Shintani et al. |
| 2002/0129368 A1 | 9/2002 | Schlack et al. |
| 2002/0138840 A1 | 9/2002 | Schein et al. |
| 2002/0153685 A1 | 10/2002 | Day |
| 2002/0171686 A1 | 11/2002 | Kamen et al. .................. 345/850 |
| 2002/0184626 A1 | 12/2002 | Darbee et al. |
| 2002/0194596 A1 | 12/2002 | Srivastava |
| 2003/0005432 A1 | 1/2003 | Ellis et al. |
| 2003/0005445 A1 | 1/2003 | Schein et al. |
| 2003/0031465 A1 | 2/2003 | Blake |
| 2003/0051241 A1 | 3/2003 | Klosterman et al. |
| 2003/0076347 A1 | 4/2003 | Barrett et al. .................. 345/719 |
| 2003/0110493 A1 | 6/2003 | Bennington et al. |
| 2003/0110494 A1 | 6/2003 | Bennington et al. |
| 2003/0110495 A1 | 6/2003 | Bennington et al. |
| 2003/0110499 A1 | 6/2003 | Knudson et al. |
| 2003/0115593 A1 | 6/2003 | Alten et al. |
| 2003/0115599 A1 | 6/2003 | Bennington et al. |
| 2003/0115602 A1 | 6/2003 | Knee et al. |
| 2003/0163813 A1 | 8/2003 | Klosterman et al. |
| 2003/0164858 A1 | 9/2003 | Klosterman et al. |
| 2003/0177494 A1 | 9/2003 | Satterfield et al. |
| 2003/0188310 A1 | 10/2003 | Klosterman et al. |
| 2003/0188311 A1 | 10/2003 | Yuen et al. |
| 2003/0196201 A1 | 10/2003 | Schein et al. |
| 2003/0196203 A1 | 10/2003 | Ellis et al. ....................... 725/39 |
| 2003/0204847 A1 | 10/2003 | Ellis et al. |
| 2003/0208756 A1 | 11/2003 | Macrae et al. |
| 2003/0208758 A1 | 11/2003 | Schein et al. |
| 2003/0208759 A1 | 11/2003 | Gordon et al. |
| 2004/0003407 A1 | 1/2004 | Hanafee et al. |
| 2004/0049787 A1 | 3/2004 | Maissel et al. |
| 2004/0078809 A1 | 4/2004 | Drazin |
| 2004/0078815 A1 | 4/2004 | Lemmons et al. |
| 2004/0103439 A1 | 5/2004 | Macrae et al. |
| 2004/0111742 A1 | 6/2004 | Hendricks et al. |
| 2004/0111745 A1 | 6/2004 | Schein et al. |
| 2004/0133910 A1 | 7/2004 | Gordon et al. |
| 2004/0139465 A1 | 7/2004 | Matthews et al. |
| 2004/0168188 A1 | 8/2004 | Bennington et al. |
| 2004/0168189 A1 | 8/2004 | Reynolds et al. |
| 2004/0194131 A1 | 9/2004 | Ellis et al. |
| 2004/0194138 A1 | 9/2004 | Boylan, III et al. |
| 2004/0210935 A1 | 10/2004 | Schein et al. |
| 2004/0221310 A1 | 11/2004 | Herrington et al. |
| 2005/0010949 A1 | 1/2005 | Ward et al. |
| 2005/0015804 A1 | 1/2005 | LaJoie et al. |
| 2005/0015815 A1 | 1/2005 | Shoff et al. |

(56) References Cited

U.S. PATENT DOCUMENTS

| | | |
|---|---|---|
| 2005/0028201 A1 | 2/2005 | Klosterman et al. |
| 2005/0097622 A1 | 5/2005 | Zigmond et al. |
| 2005/0138660 A1 | 6/2005 | Boyer et al. |
| 2005/0155056 A1 | 7/2005 | Knee et al. |
| 2005/0157217 A1 | 7/2005 | Hendricks |
| 2005/0198668 A1 | 9/2005 | Yuen et al. |
| 2005/0204382 A1 | 9/2005 | Ellis |
| 2005/0204388 A1 | 9/2005 | Knudson et al. |
| 2005/0216936 A1 | 9/2005 | Knudson |
| 2005/0229214 A1 | 10/2005 | Young et al. |
| 2005/0229215 A1 | 10/2005 | Schein et al. |
| 2005/0235320 A1 | 10/2005 | Maze et al. |
| 2005/0244138 A1 | 11/2005 | O'Connor et al. |
| 2005/0267819 A1 | 12/2005 | Kaplan |
| 2005/0278741 A1 | 12/2005 | Robarts et al. |
| 2005/0283796 A1 | 12/2005 | Flickinger |
| 2005/0283800 A1 | 12/2005 | Ellis et al. |
| 2006/0037044 A1 | 2/2006 | Daniels |
| 2006/0248555 A1 | 11/2006 | Eldering |
| 2006/0277574 A1 | 12/2006 | Schein et al. |
| 2007/0016926 A1 | 1/2007 | Ward et al. |
| 2007/0033613 A1 | 2/2007 | Ward et al. |
| 2007/0162934 A1 | 7/2007 | Roop et al. |
| 2007/0186240 A1 | 8/2007 | Ward et al. |
| 2007/0234393 A1 | 10/2007 | Walker et al. |
| 2007/0271582 A1 | 11/2007 | Ellis et al. |
| 2008/0066111 A1 | 3/2008 | Ellis et al. |
| 2008/0127263 A1 | 5/2008 | Klosterman et al. |
| 2008/0127264 A1 | 5/2008 | Klosterman et al. |
| 2008/0127265 A1 | 5/2008 | Ward et al. |
| 2008/0127266 A1 | 5/2008 | Ward et al. |
| 2008/0178216 A1 | 7/2008 | Bennington et al. |
| 2008/0178221 A1 | 7/2008 | Schein et al. |
| 2008/0178222 A1 | 7/2008 | Bennington et al. |
| 2008/0184296 A1 | 7/2008 | Alten et al. |
| 2008/0184305 A1 | 7/2008 | Schein et al. |
| 2008/0184308 A1 | 7/2008 | Herrington et al. |
| 2008/0184312 A1 | 7/2008 | Schein et al. |
| 2008/0184315 A1 | 7/2008 | Ellis et al. |
| 2008/0184319 A1 | 7/2008 | Mankovitz |
| 2008/0189744 A1 | 8/2008 | Schein et al. |
| 2008/0216111 A1 | 9/2008 | Alten et al. |
| 2008/0235725 A1 | 9/2008 | Hendricks |
| 2008/0288980 A1 | 11/2008 | Schein et al. |
| 2008/0301733 A1 | 12/2008 | Yuen et al. |
| 2009/0070817 A1 | 3/2009 | Ellis et al. |
| 2009/0077589 A1 | 3/2009 | Boyer et al. |
| 2009/0193458 A1 | 7/2009 | Finseth et al. |
| 2010/0115413 A1 | 5/2010 | Schein et al. |
| 2010/0115541 A1 | 5/2010 | Schein et al. |
| 2010/0211969 A1 | 8/2010 | Schein et al. |
| 2010/0211975 A1 | 8/2010 | Boyer et al. |
| 2010/0223643 A1 | 9/2010 | Yuen et al. |
| 2011/0035771 A1 | 2/2011 | Ward, III et al. |
| 2011/0173660 A1 | 7/2011 | Schein et al. |
| 2011/0185387 A1 | 7/2011 | Schein et al. |
| 2011/0209170 A1 | 8/2011 | Schein et al. |
| 2011/0258663 A1 | 10/2011 | Lemmons et al. |
| 2011/0276995 A1 | 11/2011 | Alten et al. |
| 2012/0272270 A1 | 10/2012 | Boyer et al. |

FOREIGN PATENT DOCUMENTS

| | | |
|---|---|---|
| AU | 700302 | 12/1998 |
| AU | 701683 | 2/1999 |
| AU | 733993 | 2/1999 |
| AU | 701683 | 5/1999 |
| AU | 705839 | 6/1999 |
| AU | 730507 | 3/2001 |
| AU | 731010 | 3/2001 |
| AU | 733993 | 5/2001 |
| AU | 743395 | 5/2002 |
| AU | 754696 | 11/2002 |
| AU | 760568 | 5/2003 |
| AU | 2003200576 | 5/2003 |
| AU | 762781 | 7/2003 |
| AU | 765648 | 9/2003 |
| AU | 2003/200576 | 4/2004 |
| AU | 2004/203044 | 7/2004 |
| AU | 2004203044 | 7/2004 |
| AU | 2005234652 | 12/2005 |
| AU | 2003/235076 | 3/2006 |
| AU | 2005/234652 | 7/2009 |
| BR | 9609120 | 8/1999 |
| BR | 9608903 | 9/1999 |
| CA | 1030505 | 5/1978 |
| CA | 1187197 | 5/1985 |
| CA | 1188811 | 6/1985 |
| CA | 1196082 | 10/1985 |
| CA | 1200911 | 2/1986 |
| CA | 2151458 | 6/1994 |
| CA | 2345161 | 6/1994 |
| CA | 2164608 | 12/1994 |
| CA | 2190744 | 11/1995 |
| CA | 2362627 | 11/1995 |
| CA | 2362630 | 11/1995 |
| CA | 2363051 | 11/1995 |
| CA | 2363052 | 11/1995 |
| CA | 2548637 | 11/1995 |
| CA | 2662685 | 11/1995 |
| CA | 2200348 | 3/1996 |
| CA | 2466894 | 10/1996 |
| CA | 2223018 | 12/1996 |
| CA | 2223057 | 12/1996 |
| CA | 2285645 | 7/1998 |
| CA | 2297039 | 1/1999 |
| CA | 2312326 | 6/1999 |
| CA | 2322217 | 9/1999 |
| CA | 2 329 069 | 11/1999 |
| CA | 2324278 | 11/1999 |
| CA | 2513282 | 11/1999 |
| CA | 2190744 | 5/2002 |
| CA | 2151458 | 2/2004 |
| CA | 2274560 | 6/2007 |
| CA | 2581116 | 9/2010 |
| CN | 1200221 | 11/1998 |
| CN | 1226030 | 8/1999 |
| CN | 1244990 | 2/2000 |
| CN | 1299553 | 6/2001 |
| CN | 1555191 | 12/2004 |
| CN | 1567986 | 1/2005 |
| DE | 29 18 846 | 11/1980 |
| DE | 2918846 | 11/1980 |
| DE | 3021203 | 12/1981 |
| DE | 31 51 492 | 7/1983 |
| DE | 32 46 225 | 6/1984 |
| DE | 3246225 | 6/1984 |
| DE | 33 37 204 | 4/1985 |
| DE | 3337204 | 4/1985 |
| DE | 35 27 939 | 2/1987 |
| DE | 36 21 263 | 1/1988 |
| DE | 3640436 | 6/1988 |
| DE | 3021203 | 7/1988 |
| DE | 3621263 | 7/1988 |
| DE | 3702220 | 8/1988 |
| DE | 39 09 334 | 9/1990 |
| DE | 3909334 | 9/1990 |
| DE | 4143074 | 7/1992 |
| DE | 4201031 | 7/1993 |
| DE | 4217246 | 12/1993 |
| DE | 4240187 | 6/1994 |
| DE | 4407701 | 9/1995 |
| DE | 4437928 | 10/1995 |
| DE | 4427046 | 2/1996 |
| DE | 4440419 | 5/1996 |
| DE | 19 53 1121 A1 | 2/1997 |
| DE | 19531121 A1 | 2/1997 |
| DE | 4437928 | 10/1998 |
| DE | 19 74 0079 A1 | 3/1999 |
| DE | 19740079 A1 | 3/1999 |
| DE | 19749979 A1 | 3/1999 |
| DE | 19 93 1046 | 1/2001 |
| DE | 19931046 | 1/2001 |

(56) References Cited

FOREIGN PATENT DOCUMENTS

| | | |
|---|---|---|
| DE | 69723999 | 6/2004 |
| DE | 4290947 | 11/2006 |
| EA | 0 536 901 | 4/1993 |
| EP | 0723369 | 8/1942 |
| EP | 0 072 153 | 2/1983 |
| EP | 0 148 733 | 7/1985 |
| EP | 0222025 | 5/1987 |
| EP | 0229526 | 7/1987 |
| EP | 0 239 884 | 10/1987 |
| EP | 0276425 | 8/1988 |
| EP | 0 337 336 | 10/1989 |
| EP | 0 408 892 | 1/1990 |
| EP | 0 393 555 | 10/1990 |
| EP | 0 396 062 | 11/1990 |
| EP | 0 401 930 | 12/1990 |
| EP | 0 408 892 | 1/1991 |
| EP | 0 420 123 | 4/1991 |
| EP | 0 424 648 | 5/1991 |
| EP | 0 424 648 A2 | 5/1991 |
| EP | 0 424 648 A3 | 5/1991 |
| EP | 0 424648 A2 | 5/1991 |
| EP | 0 444 496 B1 | 9/1991 |
| EP | 0 447 968 A2 | 9/1991 |
| EP | 0 463 451 | 1/1992 |
| EP | 0 477 754 | 4/1992 |
| EP | 0 477 756 | 4/1992 |
| EP | 0 489 387 | 6/1992 |
| EP | 0488379 | 6/1992 |
| EP | 0 492 853 | 7/1992 |
| EP | 0497235 | 8/1992 |
| EP | 0 532 322 | 3/1993 |
| EP | 0 536 828 | 4/1993 |
| EP | 0 550 911 | 7/1993 |
| EP | 0 554 577 | 8/1993 |
| EP | 0 554 577 A1 | 8/1993 |
| EP | 0554577 | 8/1993 |
| EP | 0554577 A1 | 8/1993 |
| EP | 0 560 593 A2 | 9/1993 |
| EP | 0 572 090 B | 12/1993 |
| EP | 0 575 956 | 12/1993 |
| EP | 0 339 675 | 2/1994 |
| EP | 0617563 | 9/1994 |
| EP | 0620689 | 10/1994 |
| EP | 0624039 | 11/1994 |
| EP | 0624040 | 11/1994 |
| EP | 0 644 689 | 3/1995 |
| EP | 0 650 114 | 4/1995 |
| EP | 0 658 048 | 6/1995 |
| EP | 0673164 | 9/1995 |
| EP | 0 682 452 B1 | 11/1995 |
| EP | 0682452 A2 | 11/1995 |
| EP | 0 705 036 | 3/1996 |
| EP | 0721253 | 7/1996 |
| EP | 0 725 539 | 8/1996 |
| EP | 0742669 | 11/1996 |
| EP | 0 752 767 A2 | 1/1997 |
| EP | 0 753 964 | 1/1997 |
| EP | 0 753 964 A1 | 1/1997 |
| EP | 0 762 751 | 3/1997 |
| EP | 0 762 751 A3 | 3/1997 |
| EP | 0 772 360 A2 | 5/1997 |
| EP | 0 774 853 | 5/1997 |
| EP | 0 774 868 | 5/1997 |
| EP | 0 775 417 B1 | 5/1997 |
| EP | 0774866 | 5/1997 |
| EP | 0775417 | 5/1997 |
| EP | 0 784 405 A2 | 7/1997 |
| EP | 0 793 225 | 9/1997 |
| EP | 0 805 594 | 11/1997 |
| EP | 0 805 594 B1 | 11/1997 |
| EP | 0806111 | 11/1997 |
| EP | 0 822 718 | 2/1998 |
| EP | 0 822 718 A1 | 2/1998 |
| EP | 0 880 856 B1 | 2/1998 |
| EP | 0 784 405 A3 | 3/1998 |
| EP | 0 827 340 A2 | 3/1998 |
| EP | 0830787 | 3/1998 |
| EP | 0 834 798 | 4/1998 |
| EP | 0 836 321 | 4/1998 |
| EP | 0837599 | 4/1998 |
| EP | 0 848 554 A2 | 6/1998 |
| EP | 0 849 948 A2 | 6/1998 |
| EP | 0 851 681 | 7/1998 |
| EP | 0 851 681 A1 | 7/1998 |
| EP | 0 852 442 A2 | 7/1998 |
| EP | 0 854 645 A2 | 7/1998 |
| EP | 0 854 654 | 7/1998 |
| EP | 0852361 | 7/1998 |
| EP | 0856227 | 8/1998 |
| EP | 0 892 554 | 1/1999 |
| EP | 0 905 985 A2 | 3/1999 |
| EP | 0 924 927 A2 | 6/1999 |
| EP | 0 935 393 | 8/1999 |
| EP | 0 935 393 A2 | 8/1999 |
| EP | 0 944 253 A1 | 9/1999 |
| EP | 0945003 | 9/1999 |
| EP | 0 963 119 A1 | 12/1999 |
| EP | 0 988 876 | 3/2000 |
| EP | 1 036 466 | 9/2000 |
| EP | 1 076 994 | 2/2001 |
| EP | 1 095 504 B1 | 5/2001 |
| EP | 1152605 | 11/2001 |
| EP | 0 822 718 B1 | 6/2002 |
| EP | 1213919 | 12/2002 |
| EP | 1361751 | 11/2003 |
| EP | 1 408 685 | 4/2004 |
| EP | 1 763 234 | 3/2007 |
| EP | 1763234 | 3/2007 |
| FR | 2662805 | 12/1991 |
| FR | 2662895 | 12/1991 |
| FR | 2726718 | 5/1996 |
| GB | 1 554 411 | 10/1979 |
| GB | 2034995 | 6/1980 |
| GB | 2126002 | 3/1984 |
| GB | 2185670 | 7/1987 |
| GB | 2217144 | 10/1989 |
| GB | 2256546 | 12/1992 |
| GB | 2 264 409 | 8/1993 |
| GB | 2265792 | 10/1993 |
| GB | 2 275 585 | 8/1994 |
| GB | 2305049 | 3/1997 |
| GB | 2309134 A | 7/1997 |
| GB | 87/00884 | 6/1998 |
| GB | 2325537 | 11/1998 |
| HK | 1061496 | 9/1997 |
| HK | 1023018 | 5/2004 |
| HK | 1013781 | 2/2005 |
| HK | 1035285 | 3/2005 |
| JP | 5456857 | 5/1979 |
| JP | 58/137334 | 8/1983 |
| JP | 58-137334 | 8/1983 |
| JP | 58-137344 | 8/1983 |
| JP | 58137344 | 8/1983 |
| JP | 58-196738 | 11/1983 |
| JP | 58/196738 | 11/1983 |
| JP | 58-210776 A | 12/1983 |
| JP | 58 210776 A | 12/1983 |
| JP | 58-219776 A | 12/1983 |
| JP | 59123670 | 7/1984 |
| JP | 59-141878 | 8/1984 |
| JP | 59/141878 | 8/1984 |
| JP | 59138461 | 8/1984 |
| JP | 60/061935 | 4/1985 |
| JP | 60-061935 | 4/1985 |
| JP | 6071260 | 4/1985 |
| JP | 61/050470 | 3/1986 |
| JP | 61-050470 | 3/1986 |
| JP | 61/074476 | 4/1986 |
| JP | 61-074476 | 4/1986 |
| JP | 62/060370 | 3/1987 |
| JP | 62-060370 | 3/1987 |
| JP | 62-060372 | 3/1987 |
| JP | 62-060384 | 3/1987 |
| JP | 62/060384 | 3/1987 |

(56) References Cited

FOREIGN PATENT DOCUMENTS

| | | |
|---|---|---|
| JP | 6392177 | 4/1988 |
| JP | 63 234679 A | 9/1988 |
| JP | 10-42235 | 2/1989 |
| JP | 10-93933 | 4/1989 |
| JP | 01-307944 | 12/1989 |
| JP | 01/307944 | 12/1989 |
| JP | 2838892 | 12/1989 |
| JP | 02/048879 | 2/1990 |
| JP | 02-048879 | 2/1990 |
| JP | 02-119307 | 5/1990 |
| JP | 02-189753 | 7/1990 |
| JP | 3-22770 | 1/1991 |
| JP | 03063990 | 3/1991 |
| JP | 03-167975 | 7/1991 |
| JP | 3-178278 | 8/1991 |
| JP | 03-214919 | 9/1991 |
| JP | 03-243076 | 10/1991 |
| JP | 04-44475 | 2/1992 |
| JP | 04079053 | 3/1992 |
| JP | 04-162889 | 6/1992 |
| JP | 04-180480 | 6/1992 |
| JP | 04-227380 | 8/1992 |
| JP | 04/227380 | 8/1992 |
| JP | 4-335395 | 11/1992 |
| JP | 05-103281 | 4/1993 |
| JP | 05-122692 | 5/1993 |
| JP | 05-183826 | 7/1993 |
| JP | 05/183826 | 7/1993 |
| JP | 05-284437 | 10/1993 |
| JP | 05/284437 | 10/1993 |
| JP | 05260400 | 10/1993 |
| JP | 05-314186 | 11/1993 |
| JP | 06-021907 | 1/1994 |
| JP | 06/021907 | 1/1994 |
| JP | 06038165 | 2/1994 |
| JP | 06-124309 | 5/1994 |
| JP | 06-133235 | 5/1994 |
| JP | 06-141250 | 5/1994 |
| JP | 06504165 | 5/1994 |
| JP | 06-217271 | 8/1994 |
| JP | 06243539 | 9/1994 |
| JP | 06-295312 | 10/1994 |
| JP | 06-350546 | 12/1994 |
| JP | 07-20254 | 1/1995 |
| JP | 07-020254 | 1/1995 |
| JP | 07/020254 | 1/1995 |
| JP | 07-021619 | 1/1995 |
| JP | 07-050259 | 2/1995 |
| JP | 07/050259 | 2/1995 |
| JP | 07/076592 | 3/1995 |
| JP | 07-076592 | 3/1995 |
| JP | 07-23356 | 4/1995 |
| JP | 07-123326 | 5/1995 |
| JP | 07/123326 | 5/1995 |
| JP | 07-135621 | 5/1995 |
| JP | 07135621 | 5/1995 |
| JP | 5-339100 | 6/1995 |
| JP | 07-147657 | 6/1995 |
| JP | 07/147657 | 6/1995 |
| JP | 07-162776 | 6/1995 |
| JP | 07154349 | 6/1995 |
| JP | 07160732 | 6/1995 |
| JP | 07-193763 | 7/1995 |
| JP | 07184131 | 7/1995 |
| JP | 07193762 | 7/1995 |
| JP | 07-212732 | 8/1995 |
| JP | 07-262200 | 10/1995 |
| JP | 07-284033 | 10/1995 |
| JP | 07-288759 | 10/1995 |
| JP | 07/288759 | 10/1995 |
| JP | 07-321748 | 12/1995 |
| JP | 07/321748 | 12/1995 |
| JP | 08/32528 | 2/1996 |
| JP | 08-32528 | 2/1996 |
| JP | 08-32538 | 2/1996 |
| JP | 08-32538 | 2/1996 |
| JP | 08-032538 | 2/1996 |
| JP | 8-56352 | 2/1996 |
| JP | 08044268 | 2/1996 |
| JP | 8 111823 | 4/1996 |
| JP | 8-111823 | 4/1996 |
| JP | 08/125497 | 5/1996 |
| JP | 08-125497 | 5/1996 |
| JP | 8-137334 | 5/1996 |
| JP | 8-506469 | 7/1996 |
| JP | 08506941 | 7/1996 |
| JP | 8-196738 | 8/1996 |
| JP | 08-234709 | 9/1996 |
| JP | 08-251122 | 9/1996 |
| JP | 08/251122 | 9/1996 |
| JP | 08-275077 | 10/1996 |
| JP | 08/275077 | 10/1996 |
| JP | 08-289281 | 11/1996 |
| JP | 08-331546 | 12/1996 |
| JP | 09-009244 | 1/1997 |
| JP | 9-009245 | 1/1997 |
| JP | 09-037151 | 2/1997 |
| JP | 09-37168 | 2/1997 |
| JP | 09-037171 | 2/1997 |
| JP | 09/037172 | 2/1997 |
| JP | 09-037172 | 2/1997 |
| JP | 0903751 | 2/1997 |
| JP | 9-070020 | 3/1997 |
| JP | 09/102827 | 4/1997 |
| JP | 09-102827 | 4/1997 |
| JP | 09-114781 | 5/1997 |
| JP | 9-141878 | 6/1997 |
| JP | 09-162818 | 6/1997 |
| JP | 09-162821 | 6/1997 |
| JP | 09-244475 | 9/1997 |
| JP | 09-247565 | 9/1997 |
| JP | 09-261609 | 10/1997 |
| JP | 10-042218 | 2/1998 |
| JP | 10-501936 | 2/1998 |
| JP | 10-143340 | 5/1998 |
| JP | 10-143349 | 5/1998 |
| JP | 10-512420 | 11/1998 |
| JP | 2838892 | 12/1998 |
| JP | 11259248 | 9/1999 |
| JP | 2001/213595 | 8/2001 |
| JP | 2001-213595 | 8/2001 |
| JP | 2001-513595 | 9/2001 |
| JP | 3228754 | 11/2001 |
| JP | 2000-535142 | 2/2002 |
| JP | 2002-506328 | 2/2002 |
| JP | 2000-546525 | 5/2002 |
| JP | 2002-513255 | 5/2002 |
| JP | 2002/279969 | 9/2002 |
| JP | 2002-279969 | 9/2002 |
| JP | 2003-189200 | 7/2003 |
| JP | 4083525 | 7/2003 |
| JP | 2003-98580 | 9/2003 |
| JP | 2003-264750 | 9/2003 |
| JP | 3512195 | 3/2004 |
| JP | 2005-102342 | 4/2005 |
| JP | 2007-184947 | 7/2007 |
| JP | 4062577 | 3/2008 |
| JP | 04-340258 | 10/2009 |
| JP | 4-340258 | 10/2009 |
| JP | 4382116 | 12/2009 |
| JP | 4415032 | 2/2010 |
| JP | 4415033 | 2/2010 |
| JP | 4415034 | 2/2010 |
| JP | 4512618 | 7/2010 |
| JP | 4564839 | 10/2010 |
| TW | 306099 | 5/1997 |
| WO | WO 86/01359 | 2/1986 |
| WO | WO 86/01962 | 3/1986 |
| WO | WO 87/03766 | 6/1987 |
| WO | WO 88/04057 | 6/1988 |
| WO | WO 88/04507 | 6/1988 |
| WO | WO 89/02682 | 3/1989 |
| WO | WO 89-03085 | 4/1989 |
| WO | WO 89/03085 | 4/1989 |

(56) References Cited

FOREIGN PATENT DOCUMENTS

| | | |
|---|---|---|
| WO | WO 89/12370 | 12/1989 |
| WO | WO 90/01243 | 2/1990 |
| WO | WO 90/15507 | 12/1990 |
| WO | WO 91/00670 | 1/1991 |
| WO | WO 91/05436 | 4/1991 |
| WO | WO 91/06367 | 5/1991 |
| WO | WO 91/00670 | 11/1991 |
| WO | WO 91/18476 | 11/1991 |
| WO | WO 92/04801 | 3/1992 |
| WO | WO 92/06367 | 4/1992 |
| WO | WO 93/04473 | 3/1993 |
| WO | WO 93/05452 | 3/1993 |
| WO | WO 93/11638 | 6/1993 |
| WO | WO 93/11639 | 6/1993 |
| WO | WO 93/11640 | 6/1993 |
| WO | WO 93/23957 | 11/1993 |
| WO | WO 94/1 31 07 | 6/1994 |
| WO | WO 94/13107 | 6/1994 |
| WO | WO 94/14280 | 6/1994 |
| WO | WO 94/14281 | 6/1994 |
| WO | WO 94/14282 | 6/1994 |
| WO | WO 94/14283 | 6/1994 |
| WO | WO 94/14284 | 6/1994 |
| WO | WO 94/15284 | 7/1994 |
| WO | WO 94/16441 | 7/1994 |
| WO | WO 94/21085 | 9/1994 |
| WO | WO 94/23383 | 10/1994 |
| WO | WO 94/29811 | 12/1994 |
| WO | PCT/US95/1059 | 1/1995 |
| WO | WO 95/01056 | 1/1995 |
| WO | WO 95-01056 | 1/1995 |
| WO | WO 95/01057 | 1/1995 |
| WO | WO 95/01058 | 1/1995 |
| WO | WO 95/01059 | 1/1995 |
| WO | WO 95/02945 | 1/1995 |
| WO | WO 95/06389 | 3/1995 |
| WO | WO 95/07003 | 3/1995 |
| WO | WO 95/10910 | 4/1995 |
| WO | WO 95/15649 | 6/1995 |
| WO | WO 95/15657 | 6/1995 |
| WO | WO 95/15658 | 6/1995 |
| WO | WO 95/16568 | 6/1995 |
| WO | WO 95/19092 A1 | 7/1995 |
| WO | WO 95/26095 | 9/1995 |
| WO | WO 95/26608 | 10/1995 |
| WO | WO 95/28055 | 10/1995 |
| WO | WO 95/28799 | 10/1995 |
| WO | WO 95/30961 | 11/1995 |
| WO | WO 95/31069 | 11/1995 |
| WO | WO 95/32583 | 11/1995 |
| WO | WO 95/32585 | 11/1995 |
| WO | WO 95/32587 | 11/1995 |
| WO | WO 95/32957 | 11/1995 |
| WO | WO 96/081 13 | 3/1996 |
| WO | WO 96/07270 | 3/1996 |
| WO | WO 96-07270 | 3/1996 |
| WO | WO 96/07270 A | 3/1996 |
| WO | WO 96/08109 | 3/1996 |
| WO | WO 96/08113 | 3/1996 |
| WO | WO 96/09721 | 3/1996 |
| WO | WO 96107270 | 3/1996 |
| WO | WO 96/13013 | 5/1996 |
| WO | WO 96/13932 A1 | 5/1996 |
| WO | WO 96/13935 | 5/1996 |
| WO | WO 96/17467 | 6/1996 |
| WO | WO 96/17473 | 6/1996 |
| WO | WO 96/20555 | 7/1996 |
| WO | WO 96/21990 | 7/1996 |
| WO | WO 96/26605 | 8/1996 |
| WO | WO 96/27270 | 9/1996 |
| WO | WO 96/27982 | 9/1996 |
| WO | WO 96/27989 | 9/1996 |
| WO | WO 96/31980 | 10/1996 |
| WO | WO 96/34467 | 10/1996 |
| WO | WO 96/34486 | 10/1996 |
| WO | WO 96/34491 | 10/1996 |
| WO | WO 96/37983 | 11/1996 |
| WO | WO 96/37996 | 11/1996 |
| WO | WO 96/38799 | 12/1996 |
| WO | WO 96/38962 | 12/1996 |
| WO | WO 96/41471 | 12/1996 |
| WO | WO 96/41477 | 12/1996 |
| WO | WO 96/41478 | 12/1996 |
| WO | WO 97/02702 | 1/1997 |
| WO | WO 97/04595 | 2/1997 |
| WO | WO 97/07656 | 3/1997 |
| WO | WO 97/12486 | 4/1997 |
| WO | WO 97/013368 | 4/1997 |
| WO | WO 97/17774 | 5/1997 |
| WO | WO 97/18675 | 5/1997 |
| WO | WO 97/19555 | 5/1997 |
| WO | WO 97/26612 | 7/1997 |
| WO | WO 97/29458 | 8/1997 |
| WO | WO 97/31480 | 8/1997 |
| WO | WO 97/34414 | 9/1997 |
| WO | WO 97/36422 | 10/1997 |
| WO | WO 97/41673 | 11/1997 |
| WO | WO 97/42763 | 11/1997 |
| WO | WO 97/45786 | 12/1997 |
| WO | WO 97/47106 | 12/1997 |
| WO | WO 97/47143 | 12/1997 |
| WO | WO 97/48230 | 12/1997 |
| WO | WO 97/49237 | 12/1997 |
| WO | WO 97/49241 | 12/1997 |
| WO | WO 97/49242 | 12/1997 |
| WO | WO 97/50251 | 12/1997 |
| WO | WO 98/00975 | 1/1998 |
| WO | WO 98/00976 | 1/1998 |
| WO | WO 98/06219 | 2/1998 |
| WO | WO 98/10589 | 3/1998 |
| WO | WO 98/16062 | 4/1998 |
| WO | WO 98/17063 | 4/1998 |
| WO | WO 98/17064 | 4/1998 |
| WO | WO 98/20675 | 5/1998 |
| WO | WO 98/21664 | 5/1998 |
| WO | WO 98/21877 | 5/1998 |
| WO | WO 98/26569 | 6/1998 |
| WO | WO 98/26584 | 6/1998 |
| WO | WO 98/27723 | 6/1998 |
| WO | WO 98/28906 | 7/1998 |
| WO | WO 98/31148 | 7/1998 |
| WO | WO 98/37695 | 8/1998 |
| WO | WO 98/39893 | 9/1998 |
| WO | WO 98/41020 | 9/1998 |
| WO | WO 98/43183 | 10/1998 |
| WO | WO 98/47279 | 10/1998 |
| WO | WO 98/48566 | 10/1998 |
| WO | WO 98/56172 | 12/1998 |
| WO | WO 98/56173 | 12/1998 |
| WO | WO 98/56176 | 12/1998 |
| WO | WO 98/56712 | 12/1998 |
| WO | WO 99/01984 | 1/1999 |
| WO | WO 99/04561 | 1/1999 |
| WO | WO 99/04570 | 1/1999 |
| WO | WO 99/07142 | 2/1999 |
| WO | WO 99/14947 | 3/1999 |
| WO | WO 99/18722 | 4/1999 |
| WO | WO 99/22502 | 5/1999 |
| WO | WO 99/29109 | 6/1999 |
| WO | WO 99/30491 | 6/1999 |
| WO | WO 99/31480 | 6/1999 |
| WO | WO 99/39280 | 8/1999 |
| WO | WO 99/45700 | 9/1999 |
| WO | WO 99/45701 | 9/1999 |
| WO | WO 99/45702 | 9/1999 |
| WO | WO 99/52285 | 10/1999 |
| WO | WO 99/56466 | 11/1999 |
| WO | WO 99/56473 | 11/1999 |
| WO | WO 99/60783 | 11/1999 |
| WO | WO 99/60789 | 11/1999 |
| WO | WO 00/02380 | 1/2000 |
| WO | WO 00/04706 | 1/2000 |
| WO | WO 00/04708 | 1/2000 |
| WO | WO 00/04709 | 1/2000 |

(56) References Cited

FOREIGN PATENT DOCUMENTS

| | | |
|---|---|---|
| WO | WO 00/05889 | 2/2000 |
| WO | WO 00/11865 | 3/2000 |
| WO | WO 00/13415 | 3/2000 |
| WO | WO 00/16548 | 3/2000 |
| WO | WO 00/27122 | 5/2000 |
| WO | WO 00/28734 | 5/2000 |
| WO | WO 00/33160 | 6/2000 |
| WO | WO 00/33224 | 6/2000 |
| WO | WO 00/33560 | 6/2000 |
| WO | WO 00/33573 | 6/2000 |
| WO | WO 00/49801 | 8/2000 |
| WO | WO 00/79798 | 12/2000 |
| WO | WO 01/01677 | 1/2001 |
| WO | WO 01/06784 | 1/2001 |
| WO | WO 01/15438 | 3/2001 |
| WO | WO 01/19086 | 3/2001 |
| WO | WO 01/35662 | 5/2001 |
| WO | WO 01/46869 | 6/2001 |
| WO | WO 01/50743 | 7/2001 |
| WO | WO 01/58158 | 8/2001 |
| WO | WO 01/75649 | 10/2001 |
| WO | WO 01/89213 | 11/2001 |
| WO | WO 02/31731 | 4/2002 |
| WO | WO 02/084992 | 10/2002 |
| WO | WO 95/01056 | 1/2005 |
| WO | WO 2005/027512 | 3/2005 |

OTHER PUBLICATIONS

U.S. Appl. No. 09/217,100, filed Dec. 16, 1998, Reynolds et al.
U.S. Appl. No. 09/330,792, filed Jun. 11, 1999, Knudson et al.
U.S. Appl. No. 09/332,244, filed Jun. 11, 1999, Ellis et al.
U.S. Appl. No. 09/356,268, filed Jul. 16, 1999, Rudnick et al.
"272OR Satellite Receiver User's Guide," General Instrument, 1991, pp. 58/61.
"Addressable Converters: A New Development at CableData," Via Cable, vol. 1, No. 12, Dec. 1981.
"Bell Atlantic Buys Cable TV Company for $22bn," Financial Times (London), Oct. 14, 1993 p. 65.
"Cable Television Equipment," Jerrold Communications Publication, dated 1992 and 1993, pp. 8/2.1 to 8/6 and 8/14.1 to 8/14.3.
"Computer Network: Current Status and Outlook on Leading Science and Technology," Bureau of Science & Technology (Japan), vol. 1, Dec. 1986.
Creation/Modification of the Audio Signal Processor Setup for a PC Audio Editor, IBM Technical Disclosure Bulletin, vol. 30, No. 10, Mar. 1988, pp. 367/376.
"D2B/Home Bus Fur Audio and Video," Selektor, Apr. 1990, pp. 10, 12.
"Dial M for Movie", Funkschau 11/94 Perspektiven, Video on Demand, pp. 78/79. (English language translation attached).
"Digital Video Broadcasting (DVD); DVB specification for data broadcasting," European Telecommunication Standards Institute, Draft EN 301 192 V1.2.1 (Jan. 1999).
"Duck Tales,'(1987)[TV Series 1987/1990]," Internet Movie Database (IMDB) [Retrieved on Apr. 7, 2007].
"Enhanced Content Specification," "ATVEF," from the internet at http://www.atvef.com/library/spec.html, printed Aug. 22, 2001, the document bears a Copyright date of 1998, 1999, 2000.
"European Telecommunications Standards: Digital Broadcasting Systems for Television Sound and Data Services; Specification for Service Information (SI) in Digital Video Broadcasting (DVB) Systems," European Telecommunications Standards Institute, Dec. 1994.
"Facsimile Transmission," NHK Research Monthly Report, Dec. 1987(Unknown author).
"Interactive Computer Conference Server," IBM Technical Bulletin, vol. 34, No. 7A, Dec. 1991, pp. 375/377.
"Interface Device for Conventional TVs to Improve Functionality," IBM Technical Disclosure Bulletin, vol. 36, No. 7, Jul. 1993, pp. 53/54.
"Lists> What's On Tonite! TV Listings (fwd)," Internet article (On line), Jan. 28, 1995, XP 002378869 [Retrieved on Apr. 28, 2006].
"MSI Datacasting Systems," TV Communications Journal, Jan. 1973.
"Open TV fur interaktives Fernsehen," Trend and Technik, 9/95 RFE, p. 100. (English language translation attached).
"Open TV Launches OpenStreamer™ Technology for Broadcasters to Deliver First Ever Real/Time Digital Interactive Television," from the internet at http://www.opentv.com/news/openstreamer_press_final.htm, printed on Jun. 28, 1999, the document bears a copyright date of 1999.
"Prevue Networks and OpenTV(R) Agree to Work Together on Deploying Interactive Program Guides Worldwide," from the internet at http://www.opentv.com/news/prevuefinal.htm, printed on Jun. 28, 1999.
"Rewind, reply and unwind with new high/tech TV devices," by Lawrence J. Magid, LA Times. This document was printed from the internet on Jun. 6, 1999 and bears a date of May 19, 1999.
"Technological Examination & Basic Investigative Research Report on Image Databases," Japan Mechanical Engineering Organization Int'l Society for the Advancement of Image Software, Japan, Mar. 1988.
"Technology: Turn on, tune in and print out—An experimental interactive television service is set to alter our viewing habits," Financial Times (London), Oct. 14, 1993, p. 11.
The New Media and Broadcast Policy: An Investigation & Research Conference Report on Broadcasting Diversifiation, Radio Regulatory Bureau, Japan Ministry of Posts & Telecommunications, Mar. 1982.
"Windows 98 Feature Combines TV, Terminal and the Internet," New York Times, Aug. 18, 1998.
"Prodigy Launches Interactive TV Listing", Apr. 22, 1994 public Broadcasting Report.
"StarSight Interactive Television Program Guide III" Jim Leftwich, Willy Lai & Steve Schein, Functional/ Interactional Architecture Specification Document, Orbit Interaction, Palo alto, California, Published before Apr. 19, 1995.
"StarSight Interactive Television Program Guide IV" Jim Leftwich, Willy Lai & Steve Schein, Functional/ Interactional Architecture Specification Document, Orbit Interaction, Palo Alto, California, Published before Apr. 19, 1995.
"TV Guide Online Set for Fall", Entertainment Marketing Letter, Aug. 1994.
Advertisement for "TV Decisions," Cable Vision, Aug. 4, 1986.
Alexander, Michael "Visualizing cleared/off desktops," Computerworld, May 6, 1991, p. 20.
Antonoff, M., "Stay Tuned for Smart TV," Popular Science, Nov. 1990, pp. 62/65.
Baer, R.H, "Innovative Add/On TV Products," IEEE Transactions on Consumer Electronics, vol. CE/25, Nov. 1979, pp. 765/771.
Bensch, U., "VPV Videotext Programs Videorecorder," IEEE Paper, Jun. 1988, pp. 788/792.
Bestler, Caitlin "Flexible Data Structures and Interface Rituals for Rapid Development of OSD Applications," Proceedings from the Eleven Technical Sessions, 42nd Annual Convention and Exposition and Exploration of the NCTA, San Francisco, CA Jun. 6/9, 1993, pp. 223/236. Jun. 6, 1993.
Brochure, "Westar and Videotoken Network Present The CableComputer," Revised Aug. 15, 1985 (Plainitffs 334).
Brochure, VTN "Videotoken Network, New Dimension Television," Dec. 1985 (Plaintiffs Exhibit 313).
Brugliera, Vito., "Digital On/Screen Display—A New Technology for the Consumer Interface," Symposium Record Cable TV Sessions of the 18th International Television Symposium & Technical Exhibition / Montreux, Switzerland, Jun. 10/15, 1993, pp. 571/586.
Cable Computer User's Guide, Rev. 1, Dec. 1985 (Plaintiffs Exhibit 289).
CableData, Roseville Consumer Presentation, Mar. 1985.
Carne, E.B., "The Wired Household," IEEE Spectrum, vol. 16 No. 10, Oct. 1979, pp. 61/66.
Chan, Patrick P., "Learning Considerations In User Interface Design: The Room Model," Publication of the Software Portability Laboratory, University of Waterloo, Ontario, Canada, Jul. 1984.

(56) References Cited

OTHER PUBLICATIONS

Christodoulakis, Steven and Graham, Stephen "Browsing Within Time/Driven Multimedia Documents," publication of the Institute for Computer Research, University of Waterloo, Waterloo, Ontario, Canada Jul. 1988 pp. 219/227.
Cox, J. et al., "Extended Services in A Digital Compression System," Proceedings from Eleven Technical Sessions: 42nd Annual Convention and Exposition of the National Cable Television Association, Jun. 1993, pp. 185/191.
Damouny, N. G., "Teletext Decoders-Keeping Up With the Latest Advances," IEEE Transactions on Consumer Electronics, vol. CE/30, No. 3, Aug. 1984, pp. 429/435.
DiRosa, S. "BIGSURF Netguide", Jul. 1995, vol. 3.1 (Sections 18,21, and 28—renumbered as pp. 1/27).
Edwardson, S.M., & Gee, A., "CEEFAX: A Proposed New Broadcasting Service," Journal of the SMPTE, Jan. 1974, vol. 83 No. 1, pp. 14/19.
Eitz, Gerhard, "Zukünftige Informations/und Datenangebote beim digitalen Femsehen-EPG Und 'Lesezeichen'," RTM Rundfunktechnische Mitteilungen, Jun. 1997, vol. 41, pp. 67/72.
European Telecommunication Standard, "Electronic Programme Guide (EPG); Protocol for a TV Guide using electronic data transmission," pp. 1/45, sections 1/11.12.7 and annex A/P, bearing a date of May 1997.
Hartwig, Rautenberg, Bollmann, "Broadcasting and Processing of Program Guides for Digital TV," SMPTE Journal, pp. 727/732, Oct. 1997.
Hedger, J., "Telesoftware: Home Computing Via Broadcast Teletext," IEEE Transactions on Consumer Electronics, vol. CE/25, No. 3, Jul. 1979, pp. 279/287.
Hiroshi Ishii et al., "Clearface: Translucent Multiuser Interface for TeamWorkStation," ECSCW, Sep. 1991, pp. 6/10.
Hiroshi Ishii et al., "Toward an Open Shared Workspace: Computer and Video Fusion Approach of Team Workstation," Communications of the ACM, Dec. 1991, vol. 34 No. 12, pp. 37/50.
Hirotada Ueda et al., "Impact: An Interacive Natural/Motion/Picture Dedicated Multi/Media Authoring System," Communications of the ACM, Mar. 1991, pp. 343/350.
Hofmann, Neumann, Oberlies & Schadwinkel, "Videotext Programmiert Videorecorder," Rundfunktechnischen Mitteilungen, (Broadcast Engineering Reports), vol. 26 No. 6, pp. 254/257, Nov./Dec. 1982.
Instruction Manual, "Using StarSight 2," StarSight Telecast, Inc., Starsight CB 1500 Customer Letter, 1994.
James, A., "Oracle //Broadcasting the Written Word," Wireless World, Jul. 1973, vol. 79 No. 1453, pp. 314/316.
Judice, C.N., "Move Over Cable, Here Comes Video Via Voice Lines," Network World, Sep. 1986, p. 26.
Karstad, K.,"Microprocessor Control for Color/TV Receivers," IEEE Transactions on Consumer Electronics, vol. CE/26, May 1980, pp. 149/155.
Kornhaas, W., "Von der Textprogrammierung uber TOP zum Archivsystem," Radio Fernsehen Elektronik, vol. 40, No. 8, Aug. 30, 1991, pp. 465/468, XP 000240875 Veb Verlag Technik. Berlin, DE ISSN: 1436/1574.
Listing of computer code for operating system within the Cable Computer in 1985 (Plaintiff's Exhibit 298).
Lowenstein, R.L. and Aller, H.E., "The Inevitable March of Videotex," Technology Review, vol. 88, Oct. 1985, p. 22.
M/A/COM, Inc., "Videocipher II Satellite Descrambler Owner's Manual," dated Prior Feb. 1986, pp. 1/17.
Mack Daily, "Addressable Decoder with Downloadable Operation," Proceedings from the Eleven Technical Sessions, 42nd Annual Convention and Exposition of the NCTA, Jun. 6/9, 1993, pp. 82/89.
Mannes, G., "Smart Screens: Development of Personal Navigation Systems for TV Viewers," Video Magazine, Dec. 1993.
Mar. 19, 1985 letter from G. Knapp of CableData to R. Hansen of Weststar Communications, Inc. (Plaintiff's Exhibit 325).
Markowitz, A. "Companies Jump on Interactive Bandwagon," Discount Store News, Dec. 6, 1993, pp. 4 and 131.
McKenzie, G.A., "Oracle -/ An Information Broadcasting Service Using Data Transmission in the Vertical Interval," Journal of the SMPTE, Jan. 1974, vol. 83 No. 1, pp. 6/10.
Merrell, R.G., "Tac Timer," 1986 NCTA Technical Papers, pp. 203/206.
Neumann, Andreas, "WDR Online Aufbau and Perspektiven Automatisierter Online/Dienste im WDR," RTM Rundfunktechnische Mitteilungen, vol. 41, pp. 56/66, Jun. 1997.
No subject, "Tom Schauer (tschauer@moscow.com)Thu, Sep. 28,1995 16:46:48/700," Xp/002378870 [Retrieved from the Internet Apr. 28, 2006].
Pfister, Larry T., "Teletext: Its Time Has Come," Prepared for the IGC Videotext / Teletext Conference, Andover, Massachusettes, Dec. 14, 1982, pp. 1/11.
Prevue Guide Brochure, Spring 1994.
Rayers, DJ., "Telesoftware by Teletext," 1984 IEEE Conference Papers, vol. 240, p. 323.
Rogers, "Telcos vs. Cable TV : The Global View With Markets Converging and Regulatory Barriers Falling, Service Carriers Are Ready To Rumble," Data Communications, Sep. 21, 1995, vol. 24, No. 13, pp. 75/76, 78, 80, XP000526196.
Roizen, Joseph "Teletext in the USA," Society of Motion Picture and Television Engineers Journal, Jul. 1981, pp. 602/610.
Roseville City Council Presentation, Mar. 13, 1985 (Defendant's Exhibit 226).
Ross Peddicord, "New on TV: You Bet Your Horse," The Sun, Baltimore Maryland Dec. 15, 1994, 1 pg.
Schlender, B.R., "Couch Potatoes! Now Its Smart Tv," Fortune, Nov. 20, 1989, pp. 111/116.
Schmuckler, Eric "A marrage that's made in cyberspace (television networks pursue links with online inforamtion services)," May 16, 1994 Mediaweek, v. 4, No. 20, pg. 22(3).
Sealfon, Peggy, "High Tech Tv," Photographic, Dec. 1984.
Sunada, K. et al., "Teletext Color Television Receiver Model C/29M950, C26M940," NEC Home Electronics , NEC Giho, 1987.
Sussman, A. "GTE Tunes in to Home TV Shopping," PC Week, Jun. 28, 1988, p. C15.
Tech Notes: Product Updates from M/A/COM Cable Home Group, "Videocipher Owner's Manual Update," Issue No. 6, Feb. 1986.
Transcript of the Deposition of John Roop, Oct. 1996, pp. 186/187.
Trial testimony of Michael Axford, *Prevue Interactive, Inc. and United Video Satellite Group, Inc.* v. *Starsight Telecast, Inc.*, May 9, 1998, pp. 186/187, 295/315, and 352/357.
Various publications of Insight Telecast, 1992 and 1993.
Veith, R.H., "Television's Teletext," Elsevier Science Publishing Co., Inc, 1983, pp. 13/20, 41/51.
Videocipher Stipulation, May 1996.
W. Leo Hoarty, "Multimedia on Cable Television Systems," Symposium Record Table Tv Sessions, 18th International Television Symposium and Technical Exhibition, Montreux, Switzerland, Jun. 10, 1993, pp. 555/567.
Wittig et al.,"Intelligent Media Agents in Interactive Television Systems," Proceedings of the Interna/tional Conference on Multimedia Computing and Systems, Los Alamitos, CA, US, May 15/18, 1995, pp. 182-189, XP 000603484.
Yee Hsiang Chang et al., "An Open/Systems Approach to Video on Demand," IEEE Communications Magazine, May 1994, pp. 68/80.
Bach, U. et al., "Multimedia TV Set, Part 1" Radio-Fernsehen Elektronik (RFE), 9/96, pp. 28, 30, 31. (English language translation attached.).
Bach, U. et al., "Multimedia TV Set, Part 2 and Conclusion," Radio-Fernsehen Elektronik (RFE), 10/96, pp. 38-40. (English language translation attached.).
Supplementary European Search Report for Application No. EP 98 93 5889, completed on Sep. 28, 2001.
U.S. Appl. No. 10/401,299 filed Mar. 27, 2003, "Method and System for Displaying Advertisements in an Electronic Program Guide", 65 pp.
U.S. Appl. No. 10/401,173 filed Mar. 27, 2003, "Method and System for Displaying Panel Advertisements in an Electronic Guide", 82 pp.
U.S. Appl. No. 10/401,301 filed Mar. 27, 2003, "Method and System for Displaying Advertisements Between Schedule Listings", 17 pp.

(56) References Cited

OTHER PUBLICATIONS

U.S. Appl. No. 10/401,297 filed Mar. 27, 2003, "Method and System for Displaying Targeted Advertisements in an Electronic Program Guide", 101 pp.

U.S. Appl. No. 10/406,745 filed Apr. 3, 2003, Method and System for Displaying Advertising, Video, and Program Schedule Listing, 66 pp.

"PCT—Notification of Transmittal of International Preliminary Examination Report," International Application No. PCT/US97/07449, Feb. 12, 1999, pp. 1-10.

Instruction Manual " Using Star Sight," Copyright 1994 StarSight Telecast Inc.

Supplemental European Search Report, Application No. EP 97925449, Nov. 1999, 2 pages.

Bach, U. et al., "Multimedia TV Set, Part 1" Radio/Fernsehen Elektronik (RFE), 9/96, pp. 28, 30, 31. (English language translation attached.).

Bach, U. et al., "Multimedia TV Set, Part 2 and Conclusion," Radio/Fernsehen Elektronik (RFE), 10/96, pp. 38/40. (English language translation attached.).

"Development Study and Research Report on New Media Interface Technology: Status & Issues Related to Combining Databases & New Media," Japan Society of Data Communication, Mar. 1986.

"Digital Video Broadcasting (DVB); DVB specification for data broadcasting," European Telecommunication Standards Institute, Draft EN 301 192 V1.2.1 (Jan. 1999).

"'Duck Tales,'(1987)[TV Series 1987/1990]," Internet Movie Database (IMDB) [Retrieved on Apr. 7, 2007].

"Electronic Programme Guide (EPG); Protocol for a TV Guide using electronic data transmission," by European Telecommunication Standards Institute, May 1997, Valbonne, France, publication No. ETS 300 707.

"Facsimile Transmission " NHK Research Monthly Report. Dec. 1987(Unknown author).

"Open TV Launches OpenStreamer™ Technology for Broadcasters to Deliver First Ever Real/Time Digital Interactive Television," from the internet at http://www.opentv.com/news/openstreamer press final.htm, printed on Jun. 28, 1999, the document bears a copyright date of 1999.

"The New Media and Broadcast Policy: An Investigation & Research Conference Report on Broadcasting Diversification," Radio Regulatory Bureau, Japan Ministry of Posts & Telecommunications, March 1982.

"StarSight Interactive Television Program Guide" Jim Leftwich, Willy Lai & Steve Schein Published before Apr. 19, 1995.

Baer, R H "Innovative Add/On TV Products," IEEE Transactions on Consumer Electronics, vol. CE/25, Nov. 1979, pp. 765/771.

Brochure, "Westar and Videotoken Network Present the CableComputer," Revised Aug. 15, 1985 (Plainiiffs 334).

Cable Computer User's Guide, Rev. 1, Dec. 1985 (Plaintiff's Exhibit 289).

Cox, J. et al., "Extended Services in A Digital Compression System," Proceedings from Eleven Technical Sessions: 42nd Annual Convention and Exposition of the National Cable Television Association, Jun. 1993, pp. 185-191.

DiRosa, S. "BIGSURF Netguide", Jul. 1995, vol. 3.1 (Sections 18, 21, and 28—renumbered as pp. 1/27).

Eitz, Gerhard, "Zukunftige Informations/und Datenangebote beim digitalen Femsehen-EPG Und 'Lesezeichen'," RTM Rundfunktechnische Mitteilungen, Jun. 1997, vol. 41, pp. 67/72.

Supplemental European Search Report, Application No. EP97925449, Nov. 1999, 2 pp.

European Telecommunication Standard, "Electronic Programme Guide (EPG); Protocol for a TV Guide using electronic data transmission," pp. 1/45, sections 1/11.12.7 and annex NP, bearing a date of May 1997.

Instruction Manual "Using StarSight 2" Published before Apr. 19, 1995.

Kai et al "Development of a Simulation System for Integrated Services Television," Report from Information Processing Society of Japan, Japan, Sep. 13, 1996, vol. 96, No. 90 pgs.

Kornhaas, W., "Von der Textprogrammierung uber TOP zum Archivsystem," Radio Fernsehen Elektronik, vol. 40, No. 8, Aug. 30, 1991, pp. 465/468, XP 000240875, Veb Verlag Technik. Berlin, DE ISSN: 1436/1574.

Mar. 19, 1985 letter from G. Knapp of CableData to R. Hansen of Weststar Communications, Inc. (Plaintiffs Exhibit 325).

McKenzie, G.A., "Oracle—/ An Information Broadcasting Service Using Data Transmission in the Vertical Interval," Journal of the SMPTE, Jan. 1974, vol. 83 No. 1, pp. 6/10.

Merrell.R.G., "Tac Timer," 1986 NCTA Technical Papers, pp. 203/206.

Neumann, Andreas, "WDR Online Aufbau and Perspektiven Automatisierter Online/Dienste im WDR," RIM Rundfunktechnische Mitteilungen, vol. 41, pp. 56/66, Jun. 1997.

No subject, "Tom Schauer (tschauer@moscow.com)Thu, Sep 28, 1995 16:46:48/700," XP/002378870 [Retrieved from the Internet Apr. 28, 2006].

Preview Guide Brochure, Spring 1984.

Preview Guide Brochure, Spring 1994.

Rayers, D.J., "Telesoftware by Teletext," 1984 IEEE Conference Papers, vol. 240, p. 323.

Schmuckler, Eric "A marrage that's made in cyberspace (television networks pursue links with online information services)," May 16, 1994 MEDIAWEEK, v. 4, No. 20, pp. 22(3).

Technical White Paper, "Open TV™ Operating Environment," (© 1998 OpenTV Inc.), pp. 1/12.

Transcript of the Deposition of John Roop, Jun. 2001, p. 608.

Trial testimony of Michael Axford, *Prevue Interactive, Inc. and United Video Satellite Group, Inc.* v. *Starsight Telecast; Inc.*, May 9, 1998, pp. 186/187, 295/315, and 352/357.

VideoGuide, "VideoGuide User's Manual," pp. 1/27 (p. 11 is the most relevant).

Wittig et al.,"Intelligent Media Agents in Interactive Television Systems," Proceedings of the International Conference on Multimedia Computing and Systems, Los Alamitos, CA, US, May 15/18, 1995, pp. 182-189, XP 000603484.

Periodical "Funkschau," vol. 6196 of 01 Mar. 1996, pp. 1-9: "Multimedia Terminal as Terminal Device."

Other than. The American Heritage® Dictionary of Idioms by Christine Ammer. Houghton Mifflin Company, retrieved on Jul. 9, 2007. <Dictionary.com http//dictionary.reference.com/browse/other than>.advertisement. Webster's II New Riverside University Dictionary. Houghton Mifflin Company, 1994.

Instruction Manual "Using Star Sight," Copyright 1994 StarSight Telecast Inc.

Baer, R.H., "Innovative Add-On TV Products," IEEE Transactions on Consumer Electronics, vol. CE-25, No. 5, Nov. 1979, pp. 765-771.

Baer, R.H., "Tele-Briefs: A Novel User-Selectable Real Time News Headline Service for Cable TV," IEEE Transactions on Consumer Electronics, vol. CE-25, No. 3, Jul. 1979, pp. 406-408.

Bell Atlantic Buys Cable TV Company for $22bn, Financial Times (London), Oct. 14, 1993 p. 65.

Bensch, U., "VPV Videotext Programs Videorecorder," IEEE Paper, Jun. 1988, pp. 788-792.

"Cable Television Equipment," Jerrold Communications Publication, dated 1992 and 1993, pp. 8-2.1 to 8-6 and 8-14.1 to 8-14.3.

"Computer Network: Current Status and Outlook on Leading Science and Technology," Bureau of Science az Technology (Japan), vol. 1, Dec. 1986.

Creation/Modification of the Audio Signal Processor Setup for a PC Audio Editor, IBM Technical Disclosure Bulletin, vol. 30, No. 10, Mar. 1988, pp. 367-376.

"D2B-Home-Bus Für- Audio und Video," Selektor, Apr. 1990, pp. 10, 12.

"Dial M for Movie", Funkschau 11/94 Perspektiven, Video on Demand, pp. 78-79. (English language translation attached).

'Duck Tales,'(1987)[TV Series 1987-1990], Internet Movie Database (IMDB) [Retrieved on Apr. 7, 2007].

"Enhanced Content Specification," "ATVEF," from the internet at http://www.atvet.com/library/spec.htrni, printed Aug. 22, 2001, the document bears a Copyright date of 1998, 1999, 2000.

European Telecommunication Standard, Electronic Programme Guide (EPG); Protocol for a TV Guide using electronic data trans-

(56) References Cited

OTHER PUBLICATIONS mission, by European Telecommunication Standards Institute, Valbonne, France, publication No. ETS 300 707 date of May 1997.
"Facsimile Transmission," NHK Research Monthly Report, Dec. 1987 (Unknown author).
"Interactive Computer Conference Server," IBM Technical Bulletin, vol. 34, No. 7A, Dec. 1991, pp. 375-377.
"Interface Device for Conventional TVs to Improve Functionality," IBM Technical Disclosure Bulletin, Vol. 36, no. 7, Jul. 1993, pp. 53-54.
Neumann, Andreas, "WDR Online Aufbau und Perspektiven Automatisierter Online-Dienste im WDR," RTM Rundfunktechnische Mitteilungen, vol. 41, pp. 56-66, Jun. 1997 (English language translation attached).
Office Action dated Sep. 8, 2006 re U.S. Appl. No. 10/453,388.
"Open TV Für interaktives Fernsehen," Trend and Technik, 9-95 RFE, p. 100 (English language translation attached).
"Open TV Launches OpenStreamer™ Technology for Broadcasters to Deliver First Ever Real-Time Digital Interactive Television," from the internet at http://www.opentv.com/news/openstreamer Press final.htm, printed on Jun. 28, 1999, the document bears a copyright date of 1999.
"Rewind, reply and unwind with new high-tech TV devices," by Lawrence J. Magid, LA Times. This document was printed from the internet on Jun. 6, 1999 and bears a date of May 19, 1999.
"StarSight Interactive Television Program Guide III" Jim Leftwich and Steve Schein, Functional/ Interactional Architecture Specification Document, Orbit Interaction, Palo Alto, California, Published before Apr. 19, 1995.
"StarSight Interactive Television Program Guide Iv" Jim Leftwich and Steve Schein, Functional/ Interactional Architecture Specification Document, Orbit Interaction, Palo Alto, California, Published before 4/19/95.
Technology: Turn on, tune in and print out—An experimental interactive television service is set to alter our viewing habits, Financial Times (London), Oct. 14, 1993, p. 11.
"Technological Examination & Basic Investigative Research Report on Image Databases," Japan Mechanical Engineering Organization Intl Society for the Advancement of Image Software, Japan, Mar. 1988.
The New Media and Broadcast Policy: an Investigation & Research Conference Report on Broadcasting Diversification, Radio Regulatory Bureau, Japan Ministry of Posts & Telecommunications, Mar. 1982.
"Using StarSight 2," Instruction Manual, StarSight Telecast, Inc., Starsight CB 1500 Customer Letter, 1994.
UV-133 Cont. 6 Declaration Under 37 C.F.R. § 1.132 of Richard E. Glassberg, signed Oct. 20, 2006, filed Oct. 24, 2006.
Windows 98 Feature Combines TV, Terminal and the Internet, New York Times, Aug. 18, 1998.
Office Actions and Corresponding Replies in relation to U.S. Appl. No. 6,177,931.
Office Actions and Corresponding Replies in relation to U.S. Appl. No. 6,756,997.
Office Actions and Corresponding Replies in relation to U.S. Appl. No. 10/401,173.
Office Actions and Corresponding Replies in relation to U.S. Appl. No. 10/406,745.
U.S. Appl. No. 11/502,691.
Office Actions and Corresponding Replies in relation to U.S. Appl. No. 5,940,073.
Office Actions and Corresponding Replies in relation to U.S. Appl. No. 10/401,164.
Office Actions and Corresponding Replies in relation to U.S. Appl. No. 10/401,296.
Office Actions and Corresponding Replies in relation to U.S. Appl. No. 10/744,500.
U.S. Appl. Application No. 11/894,612.
U.S. Appl. No. 11/894,620.
Office Actions and Corresponding Replies in relation to U.S. Appl. No. 6,469,753.
Office Actions and Corresponding Replies in relation to U.S. Appl. No. 10/251,670.
Office Actions and Corresponding Replies in relation to U.S. Appl. No. 10/346,255.
Office Actions and Corresponding Replies in relation to U.S. Appl. No. 10/346,266.
Office Actions and Corresponding Replies in relation to U.S. Appl. No. 6,396,546.
"272OR Satellite Receiver User's Guide," General Instrument, 1991, pp. 58-61.
"Cable Television Equipment," Jerrold Communications Publication, dated 1992 and 1993, pp. 8-2.1 to 8-6 and 8-14.1 to 8-.14.3.
"D2B-Home Bus Fur Audio and Video," Selektor, Apr. 1990, pp. 10, 12.
"Duck Tales,'(1987)[TV Series 1987-1990]," Internet Movie Database (IMDB) [Retrieved on Apr. 7, 2007].
"Facsimile Transmission." NHK Research Monthly Report. Dec. 1987(Unknown author).
"Open TV fur interaktives Fernsehen," Trend and Technik, 9-95 REE, p. 100, (English language translation attached).
"Open TV Launches OpenStreamer I'm Technology for Broadcasters to Deliver First Ever Real-Time Digital Interactive Television," from the internet at http://www.opentv.corntnewsiopenstrearner press final.htm, printed on 6/28/99, the document bears a copyright date of 1999.
"Prevue Networks and OpenTV(R) Agree to Work Together on Deploying Interactive Program Guides Worldwide," from the internet at http://www.opentv.cominews/prevuefinal.htm, printed on Jun. 28, 1999.
"Technology: Turn on, tune in and print out—An experimental interactive television service is set to alter our viewing habits," Financial Times (London), Oct. 17, 1993, p. 11.
"The New Media and Broadcast Policy: An Investigation & Research Conference Report on Broadcasting Diversifictaion," Radio Regulatory Bureau, Japan Ministry of Posts & Telecommunications, March 1982.
Alexander, Michael "Visualizing cleared-off desktops," Computerworld, May 6, 1991, p. 20.
Antonoff, M., "Stay Tuned for Smart TV," Popular Science, Nov. 1990, pp. 62-65.
Baer, R.H. "Innovative Add-On TV Products," IEEE Transactions on Consuner Electronics, vol. CE-25, Nov. 1979, pp. 765-771.
Bestler, Caitlin "Flexible Data Structures and Interface Rituals for Rapid Development of OSD Applications," Proceedings from the Eleven Technical Sessions, 42nd Annual Convention and Exposition and Exploration of the NCTA, San Francisco, CA Jun. 6-9, 1993, pp. 223-236. Jun. 6, 1993.
Brochure, "Wester and Videotoken Network Present the CableComputer," Revised Aug. 15, 1985 (Plainitffs 334).
Brochure, VTN "Videotoken Network, New Dimension Television," Dec. 1985 (Plaintiff's Exhibit 313).
Brugliera, Vito., "Digital On-Screen Display—A New Technology for the Consumer Interface," Symposium Record Cable TV Sessions of the 18th International Television Symposium & Technical Exhibition—Montreux, Switzerland, Jun. 10-15, 1993, pp. 571-586.
Cable Computer Users Guide, Rev. 1, Dec. 1985 (Plaintiff's Exhibit 289).
Carne, E.B., "The Wired Household," IEEE Spectrum, vol. 16 No. 10, Oct. 1979, pp. 61-66.
Christodoulakis, Steven and Graham, Stephen "Browsing Within Time-Driven Multimedia Documents," publication of the Institute for Computer Research, University of Waterloo, Waterloo, Ontario, Canada Jul. 1988 pp. 219-227.
Cox, J. et al, "Extended Services in a Digital Compression System," Proceedings from Eleven Technical Sessions: 42nd Annual Convention and Exposition of the National Cable Television Association, Jun. 1993, pp. 185-191.
Damouny, N. G., "Teletext Decoders—Keeping Up With the Latest Advances," IEEE Transactions on Consumer Electronics, vol. CE-30, No. 3, Aug. 1984, pp. 429-435.

(56) References Cited

OTHER PUBLICATIONS

DiRosa, S. "BIGSURF Netguide", Jul. 1995, vol. 3.1 (Sections 18, 21, and 28—renumbered as pp. 1-27).
Edwardson, S.M., & Gee, a., "CEEFAX: A Proposed New Broadcasting Service," Journal of the Smpte, Jan. 1974, vol. 83 No. 1, pp. 14-19.
Eitz, Gerhard, "Zukünftige Informations-und Datenangebote beim digitalen Femsehen—EPG Und 'Lesezeichen'," RTM Rundfunktechnische Mitteilungen, Jun. 1997, vol. 41, pp. 67-72.
European Telecommunication Standard, "Electronic Programme Guide (EPG); Protocol for a TV Guide using electronic data transmission," pp. 1-45, sections 1- 11.12.7 and annex A-P, bearing a date of May 1997.
Hartwig, Rautenberg, Bollmann, "Broadcasting and Processing of Program Guides for Digital TV," SMPTE Journal, pp. 727-732, Oct. 1997.
Hedger, J., "Telesoftware: Home Computing Via Broadcast Teletext," IEEE Transactions on Consumer Electronics, vol. CE-25, No. 3, Jul. 1979, pp. 279-287.
Hiroshi Ishii et al, "Clearface: Translucent Multiuser Interface for TeamWorkStation," ECSCW, Sep. 1991, pp. 6-10.
Hiroshi Ishii et al, Toward an Open Shared Workspace: Computer and Video Fusion Approach of Team Workstation, Communications of the ACM, Dec. 1991, vol. 34 No. 12, pp. 37-50.
Hirotada Ueda et al, "Impact: An Interactive Natural-Motion-Picture Dedicated Multi- Media Authoring System," Communications of the ACM, Mar. 1991, pp. 343-350.
Hofmann, Neumann, Oberlies & Schadwinkel, "Videotext Programmiert Videorecorder," Rundfunktechnischen Mitteilungen, (Broadcast Engineering Reports), vol. 26 No. 6, pp. 254-257, Nov.-Dec. 1982.
James, A., "Oracle—Broadcasting the Written Word," Wireless World, Jul. 1973, vol. 79 No. 1453, pp. 314-316.
Karstad, K.,"Microprocessor Control for Color-Tv Receivers," IEEE Transactions on Consumer Electronics, vol. CE-26, May 1980, pp. 149-155.
Kornhaas, W., "Von der Textprogrammierung uber TOP zum Archivsystem," Radio Fernsehen Elektronik, vol. 40, No. 8, Aug. 30, 1991, pp. 465-468, XP 000240875 Veb Verlag Technik. Berlin, DE ISSN: 1436-1574.
M/A-Com, Inc., "Videocipher II Satellite Descrambler Owner's Manual," dated Prior Feb. 1986, pp. 1-17.
Mack Daily, "Addressable Decoder with Downloadable Operation," Proceedings from the Eleven Technical Sessions, 42nd Annual Convention and Exposition of the NCTA, Jun. 6-9, 1993, pp. 82-89.
McKenzie, G.A., "Oracle—An Information Broadcasting Service Using Data Transmission in the Vertical Interval," Journal of the SMPTE, Jan. 1974, vol. 83 No. 1, pp. 6-10.
Merrell,R.G., Tac Timer, 1986 NCTA Technical Papers, pp. 203-206.
Neumann, Andreas, 'WDR Online Aufbau and Perspektiven Automatisierter Online-Dienste im WDR, RTM Rundfunktechnische Mitteilangen, vol. 41, pp. 56-66, Jun. 1997.
No subject, "Tom Schauer (tschauer@moscow.com)Thu, Sep. 28, 1995 16:46:48- 700," XP-002378870 [Retrieved from the Internet Apr. 28, 2006].
Pfister, Larry T., "Teletext: Its Time Has Come," Prepared for the IGC Videotext / Teletext Conference, Andover, Massachusetts, Dec. 14, 1982, pp. 1-11.
Rogers, "Telcos vs. Cable TV : The Global View With Markets Converging and Regulatory Barriers Falling, Service Carriers Are Ready To Rumble," Data Communications, Sep. 21, 1995, vol. 24, No. 13, pp. 75-76, 78, 80, XP000526196.
Roizen, Joseph "Teletext in the USA," Society of Motion Picture and Television Engineers Journal, Jul. 1981, pp. 602-610.
Schlender, B.R., "Couch Potatoes! Now Its Smart TV," Fortune, Nov. 20, 1989, pp. 111-116.
Schmuckler, Eric "A marrage that's made in cyberspace (television networks pursue links with online information services)," May 16, 1994 MEDIAWEEK, v. 4, No. 20, p. 22(3).
Sunada, K. et al, "Teletext Color Television Receiver Model C-29M950, C26M940," NEC Home Electronics, NEC Giho, 1987.
Tech Notes: Product Updates from M/A-COM Cable Home Group, "Videocipher Owner's Manual Update," Issue No. 6, Feb. 1986.
Technical White Paper, "Open TV ™ Operating Environment," © 1998 OpenTV Inc.), pp. 1-12.
Transcript of the Deposition of John Roop, Oct. 1996, pp. 186-187.
Trial testimony of Michael Axford, Prevue Interactive, Inc. and United Video Satellite Group, Inc. v. Starsight Telecast, Inc., May 9, 1998, pp. 186-187, 295-315, and 352-357.
Veith, R.H., "Television's Teletext," Elsivier Science Publishing Co., Inc, 1983, pp. 13-20,41-51.
W. Leo Hoarty, "Multimedia on Cable Television Systems," Symposium Record Table TV Sessions, 18th International Television Symposium and Technical Exhibition, Montreux, Switzerland, Jun. 10, 1993, pp. 555-567.
Wittig et al,"Intelligent Media Agents in Interactive Television Systems," Proceedings of the International Conference on Multimedia Computing and Systems, Los Alamitos, CA, US, May 15-18, 1995, pp. 182-189, XP 000603484.
Yee Hsiang Chang et al., "An Open-Systems Approach to Video on Demand," IEEE Communications Magazine, May 1994, pp. 68-80.
Bach, U. et al. "Multimedia TV Set, Part 2 and Conclusion," Radio-Fernsehen Elektronik (RFE), 10/96, pp. 38-40. (English language translation attached.).
Periodical "Funkschau," vol. 6/96 of Mar. 1, 1996, pp. 1-9: "Multimedia Terminal as Terminal Device.".
U.S. Appl. No. 10/401,301, filed Mar. 27, 2003, "Method and System for Displaying Advertisements Between Schedule Listings", 17 pp.
U.S. Appl. No. 10/401,297, filed Mar. 27, 2003, "Method and System for Displaying Targeted Advertisements in an Electronic Program Guide", 101 pp.
U.S. Appl. No. 10/406,745, filed Apr. 3, 2003, Method and System for Displaying Advertising, Video, and Program Schedule Listing, 66 pp.
Instruction Manual—"Using StarSight," Copyright 1994 StarSight Telecast Inc.
"Getting Started" Installation Guide, "Using Starsight 1" Manual, and Remote Control "Quick Reference Guide," 1994.
James Sorce, "Designing a Broadband Residential Entertainment Service: A Case Study," 13th International Symposium Human Factors in Telecommunications, Torino, Italy, Sep. 10-14, 1990.
"Probe XL Brochure, Auto Tote Systems Inc.," (Newark Delaware), 1993, 57 pgs.
Listing of computer code for Video HTU Program (Plaintiff's Exhibit 299), Jul. 24, 1986.
Videocassette of Mini Theatre, (Plaintiff's Exhibit 327), Jul. 24, 1986.
Japanese Abstract of Japanese Publication No. 9037151, published Feb. 7, 1997.
"Starsight Interactive Television Program Guide" Jim Leftwich, Willy Lai & Steve Schein, Published before Apr. 19, 1995.
Installation Guide, "Getting Started 1" Manual, and Remote Control "Quick Reference Guide", 1994.
VideoGuide, "VideoGuide User's Manual," pp. 1/27 (p. 11 is the most relevant), 1995.
"A Financial Times Survey: Viewdata (Advertisement)," Financial Times, Mar. 20, 1979.
"Dialing the printed page," ITT in Europe Profile, 11/Spring 1977.
"Electronic Program Guide via Internet," Research Disclosure, Kenneth Mason Publications, Hampshire, GB Nr. 385 (May 1996) p. 276, ISSN:0374-4353.
"Growing US interest in the impact of viewdata," Computing Weekly, Jul. 20, 1978.
"Teletext presents the alternative view," Financial Times, Oct. 24, 1977.
"Three men on a Viewdata bike," The Economist, Mar. 25, 1978.
"UVSG Offers System-Specific Web Site Development for OPS," press release of United Video Satellite Group, Apr. 12, 1996.
"UVSG Teams With Microsoft on Internet Information Server," press release of United Video Satellite Group, Feb. 22, 1996.

(56) References Cited

OTHER PUBLICATIONS

"Viewdata and its potential impact in the USA: Final Report/Volume One, The UK Experience," Link and Butler Cox & Partners Limited, Oct. 1978.
"Viewdata moves in US but GEC may lose out," Computing Weekly, Jan. 25, 1978.
"Viewdata Service Terminal Specification," British Post Office, Issue 5, Aug. 1978.
ACM Multimedia 93 Proceedings, A Digital On-Demand Video Service Suporting Content-Based Queries, Little et al. pp. 427-436, Jul. 1993.
Adrian Stokes, "The viewdata age: Power to the People," Computing Weekly, Jan. 1979.
All Office Actions from U.S. Appl. No. 11/894,702.
All Office Actions from U.S. Appl. No. 11/894,724.
Blahut et al., "Interactive Television," Proceedings of the IEEE, Jul. 1995.
D.C. Stickland, "It's a common noun," The Economist, Jun. 5, 1978.
DIRECTV Plus2 System, Thompson Consumer Electronics, Inc. (1999).
Gary D. Rosch, "New data and information system set for commercial market trial," Telephony, Mar. 20, 1978, at 96.
Gary L. Holland, "NAPLPS standard defines graphics and text communications," EDN, Jan. 10, 1985, at 179.
Hamid Qayyum, "Using IVDS and VBI for Interactive Television," IEEE, Jun. 10, 1996.
Hobbes Internet Timeline, Mar. 22, 2007.
Iitusuka, Honbashi, Kuwana, Building Internet TV Guide Service 1 and 2, the 53rd National Conference Proceedings, Japan, Information Processing Society of Japan, Sep. 6, 1996 p. 3-227 to 230.
J.D. Mosley, "NAPLPS chip sets, though scarce, satisfy limited US videotex demand," EDN, Mar. 21, 1985, at 57.
James Poole, "Demand for Viewdata grows," Sunday Times, Feb. 10, 1977.
John Lloyd, "Impact of technology," Financial Times, Jul. 1978.
Junko Yoshida, "Interactive TV a Blur," Electronic Engineering Times, Jan. 30, 1995.
Katharine Whitehorn, "Viewdata and you," Observer, Jul. 30, 1978.
Keith Lynch's timeline of net related terms and concepts, Mar. 22, 2007.
Kenneth Owen, "How dial-a-fact is coming closer to home," The Times, Sep. 30, 1977.
Kenneth Owen, "Why the Post Office is so excited by its plans for a TV screen information service," The Times, Sep. 26, 1976.
Larry Armstrong, "Channel-Surfing's next wave: Henry Yuen's interactive TV guide takes on TCI and Viacom," BusinessWeek, Jul. 31, 1995.
Margaret Ryan, "Interactive TV Takes a Corporte Twist," Electronic Engineering Times, Jul. 10, 1995.
Matthew D. Miller, "A Scenario for the Deployment of Interactive Multimedia Cable Television Systems in the United States in the 1990s," IEEE, 1994.
Peter Large, "Throw away the books—Viewdata's coming," Guardian, Jan. 10, 1978.
Peter Large, "Viewdata, the invention that brings boundless advice and information to the home, also sets a test for the Post Office," Financial Guardian, Jun. 29, 1978.
Printout from Google News Archives, Mar. 22, 2007.
Rajapakshe et al., "Video on demand," (last modified Jun. 1995) <http://www-dse.doc.ic.ac.uk/~nd/suprise_95 /Journal/vol4/shr/report.html>.
Rath et al., "Set-Top Box Control Software: A Key Component in Digital Video," Philips Journal of Research, vol. 50, No. 1/2 1996, at 185.
Rebecca Day, "The Great PC/TV Debate," OEM Magazine, Jul. 1, 1996.
Rick Boyd-Merritt, "Television wires two-way video," Electronic Engineering Times, Apr. 25, 1994.
Ruffler et al., "InfoRadio on Demand, WebTV and digiTaz—Telecommerce Case Studies," May 23, 1996.
Selected pages from the "BBC Online—Schedules" web page. This web page is located at http://www.bbc.co.uk/schedules/ (as printed from the Internet on Oct. 19, 1999 and being dated as early as May 24, 1997).
Sharpless et al., "An advanced home terminal for interactive data communication," Conf. Rec. Int. Conf. Commun. ICC '77, IEEE, Jun. 12-15, 1977, at 19.6-47.
St. John Sandringham, "Dress rehearsal for the PRESTEL show," New Scientist, Jun. 1, 1978, at 586.
Statement in an Examination Report dated Aug. 2, 1999 for a counterpart foreign application filed in New Zealand in which the foreign Examiner alleges that he has used "the Internet to access television listings for BBC World television as far back as mid 1996 . . . ".
Steve A. Money, "Teletext and Viewdata," Butterworth & Co. Ltd., London, 1979.
The clickTV television program guide website of TVData of Queensbury, New York. This website is located at www.clicktv.com (as printed from the Internet on Aug. 13, 1997).
The InfoBeat television program guide website of InfoBeat, Inc. This website is located at www.infobeat.com (as printed from the Internet on Dec. 8, 1997).
The television program guide website of Gist Communications, Inc. of New York, New York. This website is located at www.gist.com (as printed from the Internet on Aug. 14, 1997).
The television program guide website of TV Guide Entertainment Network. This website is located at www.tvguide.com (as printed from the Internet on Aug. 14-22, 1997).
TV Guide movie database Internet web pages printed on Aug. 12, 1999 (9 pages).
VideoGuide, Videoguide User's Manual, pp. 1-27, 1995.
Web TV and Its Consumer Electronics Licensees debut First Internet Television Network and Set Top Box XP 002113265 Retrieved from the Internet: <URL http://www.webtv.net/company/news/archive/License.html>'retrieved on Aug. 25, 1999.
Wikipedia article on CompuServe, Mar. 22, 2007.
William F. Arnold, "Britain to get wired city—via telephone," Electronics, Mar. 4, 1976, at 76.
Schauer, Tom: Internet Article, [Online] Sep. 28, 1995, XP002378870, Retrieved from the Internet: URL: www.vision2020.moscow.com/Archives/1995/9509/0058.htlm> [retrieved on Sep. 28, 2006] *the whole document*.
Office Action mailed Feb. 11, 1999 and Reply filed Mar. 17, 1999 in U.S. Appl. No. 08/846,801 filed Apr. 30, 1997 (now U.S. Patent No. 5,940,073 issued Aug. 17, 1999).
Office Actions mailed Jun. 20, 2003 and Oct. 1, 2002; and Reply filed Mar. 31, 2003 in U.S. Appl. No. 09/352,669 filed Jul. 9, 1999 (now abandoned).
Office Actions mailed Feb. 22, 2008, Jul. 19, 2007, Feb. 27, 2007, Jan. 29, 2007, Sep. 26, 2006, and May 12, 2006; and Replies filed Jun. 27, 2008, Oct. 30, 2007, Jun. 27, 2007, Dec. 22, 2006 and Sep. 12, 2006 in U.S. Appl. No. 10/401,299 filed Mar. 27, 2003 (now U.S. Patent 7,480,929 issued Jan. 20, 2009).
Office Actions mailed Dec. 13, 2010, May 11, 2010, Aug. 5, 2009, May 20, 2009, Jan. 7, 2009, Jul. 23, 2008, Oct. 1, 2007, Jan. 24, 2007, and Jul. 17, 2006; and Replies filed Feb. 5, 2010, Mar. 24, 2009, Oct. 21, 2008, Feb. 27, 2008, Jun. 26, 2007, and Oct. 17, 2006 in U.S. Appl. No. 10/401,164 filed Mar. 27, 2003 (now Abandoned).
Office Actions mailed Sep. 18, 2008, Feb. 22, 2008, Jul. 17, 2007, Feb. 15, 2007, Jan. 11, 2007, Sep. 26, 2006, and May 9, 2006; and Replies filed Sep. 26, 2008, May 22, 2008, Oct. 30, 2007, Jun. 15, 2007, Dec. 22, 2006 and Sep. 8, 2006 in U.S. Appl. No. 10/401,296 filed Mar. 27, 2003 (not U.S. Patent No. 7,493,641 issued Feb. 17, 2009).
Office Actions mailed Sep. 3, 2008 and Dec. 11, 2007; and Replies filed Feb. 3, 2009 and Jun. 6, 2008 in U.S. Appl. No. 10/744,500 filed Dec. 22, 2003 (now U.S. Patent No. 7,552,459 issued Jun. 23, 2009).
Office Actions mailed Nov. 2, 2010 and Apr. 13, 2010; and Reply filed Sep. 10, 2010 in U.S. Appl. No. 11/894,612 filed Aug. 20, 2007 (currently pending).
Office Actions mailed May 8, 2003, Dec. 18, 2002, Aug. 5, 2002, May 23, 2002, and Oct. 16, 2001; and Replies filed Jun. 17, 2003, May 19,

(56) References Cited

OTHER PUBLICATIONS

2003, Mar. 24, 2003, Nov. 5, 2002, Jun. 2, 2002, Feb. 8, 2002 in U.S. Appl. No. 09/284,894 filed Jul. 13, 1999 (now U.S. Patent No. 6,687,906 issued Feb. 3, 2004).
Office Actions mailed Mar. 24, 2010, Jul. 20, 2009, Feb. 11, 2009, May 29, 2008, Aug. 21, 2007, Febraruy 14, 2007, Aug. 10, 2006, May 8, 2006, Sep. 13, 2005, and Dec. 16, 2004; and Replies filed Jun. 24, 2010, Jan. 20, 2010, Mar. 20, 2009, Nov. 28, 2008, Feb. 21, 2008, Jun. 8, 2007, Dec. 11, 2006, Jun. 8, 2006, Feb. 13, 2006, and Jun. 16, 2005 in U.S. Appl. No. 10/401,301 filed Mar. 27, 2003 (currently on Appeal).
Office Action mailed Jun. 18, 2009 in U.S. Appl. No. 11/894,777 filed Aug. 20, 2007 (now abandoned).
Office Action mailed Dec. 29, 2010 in U.S. Appl. No. 12/777,732 filed May 11, 2010 (currently pending).
Office Actions mailed Jun. 17, 1997, Sep. 18, 1996, Mar. 27, 1996, Mar. 13, 1996, Nov. 27, 1995, Nov. 17, 1995, and Mar. 27, 1995; and Replies filed Dec. 16, 1997, Mar. 13, 1997, Jun. 27, 1996, Dec. 8, 1995 and Jul. 21, 1995 in U.S. Appl. No. 08/247,101 filed May 20, 1994 (now U.S. Patent No. 5,781,246 issued Jul. 14, 1998).
Office Action mailed Feb. 13, 1996; and Replies filed May 13, 1996 and Jun. 1, 1996 in U.S. Appl. No. 08/476,215 filed Jun. 7, 1995 (now U.S. Patent No. 5,585,866 issued Dec. 17, 1996).
Office Action mailed Jul. 11, 1996 and Reply filed Jul. 19, 1996 in U.S. Appl. No. 08/476,217 filed Jun. 7, 1995 (now U.S. Patent No. 5,589,892 issued Dec. 31, 1996).
Office Action mailed Apr. 25, 1998 and Reply filed Jun. 29, 1998 in U.S. Appl. No. 08/775,479 filed Dec. 30, 1996 (now U.S. Patent 6,014,184 issued Jan. 11, 2000).
Office Actions mailed Jun. 1, 2004, Nov. 7, 2003, Apr. 23, 2003, Jan. 27, 2003, Jun. 3, 2002, Nov. 27, 2001 and Feb. 27, 2001; and Replies filed Apr. 13, 2004, Feb. 5, 2004, Aug. 12, 2003, May 23, 2002 and Aug. 21, 2001 in U.S. Appl. No. 09/317,686 filed May 24, 1999 (now U.S. Patent No. 6,769,128 issued Jul. 27, 2004).
Office Actions mailed Dec. 17, 2009, Feb. 22, 2008, and Aug. 8, 2007; and Replies filed Feb. 17, 2010, Aug. 21, 2008, Dec. 10, 2007 in U.S. Appl. No. 10/357,154 filed Jan. 31, 2003 (currently on Appeal).
"Honey, is there anything good on the remote tonight?", advertisement from Multichannel News, Broadband Week Section, p. 168, Nov. 30, 1998.
"How Evolve Works," from the Internet at http://www.evolveproducts.com/network.html, printed on Dec. 28, 1998.
"JiniTM Architecture Overview," by Jim Waldo, from the Internet at http://Java.sun.com/products/jini/whitepapers/architectureoverview.pdf/ printed on Jan. 25, 1999. The document bears a copyright date of 1998.
"Reaching your subscribers is a complex and costly process-until now," from the Internet at http://www.evolveproducts.com/info.html, printed on Dec. 28, 1998.
"Sun's Next Steps in Digital Set-Tops," article in Cablevision, p. 56, Nov. 16, 1998.
"The Evolve EZ Guide. The Remote. Control," from the Internet at http://www.evolveproducts.com/display2.html, printed on Dec. 28, 1998.
"What is Jini?", from the Internet at http://java.sun.com/products/jini/whitepapers/whatsjini.pdf, printed on Jan. 25, 1999.
"Why Jini Now?", from the internet at http://java.sun.com/products/jini/whitepapers/whyjininow.pdf, printed on Jan. 25, 1999. The document bears a copyright date of 1998.
Office Actions and Corresponding Replies in relation to U.S. Publication No. 2006/0277574.
Office Actions and Corresponding Replies in relation to U.S. Publication No. 2011/0041150.
Office Actions and Corresponding Replies in relation to U.S. Appl. No. 13/083,211.
Office Actions and Corresponding Replies in relation to U.S. Patent No. 7,797,712.
Office Actions and Corresponding Replies in relation to U.S. Appl. No. 12/855,165.
Office Actions and Replies filed in U.S. Appl. No. 11/894,724.
Amendment dated Oct. 19, 2009 filed in JP 2003-341287 (English Translation Only).
Appeal Brief dated Oct. 19, 2009 filed in JP 2003-341287 (English Translation Only).
Final Office Action dated Aug. 31, 2009 for U.S. Appl. No. 11/894,621.
Non-Final Office Action dated Oct. 30, 2008 for U.S. Appl. No. 11/894,621.
Office Action dated Apr. 8, 2010 issued in U.S. Appl. No. 11/147,802.
Preliminary Amendment dated Apr. 8, 2011 for U.S. Appl. No. 13/082,857.
Reply to Non-Final Office Action dated Apr. 30, 2009 for U.S. Appl. No. 11/894,621.
Iizuka, Honbashi, Kuwana, "The Overview of Internet TV Guide Japan," Building Internet TV Guide Service 1 and 2, the 53rd National Conference Proceedings, Japan, Information Processing Society of Japan, Sep. 6, 1996 p. 3-227 to 230 (partial English language translation.
International Search Report, Internatonal Application No. PCT-US97-23852, Jun. 1, 1998, 2 pages.
Prevue Guide Brochure, Spring 1984.
Supplemental European Search Report for Application No. EP 98 93 5889, completed on Sep. 28, 2001.
The past and future prosecution history of U.S. Appl. No. 10/827,863, filed Apr. 19, 2004, including copies of all furture Office Actions, Replies or other substantive correspondence.
Contents of the website of StarSight Telecast, inc. (http://www.StarSight.com) as of Apr. 21, 2004.
Transcript of the testimony of Michael Faber and Larrry Wangburg, May 1996, pp. 554-743.
Transcript of the testimony of Brian Klosterman, May 1997, pp. 1700-1981.
IPG Attitude and Usage Study, prepared by Liberman Research Worldwide for Gemstar-TV Guide International, Oct. 2002.
Florin, et al., Prosecution History of U.S. Appl. No. 08/082,056 (now U.S. Patent No. 5,621,456), filed Jun. 22, 1993, and the references contained therein.
Florin, et al., Prosecution History of U.S. Appl. No. 08/082,081, filed Jun. 22, 1993.
Berniker, M., "TV Guide going online," Broadcasting & Cable, pp. 49-52, Jun. 13, 1994.
Cable Data: Via Cable, Addressable Converters: A New Development at CableData, vol. 1, No. 12, 11 pages, Dec. 1981.
Extended European Search Report for EP08104894 dated Apr. 12, 2011.
Davic Digital Audio-Visual Council, DAVOC 1.3.1 Specification Part 1, Description of Digital Audio-Visual Functionalities (Technical Report), pp. 1-80, 1998.
Davis, B., TV Guide on Screen, "Violence on Television", House of Representatives, Committee on Energy and Commerce, Subcommittee on Telecommunications and Finance, pp. 93-163, Jun. 25, 1993.
December, J., Presenting JAVA, "Understanding the Potential of Java and the Web", pp. 1-208, © 1995 by Sams.net Publishing.
Eckhoff, J., "TV Listing Star on the Computer", Central Penn Business Journal/High Beam Research, pp. 1-4, Mar. 15, 1996.
Evans C. R. (1994), Marketing Channels—Infomercials and the Future of Televised Marketing, Prentice Hall, ISBN 0-13-075151-0, pp. 234-35.
Uniden, UST-4800 Super Integrated Receiver/Descrambler, Preliminary Reference Manual, 80 pages, Nov. 12, 1991.
Uniden, UST-4800, Integrated Receiver/Descrambler, Installation Guide, 60 pages, ©1990, Uniden America Corporation.
Uniden, UST-4800, Integrated Receiver/Descrambler, Operating Guide, 24 pages, ©1990, Uniden America Corporation.
Baer, "Tele-Briefs: A Novel User-Selectable Real Time News Headline Service for Cable TV," IEEE Transactions on Consumer Electronics, vol. CE-25, No. 3, Jul. 1979, pp. 406-408.
Compton et al., "Internet CNN Newsroom: A Digital Video News Magazine and Library", 0-8186-7104-X/95, IEEE pp. 296-301 (1995).
European Search Report dated Nov. 19, 2002 from European Application No. 98944611.7.

(56) References Cited

OTHER PUBLICATIONS

Extended European Search Report dated Apr. 4, 2012 in European Patent Application No. 10179771.0.
Extended European Search Report dated Dec. 4, 2012 in European Application No. 10179773.6.
Office Action dated May 30, 2012 and Reply dated Oct. 1, 2012 in European Application No. 04075599.3.
Office Action dated Aug. 10, 2012 in Japanese Patent Application No. 2009-138286.
Office Action dated Aug. 16, 2012, in U.S. Appl. No. 11/894,612.
Office Action dated Aug. 30, 2012 in U.S. Appl. No. 13/083,204.
Office Action dated Sep. 19, 2012 and Reply dated Oct. 12, 2012, for U.S. Appl. No. 13/017,933.
Office Action dated Nov. 12, 2012 in Japanese Patent Application No. 2011-232232.
Defense and Counterclaim of the First and Second Defendants, No. HC11 C 04556, between Starsight Telecast and United Video Properties (Claimants) and Virgin Media, Virgin Media Payments, and TiVo Defendants (pp. 10-11) (Mar. 14, 2012).
Dinwiddle et al., "Combined-User Interface for Computers, Televison, Video Recorders, and Telephone, etc." IBM Technical Disclosure Bulletin, vol. 33(3B), pp. 116-118 (1990).
Documentary Evidence from Third Party Observation in JP 2007-186174 dated Dec. 6, 2012.
Fuller, Streaming gijutsu no genzai Web video system no gaiyou [Current Streaming Technology, Outline of Web Video System], UNIX Magazine, Japan, ASCII K.K., Mar. 1, 2000, vol. 15, No. 3, p. 65-72.
Hauptmann et al., "News on Demand," News-on-Demand: An Application Informedia® Technology D-Lib Magazine, (Sep. 13, 1995), XP002675162, Retrieved from the Internet: URL:http://www.dlib.org/dlib/september95/nod/page3/html[retrieved on May 2, 2012].
Instructional Manual, "Sonic The Hedgehog," Sega of America, 1992.
Neue, Digitale Strategien Bericht Von Den 5. Dermastaedter Fernsehtagen, FKT Fernseh Und Kinotechnik, vo. 49, No. 3, Mar. 1, 1995, pp. 135-139, XP000507348, Fachverlag Schiele & Schon GMBH., Berlin, DE ISSN: 140-9947.
Oberlies et al.; "VPS-Anzeige Und Uberwachungsgerat", Rundfunktechnische Mitteilungen, vol. 30, No. 1 Jan.-Feb. 1986, Norderstedt (DE).
OpenTV(R) and Interactive Channel Form Strategic Alliance to Deliver Interactive Programming to Satellite Television Subscribers, from the Internet at http://www.opentv.com/news/interactivechannelfinal.htm, printed on Jun. 8, 1999.
Personal Entertainment Guide—User's Guide, Version 1.0, Copyright 1991 by Lookahead Communications Inc.
Rovi Corporation Homepage, http://www.rovicorp.com/jp/licensing_certification/licensing/9154.htm, from Third Party Observation in JP 2007-186174 dated Dec. 6, 2012.
Sato et al., WWW jou no eizou browsing kikou no teian to Jitsugen [A Proposal for A Video Browsing Mechanism on World Wide Web and its Implementation], Japan Society for Software Science and Technology, collection of 14th convention articles, Japan, Japan Society for Software Science and Technology, Sep. 30, 1997, p. 193-196.
Winkler, "Computer Cinema: Computer and video: from TV converter to TV studio," Computerkino, (translation) Exhibit NK 13 of TechniSat's nullity action against EP'111, Issue 10, pp. 100-107 (1992).
Case 4:11-cv-06591-PJH, Complaint for Declaratory Relief (plaintiff), dated Dec. 21, 2011, 16 pages.
Office Action dated May 8, 2013 in U.S. Appl. No. 10/357,154 filed Jan. 31, 2003.
Hitachi Consumer Electronics Co., Ltd., Certification of market introduction in 1993 of Hitachi Projection TV Model 55EX7K.
Hitachi Service Manual, No. 0021, Projection Color Television, Models 55EX7K, 50EX6K, 50ES1B/K, 46EX3B/4K, and 46EX3BS/4KS, Aug. 1993.
JVC Service Manual, 27" Color Monitor/Receiver, Model AV-2771S (U.S.), Jul. 1991.

Karunanithi et al., "A Feature-Based Neural Network Movie Selection Approach," Proc. Intl. Workshop on Applications of Neural Networks to Telecommunications, Stockholm, Sweden, May 22-24, 1995, pp. 162-169.
Katkere et al., "Interactive Video on WWW: Beyond VCR-like Interfaces," Computer Networks and ISDN Systems, vol. 28, Issue 11, 1996, pp. 1559-1572.
Khoo et al., "An Expert System Approach to Online Catalog Subject Searching," Information Processing & Management: An International Journal, vol. 30, No. 2, 1994, pp. 223-238.
Melton, "The Uniden Super 4800," OnSat magazine, Jun. 10-16, 1990, pp. 2-4.
Prevue Networks, Inc. Promotional Materials, 1994.
RCA Satellite Receiver User's Manual, 2001.
Whale, "Identification of Program Similarity in Large Populations," The Computer Journal, vol. 33, No. 2, 1990, pp. 140-146.
Williams, David M., and Perry, Burt, "Rich Online Services as the Archetype for Interactive TV," Cable '94, Proceedings from Twelve Technical Sessions, 43rd Annual Convention and Exposition of the National Cable Television Association, May 22-25, 1994, New Orleans, LA., Technical Paper Compiled by Katherine Rutkowski, National Cable, XP008161201, pp. 21-35.
"A Wonderworld of Services," The Sunday Times, Innovation section, p. 4, Jan. 7, 1996.
"Columbia House CD-ROM Direct: Detail Page," accessed from the internet at http://web.archive.org/web/19961221160255/http://www.columbiahouse.com/cd/cgis . . . , copyright 1996, printed on Sep. 19, 2013.
"Columbia House CD-ROM Direct: Download Demos!," accessed from the internet at http://web.archive.org/web/19961221095819/http://www.columbiahouse.com/cd/cgis . . . , copyright 1996, printed on Sep. 19, 2013.
"Columbia House CD-ROM Direct: Member Center," accessed from the internet at http://web.archive.org/web/19961221085905/http://www.columbiahouse.com/repl/cd/ . . . , copyright 1996, printed on Sep. 19, 2013.
"Columbia House CD-ROM Direct: Member Center," copyright 1996.
"Columbia House CD-ROM Direct: The Connection," accessed from the internet at http://web.archive.org/web/19961221100721/http://www.columbiahouse.com/repl/cd/ . . . , copyright 1996, printed on Sep. 20, 2013.
"Columbia House CD-ROM Direct: The Connection," accessed from the internet at http://web.archive.org/web/19961223152924/http://www.columbiahouse.com/repl/cd/ . . . , copyright 1996, printed on Sep. 20, 2013.
"Columbia House Laser Disc Club: FAQ Answers," accessed from the internet at http://web.archive.org/web/19961223165516/http://www.columbiahouse.com/repl/lc/t . . . , copyright 1996, printed on Sep. 20, 2013.
"Columbia House Laser Disc Club: Join The Club," accessed from the internet at http://web.archive.org/web/19961221094037/http://www.columbiahouse.com/repl/lc/t . . . , copyright 1996, printed on Sep. 20, 2013.
"Columbia House Music Club: Join The Club," accessed from the internet at http://web.archive.org/web/19961221091101/http://www.columbiahouse.com/repl/mc . . . , copyright 1996, printed on Sep. 20, 2013.
"Columbia House Music Club: Search," accessed from the internet at http://web.archive.org/web/19961221114653/http://www.columbiahouse.com/repl/mc . . . , copyright 1996, printed on Sep. 19, 2013.
"Columbia House Music Club: Shopping Cart," accessed from the internet at http://web.archive.org/web/19961221120941/http://www.columbiahouse.com/mc/cgis . . . , copyright 1996, printed on Sep. 19, 2013.
"Columbia House Video Club: Essential Collection," accessed from the internet at http://web.archive.org/web/19961221113908/http://www.columbiahouse.com/vc/cgis/j . . . , copyright 1996, printed on Sep. 20, 2013.
"Does NBC get it?", Aug. 14, 1995, Retrieved from the Internet: URL:http://www.open4success.org/db/bin19019687.html [retrieved on Dec. 11, 2013].

(56) References Cited

OTHER PUBLICATIONS

"GameSpot: Allied General—Download It Now!!!!," accessed from the internet at http://web.archive.org/web/19970206133452/http://www.gamespot.com/strategy/allie . . . , copyright 1997, printed on Sep. 19, 2013.
"GameSpot: Allied General at a Glance," accessed from the internet at http://web.archive.org/web/19970205153530/http://www.gamespot.com/strategy/allie . . . , copyright 1996, printed on Sep. 19, 2013.
"GameSpot's Downloads for Allied General," accessed from the internet at http://web.archive.org/web/19970205060703/http://www.gamespot.com/strategy/allie . . . , copyright 1997, printed on Sep. 19, 2013.
"Gateway Destination: The PC for the Office and the Family Room," PC Magazine, First Looks section, pp. 39-41, Jun. 11, 1996.
"Step Up to the Superhighway," The Sunday Times, Innovation section, p. 6, Jan. 7, 1996.
"The Columbia House Video Club: Download Software," accessed from the internet at http://web.archive.org/web/19961223163101/http://www.columbiahouse.com/repl/vc . . . , copyright 1996, printed on Sep. 19, 2013.
"Today's stop: What on tonite", Oct. 3, 1995; retrieved from the internet URL:http://internettourbus.com/arch/1995/TB100395.Txt [retrieved on Dec. 9, 2013].
"Welcome to Columbia House Online," accessed from the internet at http://web.archive.org/web/19961221085121/http://www.columbiahouse.com/, copyright 1996, printed on Sep. 19, 2013.
"What's on Tonite!", Jan. 28, 1995, retrieved from the Internet: URL:http://www.library.georgetown.edu/newjour/publication/whats-tonite-tm [retrieved on Dec. 11, 2013].
"Yearling's Free Personalised TV Guide," from the internet at http://www.yearling.com/, Dec. 30, 1996.
Beddow, "The Virtual Channels Subscriber Interface," Communications Technology, Apr. 30, 1992.
Bertuch, "New Realities for PCs: Multimedia between aspiration and commerce," (translation), Exhibit NK 12 of TechniSat's nullity action against EP'111, Issue 10, pp. 40-46 (1991).
Burroughs, "The EIA/NCTA Joint Engineering Committee's Program Identification Project," IEEE 1990 International Conferernce on Consumer Electronics, Jun. 6-8, 1990, pp. 54-55.
CableData, Roseville consumer Presentation, Mar. 1986.
Digital TV-at a price, New Scientist, Sep. 15, 1983, vol. 99. No. 1375, p. 770.
Draft Grounds of Invalidity for EP (UK) 0 880 856 (Trial B), No. HC11 C 04556, between Starsight Telecast and United Video Properties (Claimants) and Virgin Media, Virgin Media Payments, and TiVo (Defendants), 7 pgs., Oct. 2013.
Eitz et al., "Videotext Programmiert Videoheimgerate," Rundfunktech Mitteilungen, Jahrg. 30, H.5, 1986, S. 223 bis 229 (English translation attached).
Garr et al., "Data Broadcasting in the USA Low Cost Delivery Alternative and More," IEEE Transactions on Consumer Electronics, vol. 36, No. 4, Nov. 1990, pp. 877-884.
Gyorki, "TV Technology Goes Digital," Machine Design, Sep. 10, 1992, pp. 61-65.
Hallenbeck et al., "Personal Home TV Programming Guide," IEEE 1990 International Conference on Consumer Electronics, Jun. 6-8, 1990, pp. 310-311.
Irven, "Multi-Media Information Services: A Laboratory Study," IEEE Communications Magazine, vol. 26, No. 6, Jun. 1988, pp. 27-33 and 36-44.
ITC Inv. No. 337-TA-845: Commission Decision (public version) filed Dec. 11, 2013.
ITC Inv. No. 337-TA-845: Complainants' Opp to MSD of Invalidity of USP '776, '762, and '709 (redacted) and Complainants' Statement of Facts filed Jan. 14, 2013.
ITC Inv. No. 337-TA-845: Complainants' Opp to Netflix's MSD of Invalidity of USP '776 and Complainants' Statement of Facts filed Jan. 14, 2013.
ITC Inv. No. 337-TA-845: Complainant's Post-Hearing Brief (redacted) filed Mar. 22, 2013.
ITC Inv. No. 337-TA-845: Complainant's Post-Hearing Reply Brief (redacted) filed Mar. 29, 2013.
ITC Inv. No. 337-TA-845: Complainants' Pre-Hearing Statement (redacted) filed Feb. 8, 2013.
ITC Inv. No. 337-TA-845: Corrected Respondents' PHS (Parts 1 and 2) (redacted) filed Feb. 25, 2013.
ITC Inv. No. 337-TA-845: Expert Report of Peter D. Hallenbeck filed Dec. 13, 2012.
ITC Inv. No. 337-TA-845: Joint Submission Re Claim Constructions and Accused Products (redacted) filed Oct. 2, 2012.
ITC Inv. No. 337-TA-845: Motion for Leave to File Reply ISO MSD re '776, '762, and '709 filed Jan. 18, 2013.
ITC Inv. No. 337-Ta-845: Netflix and Roku's MSD of Invalidity of 776, '762, and '709 filed Jan. 3, 2013.
ITC Inv. No. 337-TA-845: Netflix Motion for Summary Determination of Invalidity of '776 filed Jan. 3, 2013.
ITC Inv. No. 337-TA-845: Netflix's Memorandum of Points and Authorities in Support of Motion for Summary Determination of Invalidity Under Section 102(e) of the Asserted Claims of the '776 Patent filed Jan. 14, 2013.
ITC Inv. No. 337-TA-845: Order No. 40 Denying Summary Determination Motion filed Apr. 5, 2013.
ITC Inv. No. 337-TA-845: Public Final Initial Determination on Violation filed Jul. 2, 2013.
ITC Inv. No. 337-TA-845: Respondents' Notice of Prior Art and Exhibit filed Oct. 12, 2012.
ITC Inv. No. 337-TA-845: Respondents' Post-Hearing Reply Brief (redacted) filed Mar. 29, 2013.
ITC Inv. No. 337-TA-845: Respondents' Post-Hearing Statement (redacted) filed Mar. 22, 2013.
ITC Inv. No. 337-TA-845: *Rovi* v. *Netflix* Complaint and Claim Charts filed Apr. 30, 2012.
ITC Inv. No. 337-TA-845: Rovi's 4th Supp. Response to Netflix's First Set of Interrogatories (Nos. 1, 3, 4, 5, 6, 8, and 10) with Attachments A & B (redacted) filed Oct. 9, 2012.
ITC Inv. No. 337-TA-845: Rovi's Final Supplemental Responses to LGE's Interrogatories with attachments (redacted) filed Dec. 13, 2012.
ITC Inv. No. 337-TA-845: Rovi's Rebuttal Expert Report of R. Griffin (redacted) filed Jan. 9, 2013.
ITC Inv. No. 337-TA-845: Rovi's Responses to Vizio's Second Set of Interrogatories (Nos. 64150) (CBI) (redacted) filed Nov. 23, 2012.
ITC Inv. No. 337-TA-845: Rovi's Supplemental Response to Netflix's Contention Interrogatories with attachments (redacted) filed Dec. 13, 2013.
ITC Inv. No. 337-TA-845: Third Supp. Responses to Vizio's First Set of Interrogatories (Nos. 112, 25-36, 62-63) (redacted) filed Oct. 9, 2012.
Make Room for POP, Popular Science, Jun. 1993, p. 4.
Mannes, George, "List-O-Mania—On-Screen, Interactive TV Guides That Can Program Your VCR Are Just Around the Corner," May 1992, Video Review, pp. 33-36.
Revolution on the Screen, 2nd Ed. Verlag, Wilhelm Goldmann. 1979 (English Translation).
Ryan, K., "Free Interactive TV Guide," Google Newsgroup, Alleged Date Sep. 29, 1995.
Soin et al., "Analogue-Digital ASICs", Peter Peregrinus Limited, 1991, p. 239.
Split Personality, Popular Science, Jul. 1993, p. 52.
Super-TVs, Popular Science, Jul. 1985, p. 64.
Symposium Record Cable Sesssions, "Digital On-Screen Display of a New Technology for the Consumer Interface," Publication Date May 1993.
Thomas, "Electronic Program Guide Applications—The Basics of System Design," NCTA Technical Papers, 1994, pp. 15-20.
Video Plus, Billboard, vol. 98, No. 4, Jan. 25, 1986, p. 25.
Vision/1 from Tecmar, IBM transforms PS/1 into a TV, Info World, vol. 14(9), Mar. 2, 1992, p. 34.
Wilson, "Programme Delivery Control for Simplified Home Video Recording," IEEE Transactions on Consumer Electronics, vol. 37, No. 4, Nov. 1991, pp. 737 - 745.

(56) References Cited

OTHER PUBLICATIONS

Response and Office Action in U.S. Appl. No. 10/357,154, filed Jan. 31, 2003.

Response and Office Action in U.S. Appl. No. 11/894,612, filed Aug. 20, 2007.

Response and Office Action in U.S. Appl. No. 13/083,204, filed Apr. 8, 2011.

"Geschichte des Internets," Wikipedia, http://de.wikipedia.org/wiki/Geschichte_des_Internets, retrieved May 18, 2012.

"Internet Explorer," Wikipedia, http://de.wikipedia.org/wiki/Internet_Explorer, retrieved Sep. 13, 2012.

"Internet Users Forecast by Country," Computer Industry Almanac Press Release, http://www.c-i-a.com/internetusersexec.htm, retrieved Sep. 13, 2012.

"MSN TV," Wikipedia, http://en.wikipedia.org/wiki/MSN_TV, retrieved Sep. 13, 2012.

"NCSA Mosaic," Wikipedia, http://de.wikipedia.org/wiki/NCSA_Mosaic, retrieved Sep. 13, 2012.

Implementing a Web Shopping Cart, Dr. Dobb's: The World of Software Development, Sep. 1, 1996.

Office Action Response filed in U.S. Appl. No. 13/083,204, Dated Feb. 11, 2014.

Savage, "Internet's 'What's on tonight!' tells you just that and more," The News, May 20, 1995.

TV Guide on Screen prior Use Transcript of Proceedings—"Violence on Television," House of Representatives, Committee on Energy and Commerce, Subcommittee on Telecommunications and Finance, Jun. 25, 1993.

Zakon, "Hobbes' Internet Timeline 10.2," http://www.zakon.org/robert/internet/timeline, retrieved Sep. 13, 2012.

\* cited by examiner

Cancel

John Travolta in
"Staying Alive"

Amid the flash of 70's Disco, an aspiring young dancer lands a role in a production, and jeopardizes his relationship with a young woman.

The electric performance that defined an era, John Travolta, Cynthia Rhodes (Stereo)

| | ‹THU› ‹SEP 10› ‹8:00pm› | |
|---|---|---|
| NBC | Brand New Friends!<br>Joey gets a new job. | 300<br>330 |
| 7 KPIX | Mathnet: Despair in Mo | |
| 21 SHOW | City Slickers | |
| 22 HBOE | Bingo | |
| 26 DISC | All in a Day's Work | 320 |
| 37 ESPN | Major League Baseball | |
| 17 FAM | Batman | |
| 4 KRON | Fresh Prince | |
| 32 PBS | Avonlea | |
| 27 NICK | Ren & Stimpy | |
| | Free offer from RCA.<br>Call 1-800-RCA-FREE for | 340 |

FIG. 3(a)

| Cancel |

Brand New Friends!
Joey gets a new job.

Contest!

Identify the character played by Tawnee Welch in this episode and be the first to call 1-800-NBC_FRND, and you will win a guest role on the show for yourself! (Employees of NBC not eligible.)

2nd Place will win $1200 cash!
3rd Place wins Friends T-Shirt

STARSIGHT

| | | | 8:05P |
|---|---|---|---|
| OCT 30 | WED THU FRI SAT SUN MON TUE | | |
| NBC | 8:00P | 8:30P | |
| | Tonight on DATELINE, Profanity in the classroom? | | |
| KGO | Beverly Hills 90210 | | |
| SHOW | Jury Duty | | |
| HBO | Mask of Death | | |
| DISN | Wolves of Willoughby Chase | | |
| ESPN | Baseball | | |
| FAM | The Waltons | Highway to Heaven | |
| KRON | Dateline | | |
| KPIX | Ellen | Drew Carey | |

FIG. 4(a)

STARSIGHT

| OCT 30 | WED 8:00P | THU | FRI | SAT | SUN | MON | TUE |
|---|---|---|---|---|---|---|---|
| NBC | 8:30P Monday Night, November 4th Heats Up with BACKDRAFT! | | | | | | |
| KGO | Beverly Hills 90210 | | | | | | |
| SHOW | Jury Duty | | | | | | |
| HBO | Mask of Death | | | | | | |
| DISN | Wolves of Willoughby Chase | | | | | | |
| ESPN | Baseball | | | | | | |
| FAM | The Waltons | Highway to Heaven | | | | | |
| KRON | Dateline | | | | | | |
| KPIX | Ellen | Drew Carey | | | | | |

| | | | | | | | |
|---|---|---|---|---|---|---|---|
| OCT 30 | S T A R S I G H T | | | | | | |
| | MON | TUE | WED | THU | FRI | SAT | SUN |
| NBC | 9:00P | | | 9:30P Seinfeld - Visit Jerry, and NBC on the Web! | | | |
| KGO | New York Undercover | | | | | | |
| SHOW | Bulletproof Heart | | | | | | |
| HBO | 48 Hrs. | | | | | | |
| DISN | The Adventures of Huck Finn | | | | | | |
| ESPN | Baseball Tonight | | | | | | |
| FAM | Rescue 911 | | | | | | |
| KRON | Seinfeld | | | | | | |
| KPIX | 48 Hours | | | | | | |

| | | S T A R S I G H T | | | | | |
|---|---|---|---|---|---|---|---|
| OCT 30 | MON 9:00P | TUE | WED | THU 9:30P | FRI | SAT | SUN |
| NBC | Monday Night, November 4th Heats Up with BACKDRAFT! | | | | | | |
| KGO | New York Undercover | | | | | | |
| SHOW | Bulletproof Heart | | | | | | |
| HBO | 48 Hrs. | | | | | | |
| DISN | The Adventures of Huck Finn | | | | | | |
| ESPN | Baseball Tonight | | | | | | |
| FAM | Rescue 911 | | | | | | |
| KRON | Seinfeld | | | | | www. | |
| KPIX | 48 Hours | | | | | | |

PRO SCORES
NFL SCOREBOARD

| | | | |
|---|---|---|---|
| SF | 10 F | Bal | 37 F |
| Hou | 9 | StL | 31 |
| Pit | 20 F | Det | 7 F |
| Atl | 17 | NYG | 35 |
| GB | 13 F | Was | 31 F |
| Tam | 7 | Ind | 16 |
| Phi | 20 F | Cin | 28 F |
| Car | 9 | Jac | 21 |

METHOD AND SYSTEM FOR DISPLAYING ADVERTISEMENTS IN AN ELECTRONIC PROGRAM GUIDE

CROSS-REFERENCE TO RELATED APPLICATIONS

This application is a continuation of U.S. patent application Ser. No. 10/401,299, filed Mar. 27, 2003, now U.S. Pat. No. 7,480,929 which is a continuation of U.S. patent application Ser. No. 09/352,669, filed Jul. 9, 1999, now abandoned which is a continuation of U.S. patent application Ser. No. 08/846,801, filed Apr. 30, 1997 which has now issued as U.S. Pat. No. 5,940,073, which claimed the benefit of U.S. Provisional Patent Application "ADVERTISING 'HOT ZONE' AND RELATED FEATURES," U.S. Application No. 60/016,871, filed May 3, 1996, having Brian Lee Klosterman as the inventor and assigned to StarSight Telecast, Inc., and U.S. Provisional Patent Application "INFORMATION SYSTEM," U.S. Application No. 60/032,038, filed Nov. 26, 1996, having Brian Lee Klosterman and Steven Schein as the inventors and assigned to StarSight Telecast, Inc. The aforementioned, earlier filed applications are hereby incorporated by reference herein in their entireties.

BACKGROUND OF THE INVENTION

The present invention relates generally to a program schedule guide and, more particularly, to a system and process for allowing a television viewer to access on-screen television program listings and other information services in an easy and convenient way.

The number of television channels available to a user has grown dramatically within the last decade, primarily due to the availability of cable and direct broadcast satellite systems. As the number of programs of potential interest to the viewer has increased, a variety of electronic program guides have been developed to help the viewer select programs of particular interest. For example, commonly assigned U.S. Pat. Nos. 4,706,121 and 5,353,121 each describes schedule information processing systems which provide the viewer with a convenient way to select programs based on viewer supplied selection criteria.

Given the hectic lifestyle of today's society, a system which provides other information in addition to television program schedule information would be very convenient for the busy viewer. Examples of information viewers may desire are weather information, financial information, and the like. Hence, an information system such as a guide with regions reserved for such information would provide a valuable service to a user. Furthermore, these regions could be used for advertising or promotional purposes, which may or may not be interactive, thereby enabling more services to be provided without increasing the cost of the guide.

SUMMARY OF THE INVENTION

The system and method of the present invention provides a program schedule guide with information regions for displaying additional information. Alternatively, the additional information may be provided by a separate information guide, and a user may "hypertune" from the program schedule guide to the information guide, and vice versa. The information to be displayed is received by a peripheral device which can either be a stand-alone device, such as a set-top box or a web-browser box; or integrated into the user's television, VCR, computer, satellite IRD, cable box, and the like. In addition, the information may be displayed on a computer screen, a television screen, or a television monitor screen.

In a preferred embodiment of the invention, the program guide interactively displays a program schedule guide and the screen contains additional non-interactive information regions which can be used for displaying advertising or promotional messages for products or programs in a static or scrolling manner. The advertising may be for special programming events such as pay-per-view movies, current or upcoming programs, or for merchandise and services or messages to the user. The promotional information may relate to an individual network/broadcaster, or for a selected program, merchandise or services.

In another preferred embodiment of the invention, both the program guide and the information regions are interactive with the user. The interactive information regions may also display information in a static or scrolling manner, and may contain promotional information regarding a current or upcoming program or product advertising information. In addition, if the information region contains advertising information regarding a product, the user may click on the information region to see a billboard or schedule a recording of an infomercial on the product. The interactive program schedule guide and the information regions may further be combined with various other forms of information. Potential sources of additional information include news, sports, and weather. This additional information may either be available on command by the user, or continuously displayed within an area of the program guide. In another preferred embodiment, the information is displayed in a separate information guide.

In yet another preferred embodiment, the program guide is non-interactive, however the information regions containing the advertising and promotional information are interactive and may be either static or scrolling. The user may activate icons or menu items in the information regions or click on the region itself to gain access to additional displays of advertising and promotional information. In this embodiment, the user may switch between full screen display of the guide and a partial or reduced size picture-in-picture (PIP) window display of the guide via, for example, an on screen menu with cursor or pointer control. This feature allows a user to see a large scale version of the guide, or to be able to see the guide through a PIP window while also getting a "flavor" for a currently selected show through a partial observation of the show. Preferably in this mode, the audio for the show also continues to be played.

In preferred embodiments, if an information region is interactive and displays information regarding a program, the user may click on the information region and direct tune to the program if it is currently on. Alternatively, the user may schedule automatic tuning to the program when the program comes on. If the user schedules an "autotune," the system may request confirmation from the user just prior to, or at the time of the scheduled tuning of the program. Alternatively, the system may tune to the program directly. If the program is a pay-per-view program, the system may authorize payment for the program automatically. Preferably, the system will request user confirmation before tuning to or authorizing payment of the program. In addition, the user may choose to record a current program or record a future program. To do this, the user would highlight the program desired on the information region, then choose the record option, and the system would record a current program or asks if it should schedule recording of a future program.

In another preferred embodiment, the advertising or promotional information may appear only during times when the user is more likely to actually be watching the program schedule guide. The guide may further contain commercial icons that allow a user to get more information about the product or service advertised. In addition, the information displayed may change as the user moves the cursor from cell to cell in the program guide. Alternatively, the information displayed in the information regions may change after the passage of a predetermined number of seconds, regardless of user activity. Additional information regions may be displayed while the user confirms that he/she desires to autotune to an upcoming program. These information regions may contain advertising for products, programs, or services and may be displayed until the user makes his/her confirmation.

A further understanding of the nature and advantages of the present invention may be realized by reference to the remaining portions of the specification and the drawings.

BRIEF DESCRIPTION OF THE DRAWINGS

FIG. 3(a) is an illustration of a program schedule guide screen according to the present invention with program information, and information regions;

FIG. 4(a) is an illustration of an alternate embodiment of the program schedule guide screen according to the present invention with program information and an information region;

FIG. 5(a) is an illustration of an alternate embodiment of the program schedule guide screen according to the present invention with program information and an information region;

FIG. 6(a) is an illustration of an alternate embodiment of the program schedule guide screen according to the present invention with program information and an information region;

FIG. 6(b) is an illustration of an alternate embodiment of the program schedule guide screen which includes virtual channels;

FIG. 10(c) is an illustration of a sports information screen;

DESCRIPTION OF THE PREFERRED EMBODIMENT

Figure 1:
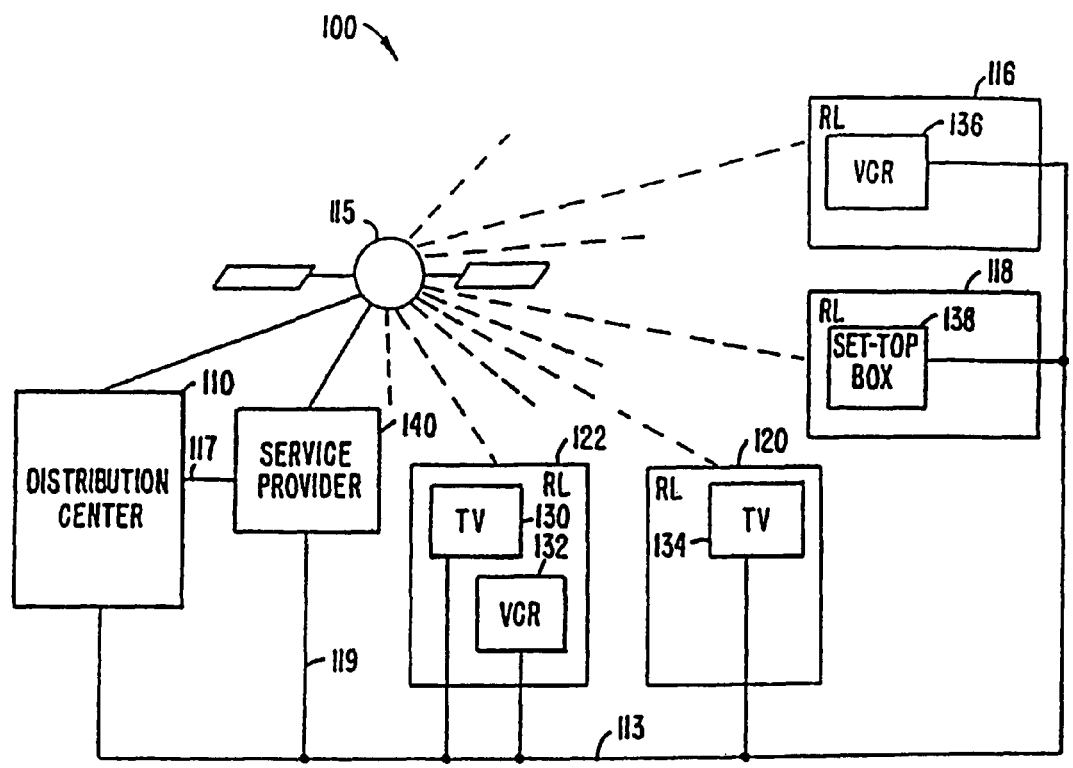
FIG. 1 illustrates a preferred embodiment of a system on which a program schedule guide according to the present invention may be displayed.

The present invention provides a schedule system which contains information regions for displaying other than television program schedule information. FIG. 1 illustrates a preferred embodiment of television/computer system 100 that displays a program schedule guide according to the present invention. As shown, system 100 includes a distribution center 110 and multiple receiving locations. Distribution center 110 compiles data for a data-stream. In a preferred embodiment, this data-stream is broadcast to receiving locations 116, 118, 120, and 122; and peripheral devices that are located within the receiving locations receive the data-stream. Several methods are available for broadcasting the data-stream from distribution center 110 to receiving locations 116-122. For example, satellite 115 may broadcast this data-stream within the vertical blanking interval (VBI) of a television channel (e.g., PBS) or a dedicated channel to receiving locations 116, 118, 120, and 122. Alternatively, the data may also be broadcast out of band, i.e., using non channel specific mechanisms. In another preferred embodiment, the data-stream is provided to receiving locations 116, 118, 120, and 122 via transmission system 113. Transmission system 113 may be, for example, optical fiber, coax cable, telephone line, over the air television broadcast, or the like.

In yet another embodiment, the peripheral devices receive the data-stream from, for example, a local service provider 140. Service provider 140 receives the data-stream from distribution center 110 via line 117, and broadcasts the data-stream to the receiving peripheral devices via satellite 115 (or another satellite), or via lines 119 and 113. The receiving peripheral devices may be televisions 130, televisions 134, VCRs 132, VCRs 136, and/or cable, satellite IRD, web-browser or set-top boxes 138. In still further embodiments, PCTVs or personal computers may be utilized, or the data-stream may be provided to a personal computer for use with the computer and/or one or more of the above devices. Hence, the system is not dependent on hardware platforms, rather it may be a software application that may be downloaded to different systems.

In a preferred embodiment, information in the data-stream includes television schedule information, advertising information, news information, weather information, financial information, internet address linking information, and the like. The information in the data-stream may further include messages from the system operator to a specific user or to subscribers of the system in general. Software applications, which may be downloaded from the distribution center or located within the peripheral devices, utilize the schedule information provided in the data-stream to generate a schedule guide. The news, weather, financial, and other information may be included in the schedule guide, or a separate information guide may be generated. Advertising information and messages from the system operator to a user are included on the schedule guide, and may be included on the information guide as well. In yet another preferred embodiment, data in the front and back end of the data-stream may be compressed to send a tickler instead of a regular full screen video display. The tickler would be a PIP window, and because the window size is small, the quality of the picture is sufficient even though it is generated from compressed data.

If the software applications are located within the peripheral devices, they may be stored on a computer-readable storage medium such as a RAM, disk, or other storage device. Where applicable, the computer-readable storage medium may also be a ROM. If the schedule guide is in a grid format, for example, the available channels may be listed on the "y" axis and various times may be listed on the "x" axis. For more information on how the schedule system displays information, see U.S. Pat. No. 4,706,121, U.S. Pat. No. 5,479,266, and U.S. Pat. No. 5,479,268. These patents, like the present patent application, are assigned to StarSight Telecast, Inc., and are hereby incorporated by reference in their entirety for all purposes.

In another preferred embodiment, satellite 115 has processing capability. Hence, in addition to distribution center 110, satellite 115 may also compile data for the data-stream. This embodiment is very advantageous as it ensures continued and reliable data transmission in situations where satellite 115 may not be able to receive data from distribution center 110. An example of such situations is during periods of atmospheric or terrestrial interferences, which occur when satellite 115 is in-line with distribution center 110 and the Sun. The Sun, having immense energy, emits a lot of noise thereby interfering with data transmission from distribution center 110 to satellite 115. With its own data processor, satellite 115 may continue to transmit data, hence, ensuring continued and reliable data transfer to the receiving locations. This embodiment also ensures continued and reliable data transmission when distribution center 110 is out of service.

Figure 2A:
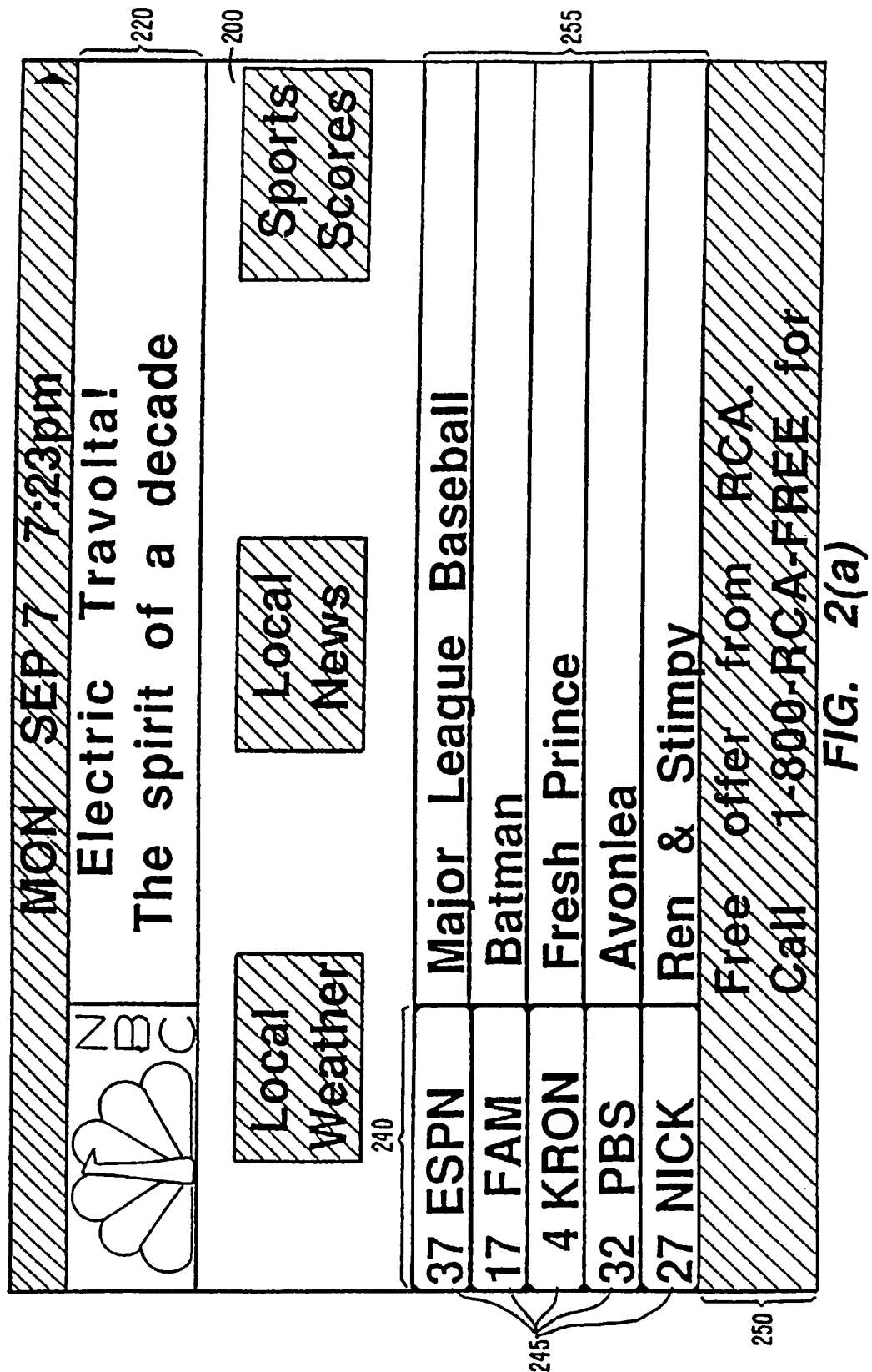
FIG. 2(a) is an illustration of a program schedule guide screen according to the present invention with program information, information icons, and information regions.

FIG. 2 is an illustration of a program schedule guide screen according to the present invention. As illustrated, program guide screen 200 has program information, information regions for offering product and program information, and information icons for offering information such as sports, news and the like. FIG. 2 shows only two information regions, 220 and 250, although guide screen 200 may have multiple information regions. As shown in FIG. 2, cell 220 shows a promotion for NBC's program featuring Travolta. Program guide screen 200 also contains an advertisement space 250. This space can be used to provide additional advertising opportunities, an example is advertisements for a system operator. Preferably the space is used for short advertisements that change periodically, for example, on three minute intervals. An example of a suitable advertisement is "Enjoy Coke!". Here cell 250 shows an advertisement from RCA. In another embodiment the information displayed in the information regions may change as the user moves from cell to cell in the program guide. Alternatively, the information may change automatically after the passage of a predetermined number of seconds, regardless of user activity. In addition or as an alternative, there may be commercial icons to allow the user to get more information about the product or service advertised.

Information regions 220 and 250 may be color coded or otherwise visually distinguished. They may also be placed at strategic positions within the guide to better catch the user's attention. As described, when an information region contains program information, such as cell 220, the user may move the cursor to the region (or the cursor may point to the region by default) and tune to the program if it is currently on. If the program is not currently on, the user may schedule an autotune to the program when the program airs. The user may further record a current program or schedule a recording of a future program. When an information region contains product information, such as cell 250, the user may click on the information region to tune to an infomercial on the product. Alternatively, the user may schedule an autotune to the infomercial at a later time period, or schedule a recording of the infomercial on the product. In a two way system, which has a back-channel for transmitting information or requests from the user, the user may also order a product by clicking on an information region and providing the necessary customer information for transmission to a supplier of the product, or to the system operator (service provider).

Portion 240 of guide screen 200 contains cells 245. Each cell 245 indicates the channel number corresponding to the program guide cell 255 lying immediately adjacent to it in the program guide. Instead of, or in combination with the channel number, cells 245 may contain the program service name. For example, a cell 245 may contain the channel number 32, the service name PBS, or both.

The system operator may charge television program providers an additional fee, per time slot, for promoting and featuring programs in the information regions. In this manner, the system operator may provide the guide to a user at a reduced price while providing more information. A number of different display arrangements can be used to draw the user's attention to such "special" programs. For example, the program may be listed first in the program guide, shown in a different typeface, presented in a different color, given additional space for a program description, or have some other form of graphic enhancement, including animation.

Figure 2B:
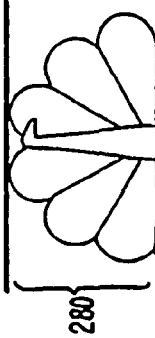
FIG. 2(b) is an illustration of a promotional message screen shown to the user when the user selects the information region of FIG. 2(a)

FIG. 2(b) is an illustration of a promotional message screen 260. Screen 260 is shown to the user when information region 220 is interactive, and the user clicks on information region 220. Promotional screen 260 may also contain an icon to allow immediate tuning to the program described by the promotional message. In addition, promotional screen 260 may contain another icon that returns the user to guide 200. Since the system operator may charge a fee for displaying such promotional information, some or all of a message portion 275 may also be used as an additional revenue source.

In FIG. 2(b), portion 275 contains the promotion: "Amid the flash of 70's Disco, an aspiring young dancer . . . ." This promotional material, which in this example would typically be provided by NBC, provides the user with several benefits. First, it allows a program to be promoted which is not currently represented in the program schedule guide. Second, portion 275 may be used to provide further information about a specific program, such as the starring actors or a brief description of the program content, thus possibly gaining a larger viewing audience or market share. Third, by promoting a program through prominent featuring of the program in the program guide, the broadcaster may be able to prevent potential viewers from becoming engrossed in a program which is to continue after the start time of the promoted program.

Portion 280 of screen 260 is used to indicate the sponsor of the promotional message shown in portion 275. The sponsor indication can be by broadcaster call letters, channel number, broadcaster name, or broadcaster insignia (e.g., the NBC peacock). It is also possible to eliminate portion 280, thereby enlarging portion 275. Additional information may therefore be displayed in portion 275. Since portion 280 of screen 260 displays information regarding a program, the user may click on the information region and direct tune to the program if it is currently on. Alternatively, the user may schedule automatic tuning to the program when the program comes on. If the user schedules an autotune, the system may request confirmation from the user before tuning to the program, or the system may tune to the program directly. Preferably, the system will request user confirmation before tuning to the program. If user confirmation is requested, additional information regions/may be displayed until the user makes his confirmation. These information regions may include advertising for products or services.

If the promoted program is a pay-per-view program, the system may authorize payment for the program automatically. Preferably, the system will request user confirmation before authorizing payment of the program. The user may further choose to record the promoted program, whether it is a current program, a future program, or a pay-per-view program. If the user requests recording of a pay-per-view program, the system may ask for confirmation before authorizing payment for the program. If the user requests recording of a future program, the system may also request user confirmation. Additional information regions may also be displayed while the user confirms his/her recording request.

If an information region displays advertising or promotional material, the user may activate an icon, click on the region, or select a menu item to view additional information about the product or service advertised. From these additional information displays, the user may learn more about the product or service, order the product or service, or find out where the product or service may be obtained. The additional displays would of course allow the user to return to the previous displays after the user has seen the desired information displays.

The invention may also allow the user to switch between full screen display and a PIP window display of the guide via, for example, an on screen menu with cursor control, This feature would allow a user to see a large scale version of the guide, or to be able to see the guide while also getting a "flavor" for a currently selected show through only partial observation of the show. Preferably in this mode, the audio for the show also continues to be played.

Figure 3B:
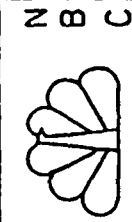
FIG. 3(b) is an illustration of a promotional message screen shown to the user when the user selects the information region of FIG. 3(a)

FIG. 3(a) is an illustration of a program schedule guide screen 300 with program information 320 and interactive information regions 330 and 340. As can be seen, guide screen 300 does not contain information icons. Hence, more schedule information may be shown on the screen, thereby allowing the user to access more schedule information per screen. Information region 320, like information region 220, promotes a program. In addition, it provides a brief description of the program content, thereby allowing information other than program description to be shown on promotional message screen 350 (FIG. 3(b)). As shown by FIG. 3(b), message screen 350 contains contest information, however, other information related to the program may also be shown on screen 350.

Figure 4B:
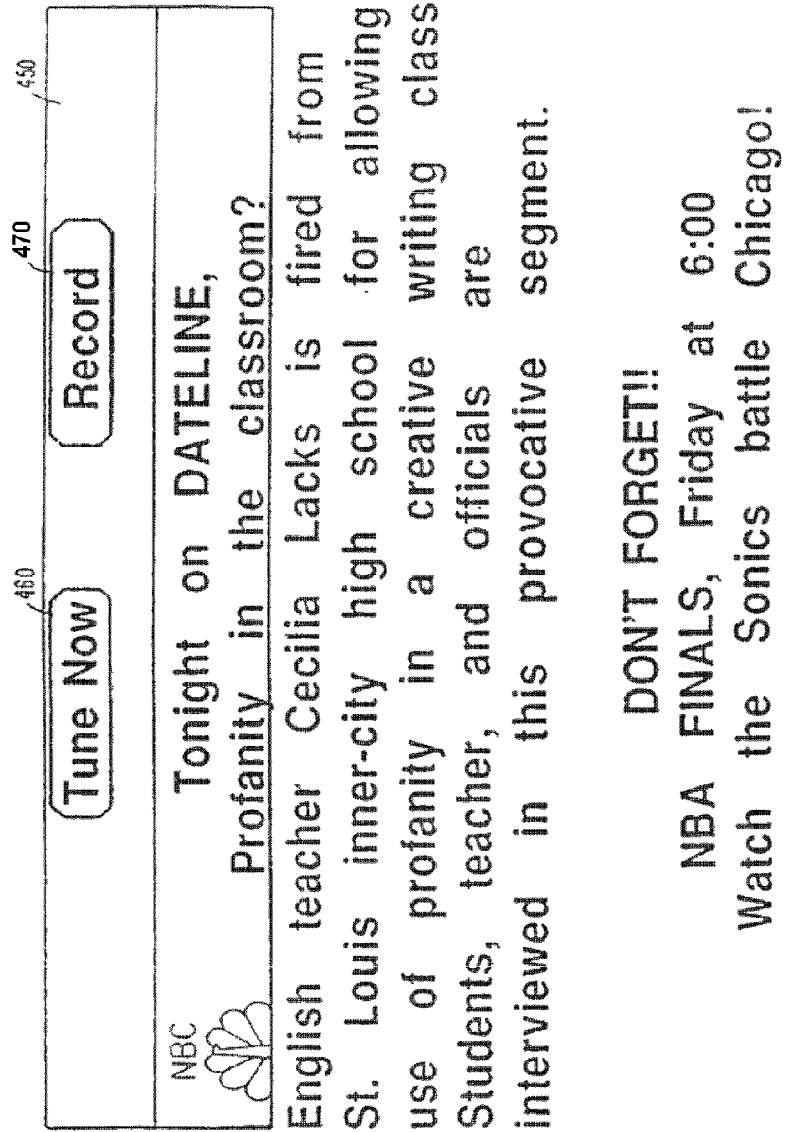
FIG. 4(b) is an illustration of a promotional message screen shown to the user when the user selects the information region of FIG. 4(a)

FIG. 4(a) is an illustration of a program schedule guide screen 400. As shown, the user may move a cursor across region 410 to move between the different days of the week. In FIG. 4(a), the user has selected Wednesday. Hence, the schedule information displayed is for Wednesday, and the time shown is the current time. The system knows what time the user is watching television, and automatically adjusts the cursor to be located on default on a cell that corresponds to the current time.

As shown, guide screen 400 has one information region 420, which is promoting a program that may be on shortly or is currently on. Information region 420 is interactive. Hence, if the user clicks on region 420, the user may see message screen 450 (FIG. 4(a)), which displays a description of the program content. In addition, message screen 450 may also display promotional materials about an upcoming program, This way, the system operator may indirectly promote multiple programs on region 420. If the program is currently on, the user may click on icon 460 to tune to the program. If the program will come on shortly, the user will be tuned to the channel that corresponds to the program. Alternatively, the user may click on icon 470 to start recording the program if the program is on. On occasions where the program will come on shortly, the system will start recording the program when the program comes on.

Figure 5B:
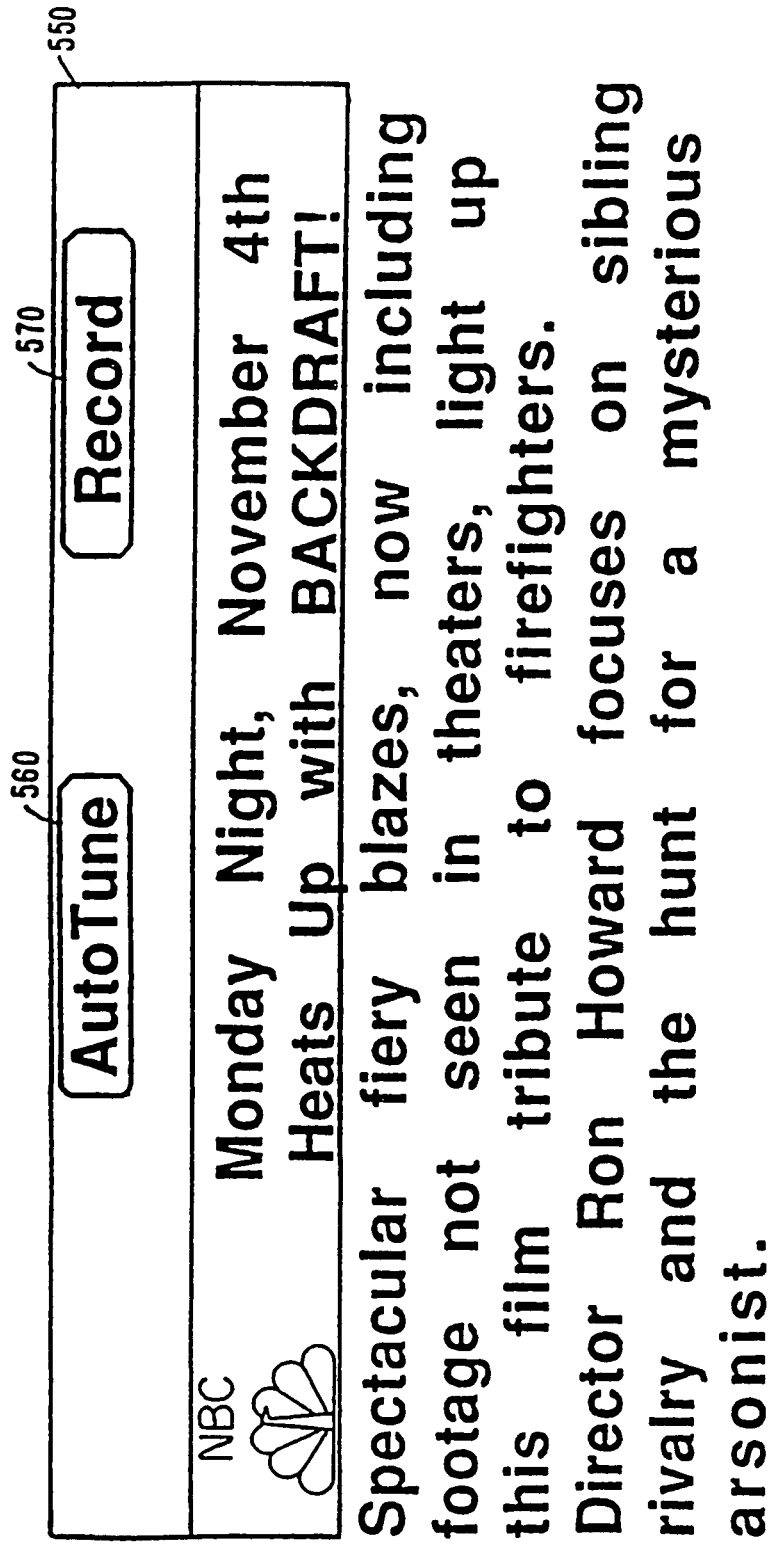
FIG. 5(b) is an illustration of a promotional message screen shown to the user when the user selects the information region of FIG. 5(a)

FIG. 5(a) is an illustration of a program schedule guide screen 500. As shown, guide screen 500 has one information region 520, which is interactive. Information region 520 is promoting a program that will air in the future. In this case, if the user clicks on region 520, the user may see message screen 550 (FIG. 5(b)), which also displays a description of the program content. In another embodiment, message screen 500 may also contain an icon, which the user may click on to view a short video preview. This preview may be shown in a PIP window, and the preview video data may be transmitted in a compressed format. As mentioned, the size of the window allows a decent video display to be generated from compressed data. Message screen 550 also displays promotional materials about an upcoming program. However, because the program will not air until a later date, message screen 550 has icon 560, which when clicked on by the user, will allow the user to schedule an autotune to the program when the program comes on. Once the user has scheduled an autotune, the system will automatically tune to the program when the program airs. Preferably, user confirmation is requested before the system tunes to the program. Alternatively, the user may click on icon 570 to schedule a recording of the program. The system will automatically start recording the program when the program comes on.

In another embodiment, the system may automatically tune a user to a promoted program when the program comes on. This may happen whether or not the user has scheduled an autotune to the program. Preferably, the system will ask the user whether the user wishes to tune to the program before automatically tuning to the program.

The interactive and non-interactive information screens may both be used for displaying scrolling messages or static messages. As discussed, these information screens may be used to promote programs as well as products. In addition, the information screens may also be used to send messages to specific users, for example, alerting a user that his/her bill is overdue. This is because each guide system has a unique unit address. Hence, the system operator is able to send messages to specific users by sending the messages to the respective unit addresses. Of course, the information screens may be used to send system wide messages to all users. For example, the information screens may be used to send alerts to all users, for example, of an impending disaster. The information screens may further be used to send messages to a specific group of users. For example, the system could send a message to all Magnavox television owners by checking for Magnavox television codes as this information is entered into the system when the user first sets up the system. To ensure that messages to the users are read by the users, such messages will have a bit attached to them that keeps them in the information screen until the user indicates that he/she has seen the message. The user may indicate that he/she has seen the message by pushing a button on a user input device or by clicking on an icon on the guide to clear the message. This way, even though the message may be placed by the system operator in the morning, the user may still see the message when the user watches television at Prime Time. After the message is cleared, the system will place advertisements or promotions appropriate for the time when the message is cleared in the information screen.

Figure 6C:
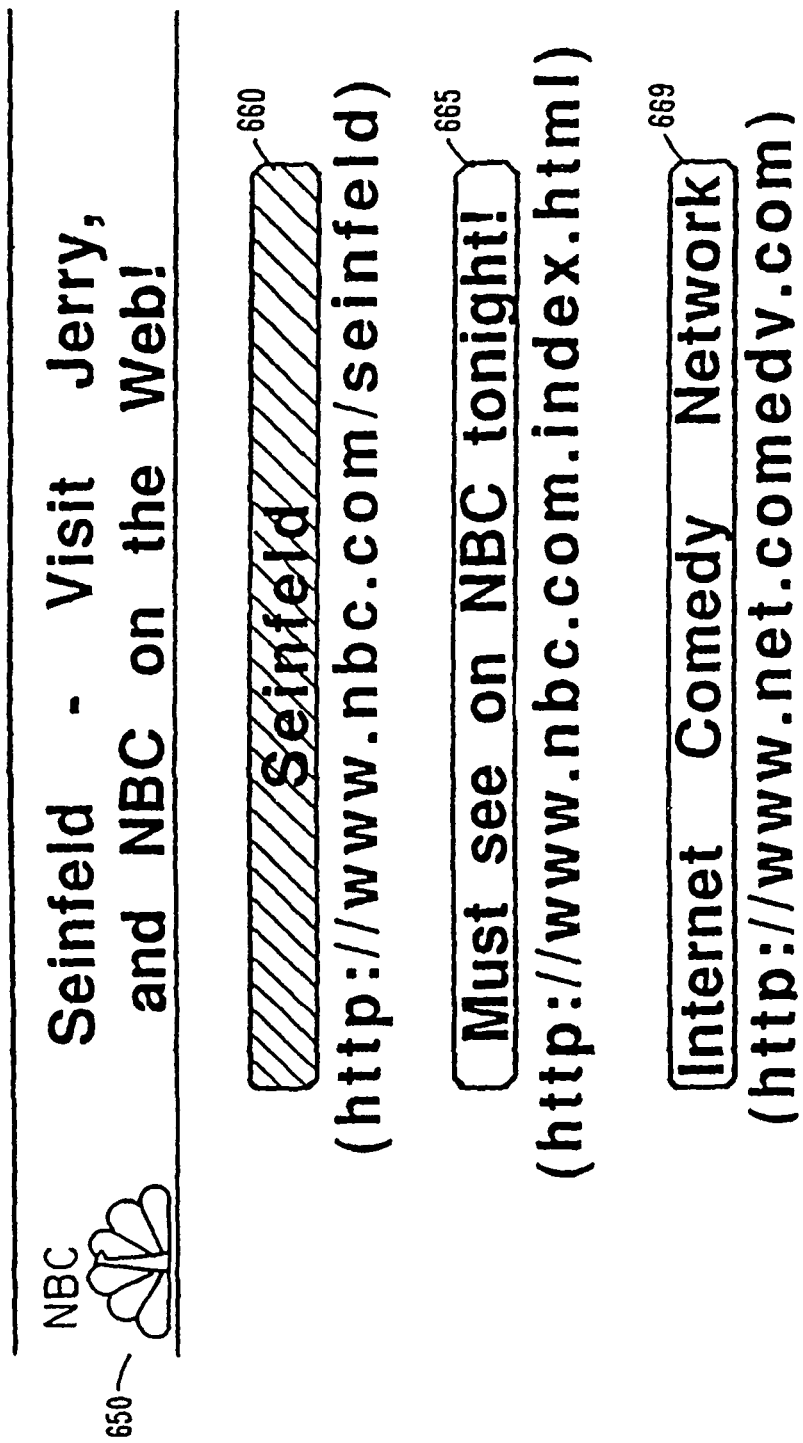
FIG. 6(c) is an illustration of a submenu screen shown to the user when the user selects the information region of FIG. 6(a) or the virtual channel of FIG. 6(b)

FIG. 6(a) is an illustration of a program schedule guide screen 600. As shown, guide screen 600 has an interactive information region 620, which promotes a website connected with a program. In an alternate embodiment (FIG. 6(b)), guide screen 600 may include a virtual channel 640. A virtual channel is a channel that does not tune to television programs; instead, the channel may launch an application, connect to an internet site, connect to an information guide, and the like. In the example as shown in FIG. 6(b), virtual channel 640 contains an internet address—also called a Uniform Resource Locator (URL); hence it connects to an internet site. As shown in FIG. 6(b), region 620 may be used to display promotional materials in this alternate embodiment. If a user selects virtual channel 640 of FIG. 6(b), or information region 620 of FIG. 6(a), the user may see submenu screen 650 of FIG. 6(c).

Figure 6D:
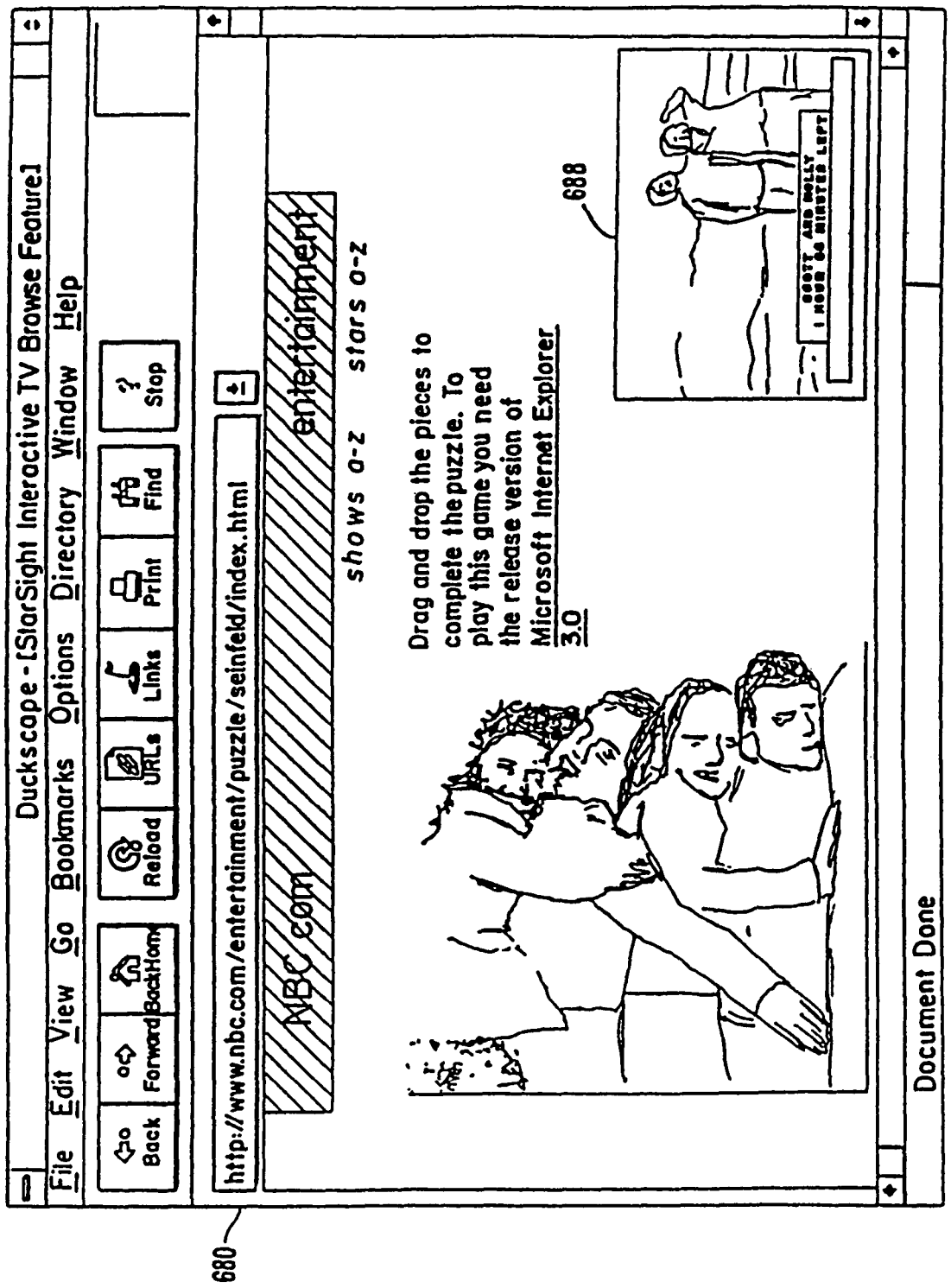
FIG. 6(d) is an illustration of a data page shown to the user when the user selects one of the options shown in the submenu screen of FIG. 6(c)

As shown in FIG. 6(c), the user may choose to connect to the Seinfeld web page, the NBC web page that promotes the Seinfeld show, or the Comedy Network web page by clicking on one of the three website icons 660, 665, and 669, respectively. The system will launch a web-browser when the user selects an information region that promotes a website, or tunes to a virtual channel containing a URL. After the user has made his/her selection, the system will insert the URL corresponding to the selected website into the web-browser, which will begin to access the web and search for the website selected by the user to connect the user to the website data page. Hence, if the user selects one of the website icons, the system will connect the user to the website that corresponds to the icon. FIG. 6(d) is an illustration of a web page 680 shown to the user when the user chooses to connect to the NBC web page. As shown, after the user is connected to the page, the user may participate in promotions on the page just as if the user had connected to the page directly through a web-browser.

FIG. 6(d) further shows window 688, which shows the television program that the user was viewing before the user selected virtual channel 640 from program guide screen 600 of FIG. 6(b), or clicked on information region 620 of FIG. 6(a). The user may resume watching the television program by clicking on window 688. This is referred to as "hypertuning," and the system will return the user to the program the user was viewing. While the user is viewing the program, the system preferably displays a network icon that the user may click on to hypertune to the web page. Alternatively, the system may display the page in a picture-in-picture window such as window 688 while the viewer is viewing a program. The user may click on the picture-in-picture web page to hypertune to the page.

In another preferred embodiment, after the user has selected either icon 660, 665, or 669 of FIG. 6(c), the user may tune to the program the viewer was watching before accessing the guide. The system will display a "searching" symbol while launching a web-browser and searching for the website that the user has requested. After the system has connected to the website, the system will notify the user that the search is complete, and asks whether the user wishes to hypertune to the web page. In yet another preferred embodiment, the user may click on any program titles shown in the program guide cells, and the system will display a list of one or more websites that are related to the program. The user may select to tune to the program or connect to one of the websites. In addition, the user may click on an icon or press a remote control button to toggle between watching television and browsing the web.

Figure 7:
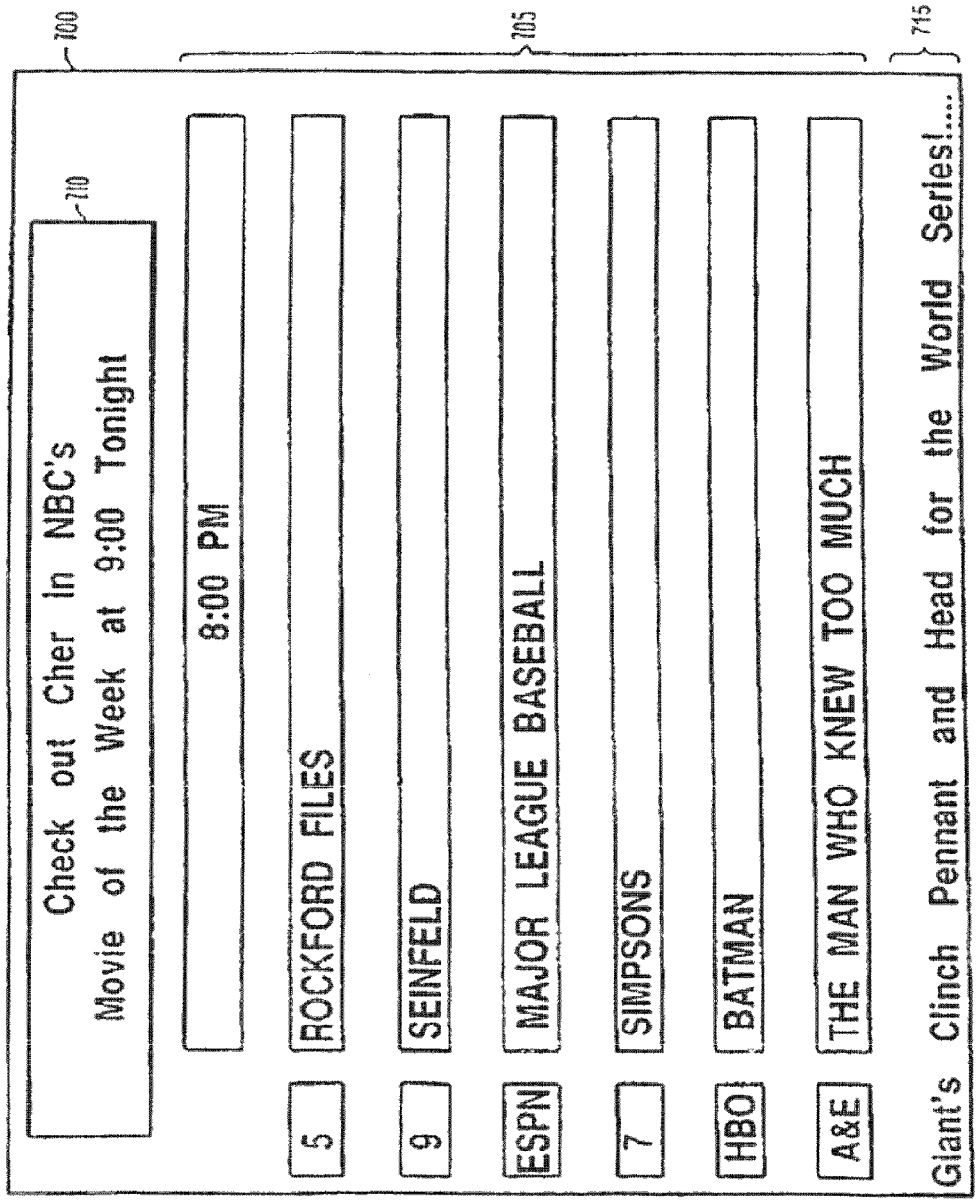
FIG. 7 is an illustration of an alternate embodiment of the program schedule guide which includes information regions.

FIG. 7 is an illustration of a program schedule guide screen 700 with non-interactive program portion 705 and interactive information regions 710 and 715. Portion 705, as shown, is a time slice of schedule information for current programs. Since the user may not interact with portion 705 of guide screen 700, portion 705 may be updated automatically over time to show current and future programs. The amount of future programs shown may be predetermined. Hence, the user may see what is currently on, and what programs will come on up to a predetermined amount of time. However, the user may not obtain more information regarding the programs, tune to the programs from portion 705, or record the programs from portion 705.

As shown in FIG. 7, information region 710 contains program promotional information. Since information region 710 is interactive with the user, the user may click on information region 710 to get further information about the programs shown in the region. The user may further click on information region 710 to tune to the program if it is currently on, or the user may schedule an autotune to the program when it comes on. When autotune is scheduled, the system may or may not notify the user before automatically tuning to the program when the program comes on. Preferably, the system will request confirmation from the user before automatically tuning to the program. Finally, the user may schedule a recording of a future program or begin recording of a program currently on. As discussed, if the system requests confirmation from the user, additional information regions may be displayed while the user confirms his/her request.

Information region 715 may either be a static or scrolling message area that contains selected news or sports information. For example, the latest sports scores can scroll across information region 715. Although in the preferred embodiment, the type of information shown in information region 715 is determined by the system operator, it is also possible to allow the user to select the type of information to be shown in information region 715.

Figure 8:
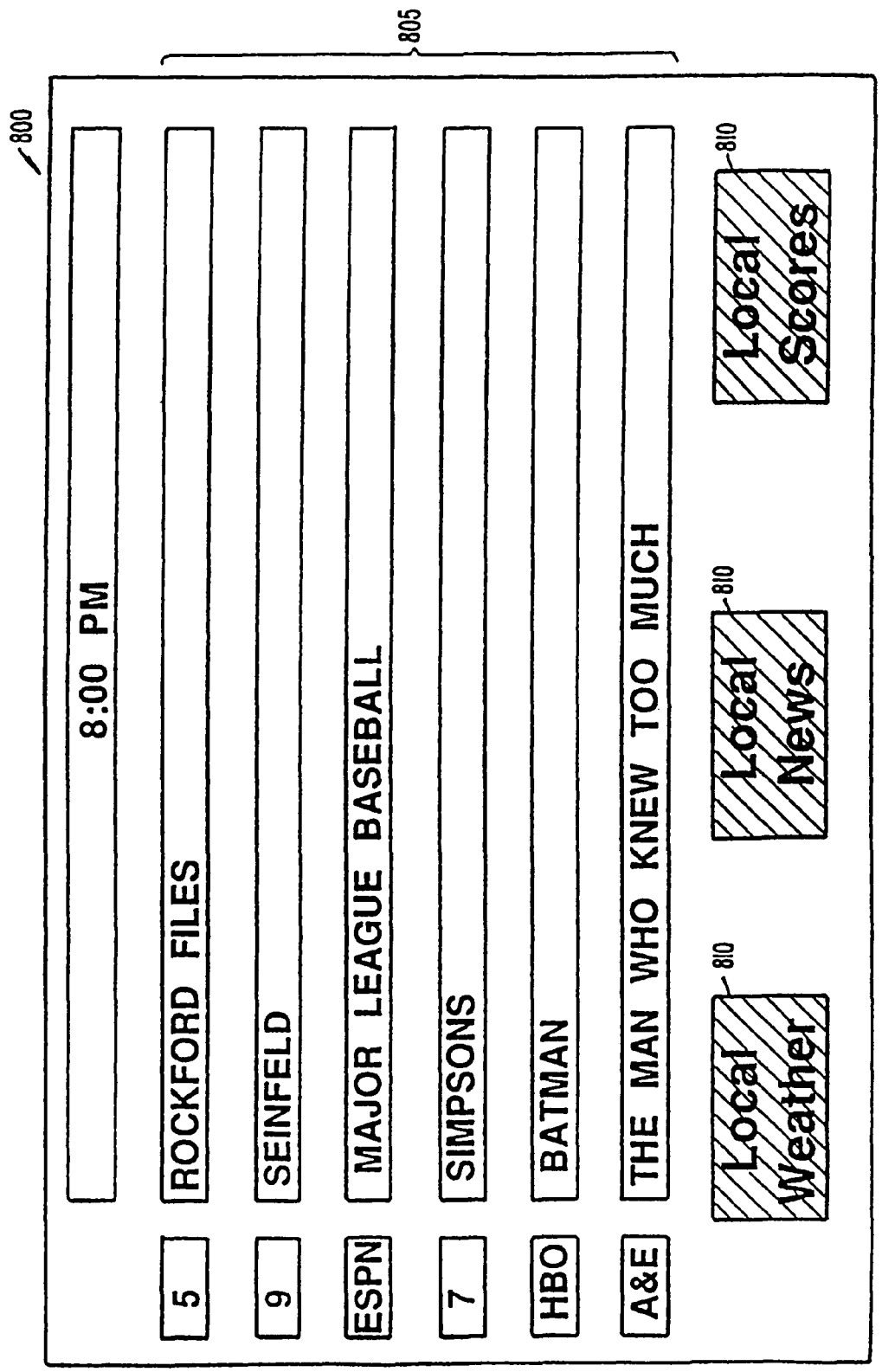
FIG. 8 is an illustration of an alternate embodiment of the program schedule guide screen which includes information icons.

FIG. 8 is an illustration of a program guide screen 800. Screen 800 contains a program schedule portion 805 similar in nature to the schedule guides previously described. In addition, screen 800 contains several information icons 810. Icons 810 can represent local or national weather forecasts, local or national news, sports news, sports scores, financial news, and the like. In response to the user selecting one of icons 810, screen 800 may be replaced with one or more additional information screens. For example, the weather information screen may display the current weather conditions or weather predictions for a plurality of regions. The sports score information screen may have icons or regions to represent each of a plurality of sports. A user may click on the individual icons or regions to view another screen dedicated to a single sport, or the sports score information screen may display the scores for different sports and sports teams on the same screen. The financial news information screen may likewise have icons or regions that the user may click on to choose other screens dedicated to specific financial markets. Alternatively, the financial news information screen may combine and display the financial markets on one screen.

Figure 9A:
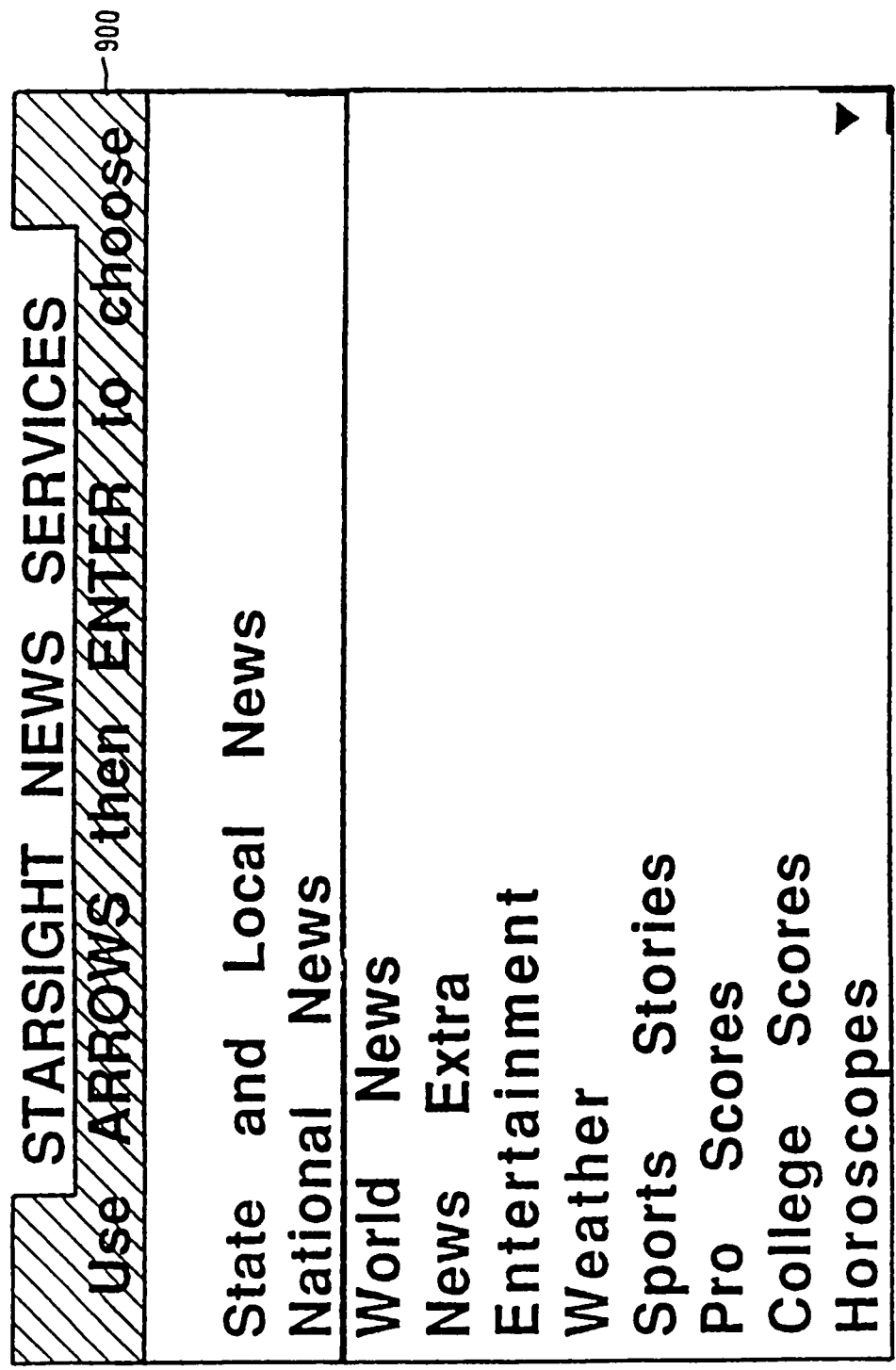
FIG. 9(a) is an illustration of an embodiment of the information guide.

FIG. 9(a) is an illustration of an information guide screen 900. As shown, information guide screen 900 contains news, weather, sports, and horoscope information, however, other types of information may also be shown by information guide screen 900. As discussed, in an alternate embodiment, an information guide may be provided in addition to the program guide. The information guide may be connected to the program guide, or it may be a separate program. Since the information guide contains news, weather, sports, and other information, it may replace the information icons on the program guide, thereby allowing the program guide screen to show the user more program information.

Figure 9B:
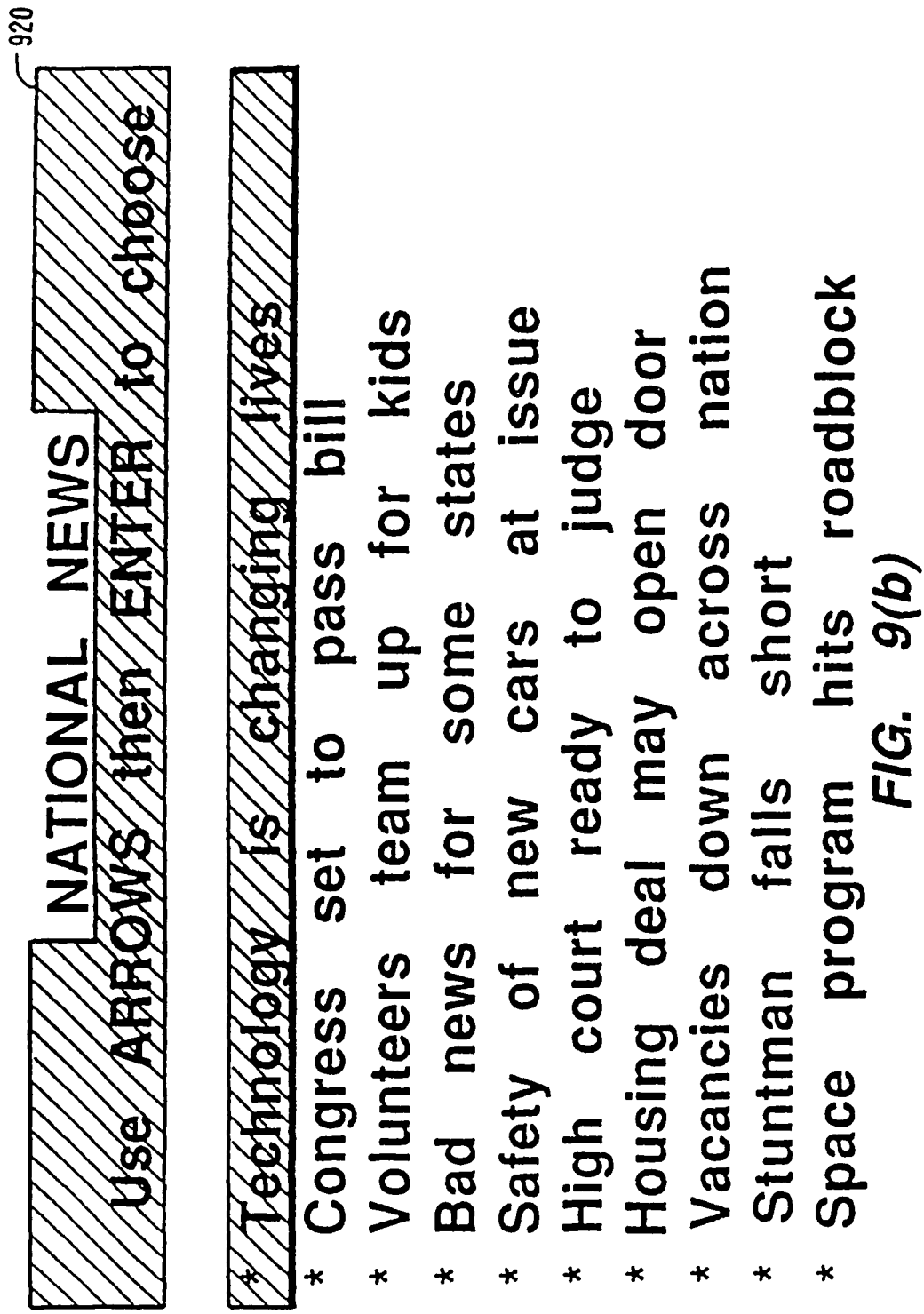
FIG. 9(b) is an illustration of a submenu of the information guide with news highlighted.

In FIG. 9(a), the user has selected "National News." FIG. 9(b) is an illustration of a submenu 920 of information guide screen 900. As can be seen, submenu 920 further breaks "National News" down into the different headlines. In a preferred embodiment, the user may tune to CNN or other Network News Station from submenu 920. The system operator may charge a fee for this service, and may allow the user to tune to one or more Network News Station depending on the fees paid by the Network News Providers. Hence, CNN, for example, may pay a premium fee to be the only News Station that the user may connect to from submenu 920. Alternatively, CNN may pay a regular fee, and the user may tune to CNN, and other News Stations that have paid the regular fee.

Figure 9C:
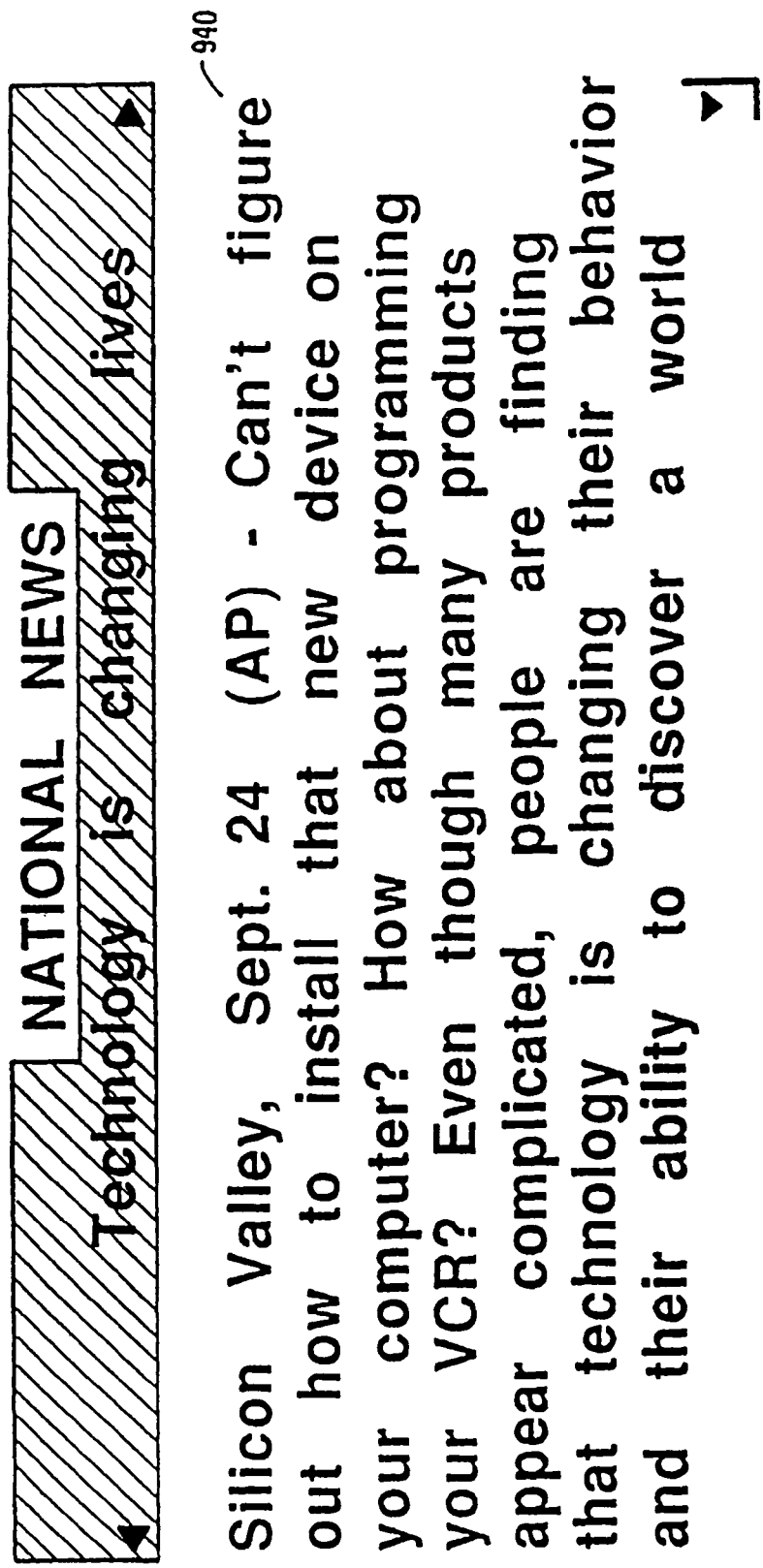
FIG. 9(c) is an illustration of a news information screen.

From submenu 920, the user may highlight one of the headlines to select the headline and obtain the story. In this example, the story is displayed according to FIG. 9(c) in a news information screen 940. Alternatively, the user may click on a video icon (not shown) on screen 940 to further view a video dip relating to the story. The system may access the video clip via the video network, i.e., via cable, direct broadcast satellite, and the like. The video clip could be generated from compressed data, and if so, it may be presented in a PIP tickler format. Alternatively, the system may link to, for example, CNN's website, and retrieve an Audio-Video-Interleaved (AVI) file to present a moving picture related to the headline to the user. The video icon may also be available from submenu screen 920. Hence the user may click on the icon to view a video clip of the headline directly instead of reading the story. In another preferred embodiment, the system may automatically activate a video clip corresponding to whichever news headline that the user has selected, thereby eliminating the need for the user to activate an icon in order to view the video clip.

Figure 10A:
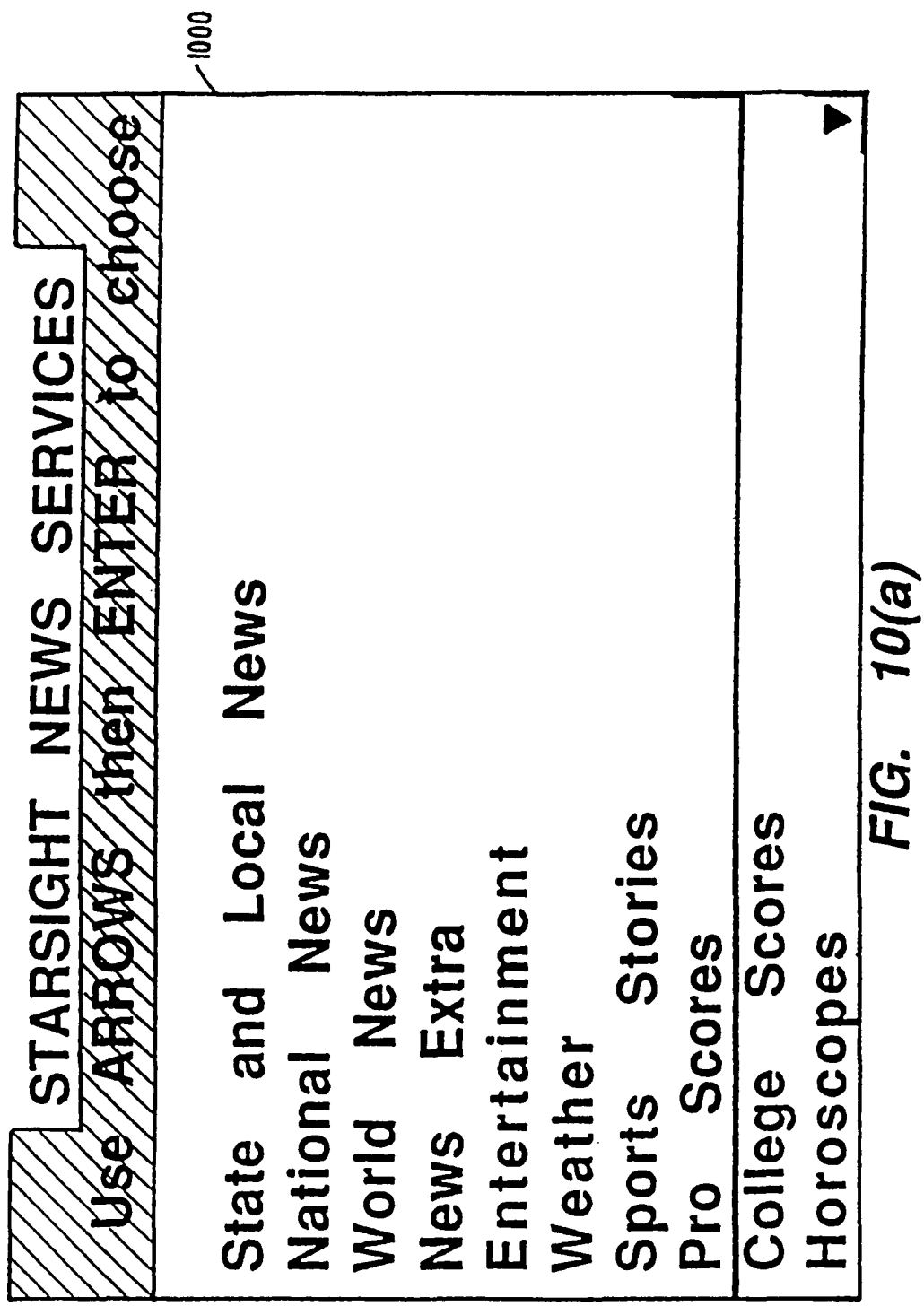
FIG. 10(a) is an illustration of an alternate embodiment of a submenu of the information guide with sports highlighted.
Figure 10B:
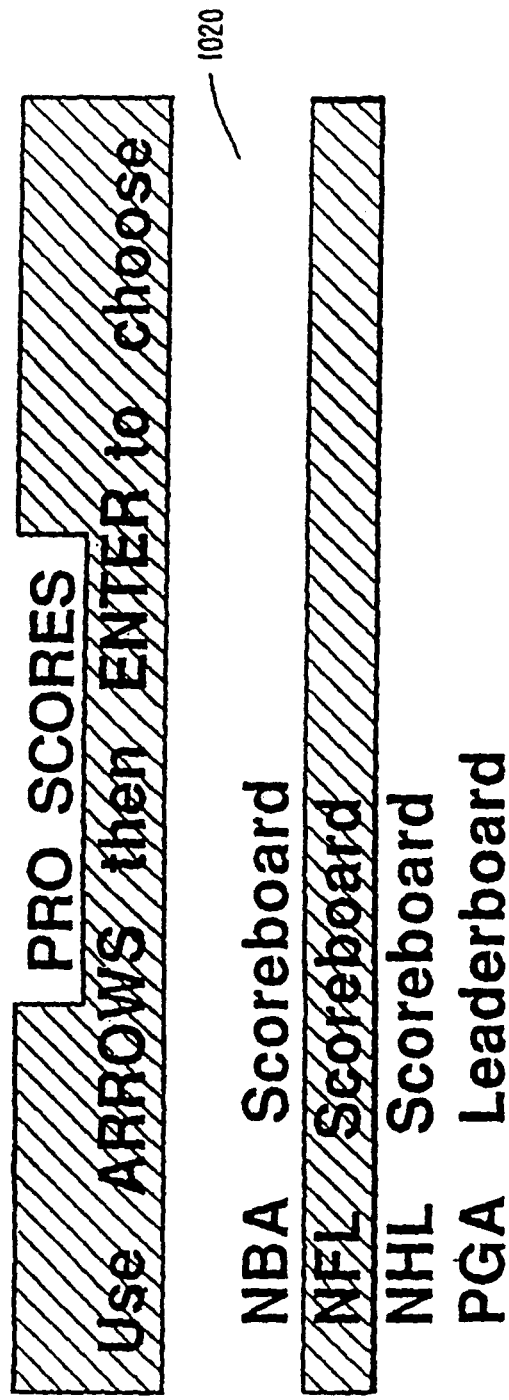
FIG. 10(b) is an illustration of a sports submenu.

FIG. 10(a) is an illustration of an information guide screen 1000 that is similar to information guide screen 900 except in FIG. 10(a), the user has selected "Pro Scores" instead of "National News." FIG. 10(b) is an illustration of a submenu 1020, which further breaks down "Pro Scores" into the different scoreboards. In a preferred embodiment, similar to the news submenu 920, the user may tune to ESPN or other Sports Station from sports submenu 1020. The system operator may also charge a fee for this service, and may allow the user to rune to one or more Sports Station depending on the fees paid by the Providers. Hence, ESPN may also, for example, pay a premium fee to be the only Sports Station that the user may connect to from submenu 1020. Alternatively, ESPN may pay a regular fee, and the user may tune to ESPN, and other Sports Stations that have also paid the regular fee.

From submenu 1020, the user may highlight one of the scoreboards to select the scoreboard and obtain scores pertaining to the board. In this example, the scores are displayed according to FIG. 10(c) in a sports information screen 1040. As shown in screen 1040, the scores are presented in grid format. Other arrangements may of course be used, so long as the information is presented in a logical fashion. From information screen 1040, the user may also click on a video icon (not shown) to further view a video clip relating to the game. As discussed, the system may access the video clip via the video network, i.e., via cable, direct broadcast satellite, and the like, and this video clip could be generated from compressed data. Alternatively, the system may link to, for example, the NFL's website, and retrieve an AVI file, if it is available, to present a moving picture related to the game to the user.

Figure 11A:
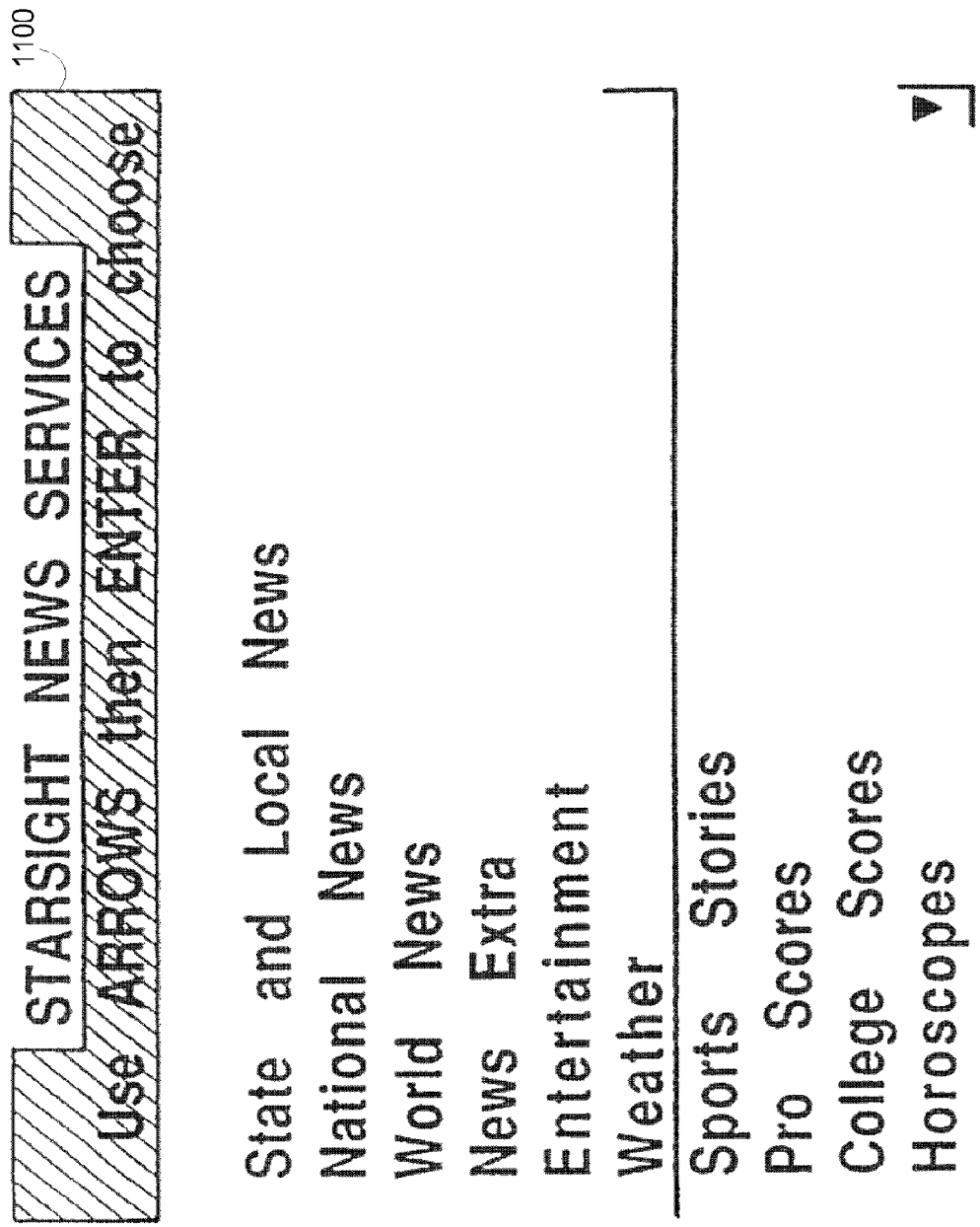
FIG. 11(a) is an illustration of an alternate embodiment of the information screen with weather highlighted.
Figure 11B:
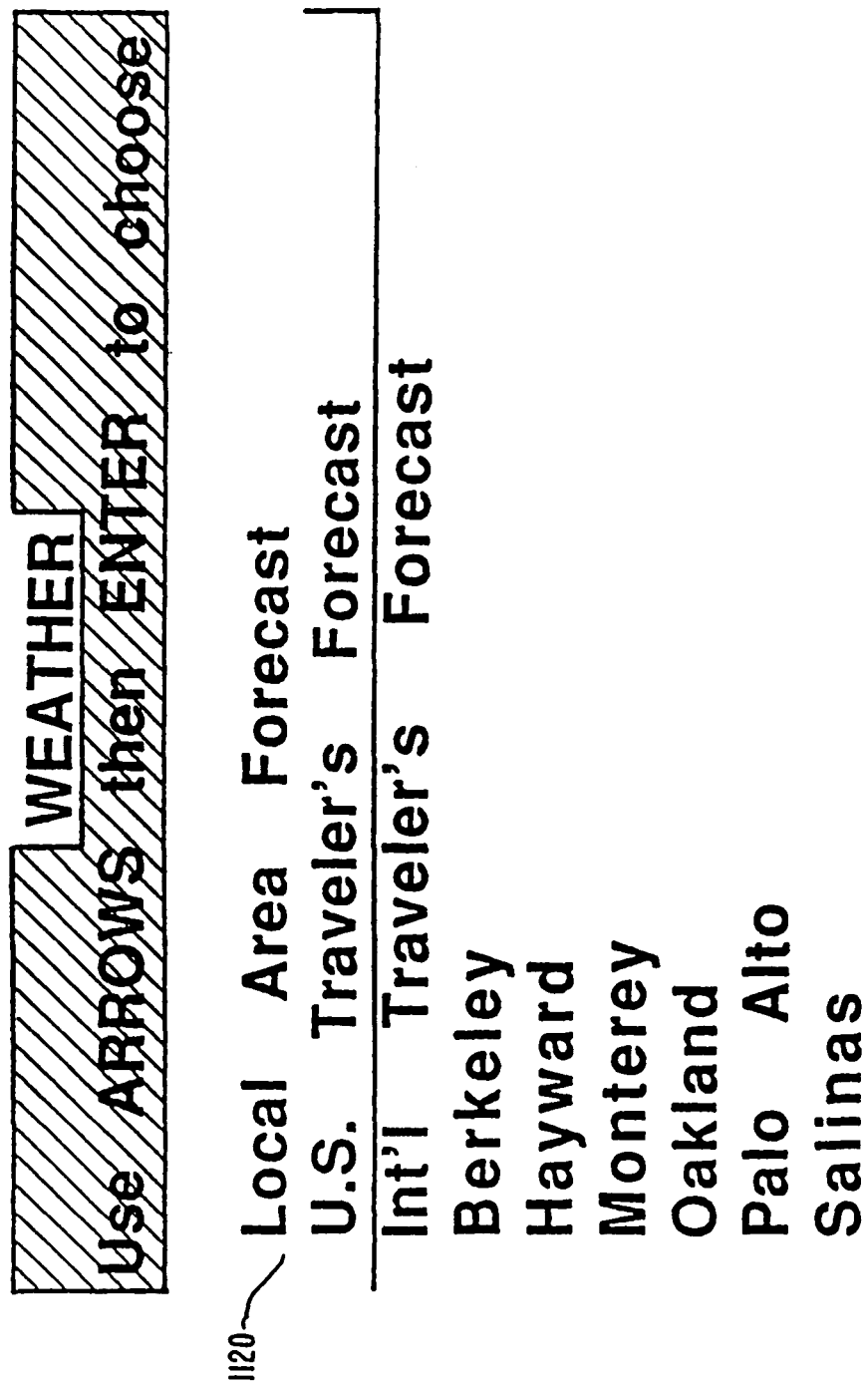
FIG. 11(b) is an illustration of a weather submenu.

FIG. 11(a) is an illustration of an information guide screen 1100 that is also similar to information guide screen 900 except in FIG. 11(a), the user has selected "Weather" instead of "National News." FIG. 11(b) is an illustration of a submenu 1120, which further breaks down "Weather" into weather forecasts for the different geographic regions. The system displays different local weather forecasts depending on the location of the user. In the example as shown in FIG. 11(b), the user is located in California, along the East Bay; hence, the local weather forecasts are for the different East Bay cities. In another embodiment, the user may specify the geographic region. Hence, the user may obtain also weather information for regions other than where the user is located.

Figure 11C:
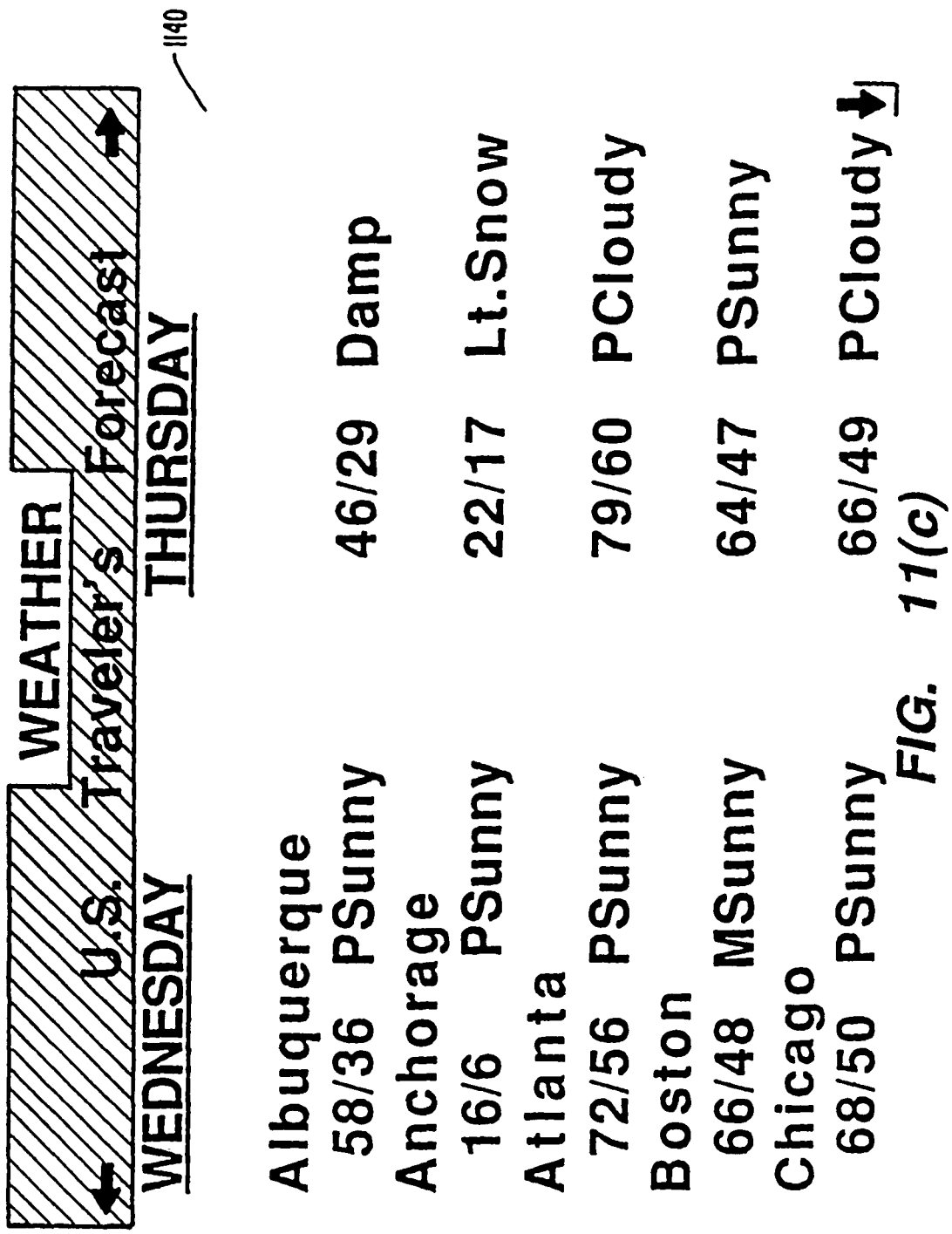
FIG. 11(c) is an illustration of a weather information screen.
Figure 11D:
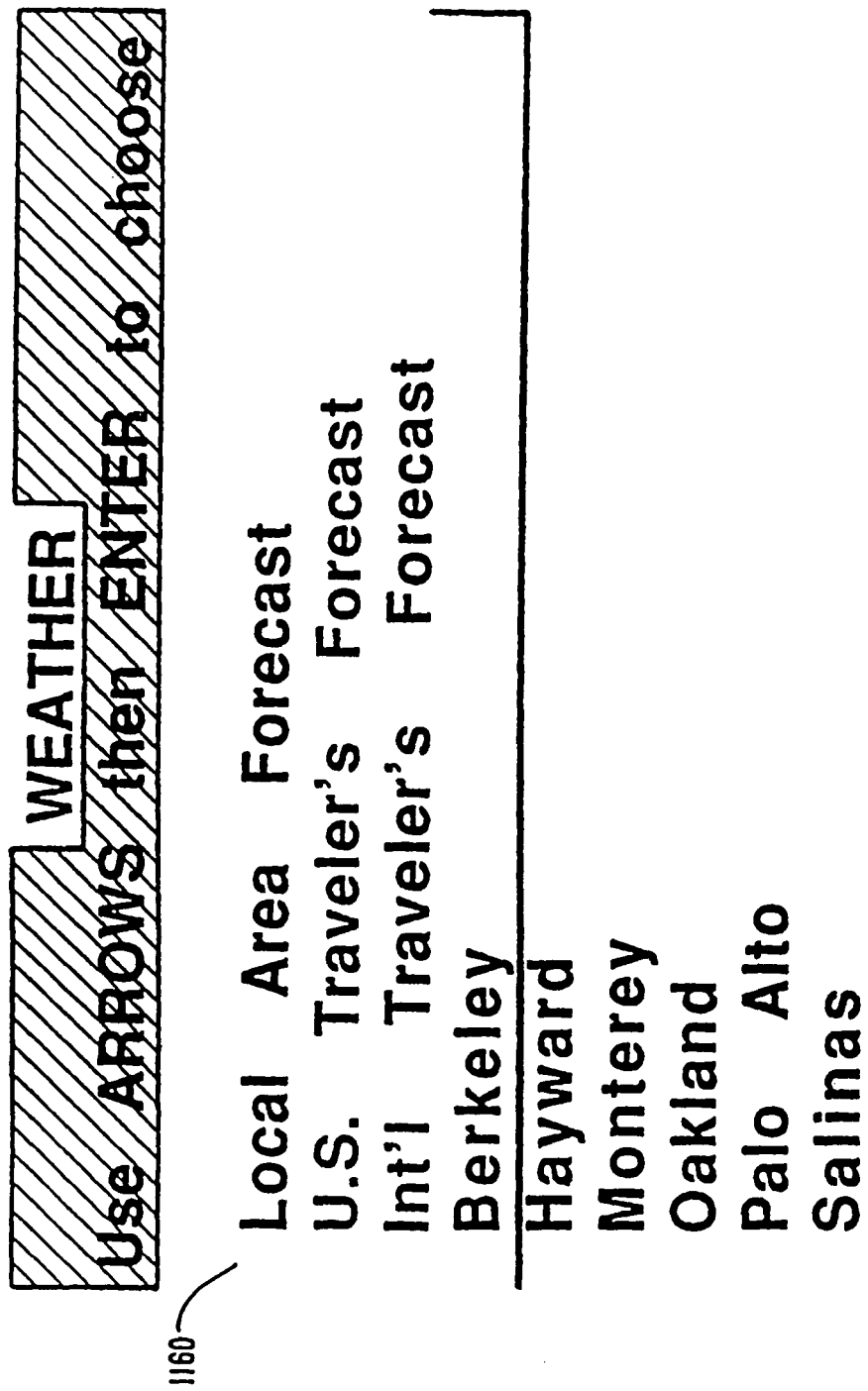
FIG. 11(d) is an illustration of an alternate embodiment of the weather submenu.
Figure 11E:
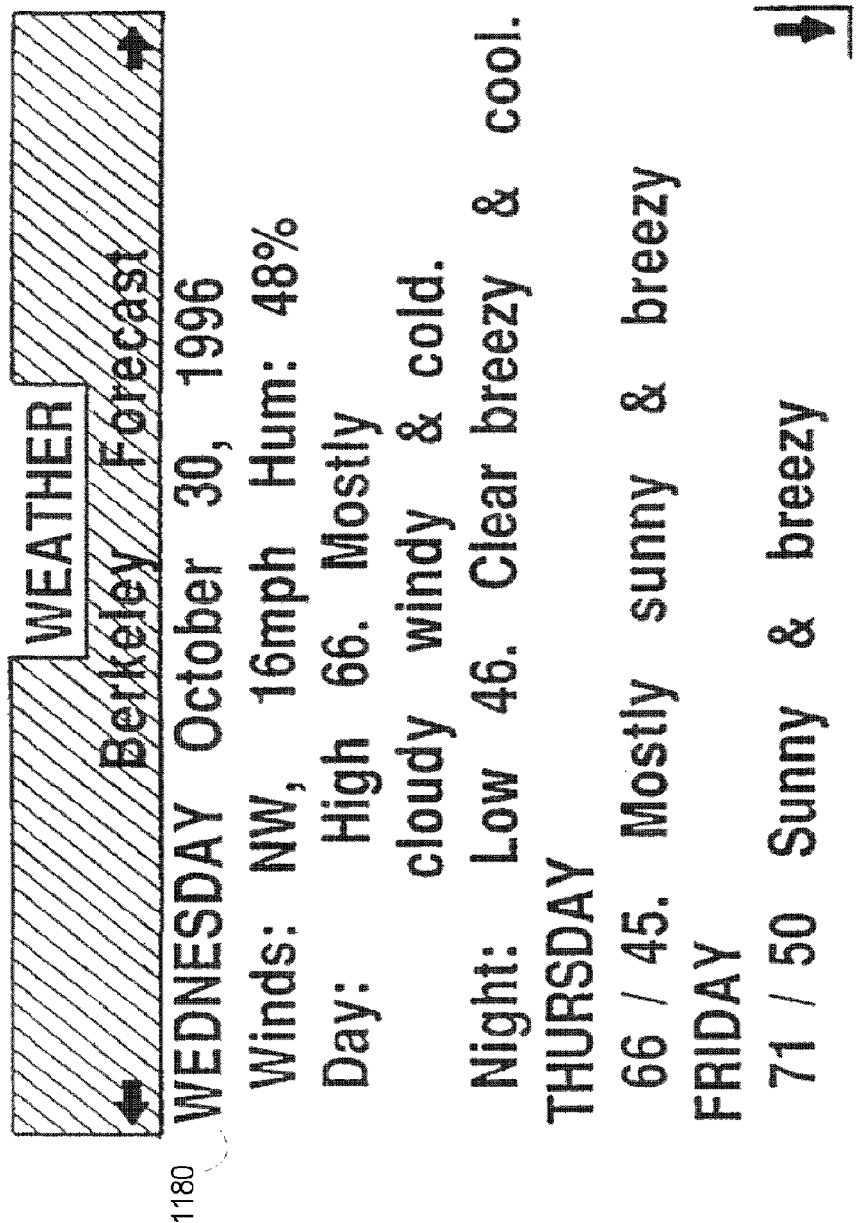
FIG. 11(e) is an illustration of an alternate embodiment of a weather and information screen.

In FIG. 11(b), the user has selected weather forecast for the United States, hence, the user may be shown a U.S. weather information screen 1140 (FIG. 11(c)), which displays the information in a column fashion. Other display arrangements that displays the information in a logical manner may also be used; furthermore, the information may be more detailed than that shown in information screen 1140. FIG. 11(d) is an illustration of a submenu 1160 that is similar to submenu 1120 except in FIG. 11(d), the user has selected weather forecast for Berkeley, instead of for the U.S. Hence, the user is shown a forecast of Berkeley weather in an information screen 1180 (FIG. 11(e)) instead. Since the weather information is for a local region, it is more detailed and provides more information to the user. As shown in FIG. 11(e), the weather information is displayed in a row fashion. Again, other arrangements for presenting the weather information may also be used as long as the information is organized in a logical manner.

Figure 12:
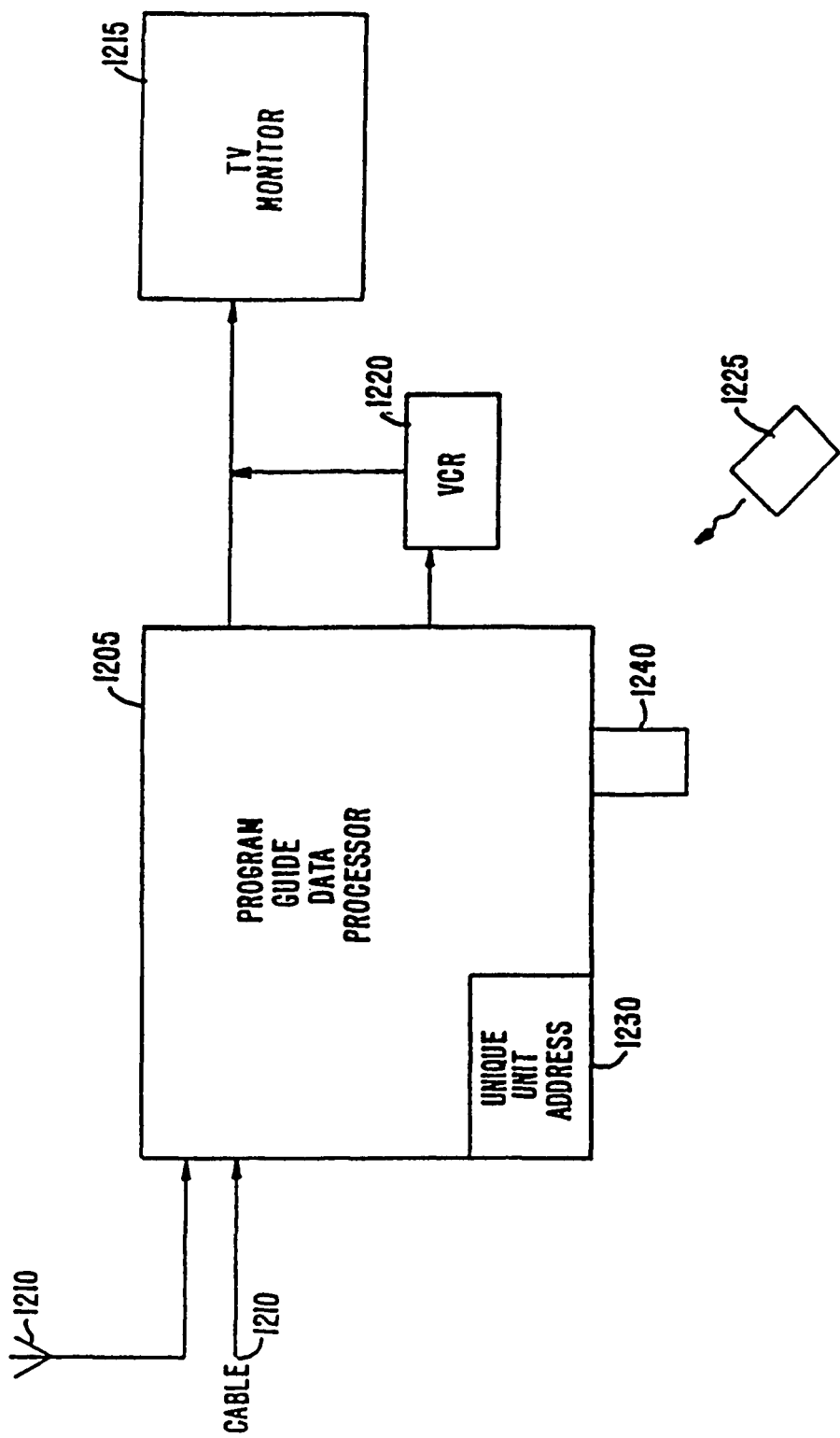
FIG. 12 illustrates the hardware elements of a preferred embodiment of the invention.

FIG. 12 illustrates the hardware elements of one particular embodiment of the invention. As shown, the configuration preferably utilizes a program guide controller 1205 (for example, a data processor), one or more televisions sources 1210, and a TV or computer monitor 1215. These systems may also include a VCR 1220 and a remote control 1225. Program guide system 1205 may be a stand-alone device or it may be incorporated into another system such as a television, a cable decoder, a computer, a PCTV, or a VCR. As shown, program guide system 1205 has a unit address 1230 that is unique to each system. Hence, the system operators may identify system 1205 according to its unique unit address thereby enabling the system operators to send messages to specific users.

Another embodiment of the present invention includes a plug-in program guide controller module 1240. Module 1240 determines the extent of program guide 1205's capabilities. Thus module 1240 may only allow program guide 1205 to provide a non-interactive guide or the guide may not have information icons. When the user wants to upgrade program guide 1205, for example, adding interactive capability, information icons, or more detailed category searching, module 1240 may be replaced with a different module authorizing more extensive guide capabilities. This embodiment has the distinct advantage of allowing the system to be significantly altered without requiring major hardware changes. Since the user upgrades module 1240 to upgrade the guide, the user does not need the system operator to provide technical support. In this scenario the user would merely procure a different module 1240, install the new module into the program guide system 1205, and pay the new fee set by the system operator for the new benefits.

Preferably the system operates under the control of software applications on a renewable computer memory. The memory for the software applications may be located in one or more IC's, for example, the plug-in module of the data processor, or in ROM, RAM, FLASH memory or any combination thereof. Accordingly, the disclosures and descriptions herein are intended to be illustrative, but not limiting, of the scope of the invention which is set forth in the following claims.

What is claimed is:

1. A method for causing an advertisement to be simultaneously displayed with program information, comprising:
    generating for display a plurality of rows in a scrollable program information region for displaying the program information;
    selecting the advertisement from a plurality of advertisements using a processor, wherein at least one website is associated with the advertisement, and wherein the at least one website associated with the advertisement is selected independently from the display of the program information;
    causing the selected advertisement to be displayed in a non-scrollable advertisement region, wherein the non-scrollable advertisement region is displayed simultaneously with the scrollable program information region, wherein the non-scrollable advertisement region is not within the scrollable program information region, and wherein the non-scrollable advertisement region has the same horizontal width as the scrollable program information region;
    receiving user input to navigate a cursor from the scrollable program information region to the non-scrollable advertisement region, wherein navigating the cursor to the advertisement region comprises causing the non-scrollable advertisement region to be highlighted;
    in response to a user selection of the highlighted non-scrollable advertisement region, generating for display at least one link to the at least one website associated with the advertisement; and
    in response to a user selection of the at least one link, accessing the at least one website associated with the advertisement.

2. The method of claim 1, wherein the displayed advertisement has the same vertical height as at least one of the plurality of rows.

3. The method of claim 1, wherein the displayed advertisement includes one or more of graphics and video.

4. The method of claim 1, wherein the displayed advertisement includes a Uniform Resource Locator (URL) or network address.

5. The method of claim 1, wherein the displayed advertisement has the same horizontal width as at least one of the plurality of rows.

6. The method of claim 1, wherein the at least one website comprises at least two websites, the at least two websites associated with the same program.

7. The method of claim 1 wherein accessing the at least one website comprises launching a web browser application and causing the at least one website to be displayed using the web browser application.

8. The method of claim 1 wherein the advertisement is associated with a program and the at least one website is associated with a source from which the program is available.

9. A system for causing an advertisement to be simultaneously displayed with program information, comprising:
    memory to store the program information; and
    control circuitry configured to:
        generate for display a plurality of rows in a scrollable program information region for displaying the program information;
        select the advertisement from a plurality of advertisements, wherein at least one website is associated with the advertisement, and wherein the at least one website associated with the advertisement is selected independently from the display of the program information;
        cause the selected advertisement to be displayed in a non-scrollable advertisement region, wherein the non-scrollable advertisement region is displayed simultaneously with the scrollable program information region, wherein the non-scrollable advertisement region is not within the scrollable program information region, and wherein the non-scrollable advertisement region has the same horizontal width as the scrollable program information region;
        receive user input to navigate a cursor from the scrollable program information region to the non-scrollable advertisement region, wherein navigating the cursor to the advertisement region comprises causing the non-scrollable advertisement region to be highlighted;
        in response to a user selection of the highlighted non-scrollable advertisement region, generate for display at least one link to the at least one website associated with the advertisement; and
        in response to a user selection of the at least one link, access the at least one website associated with the advertisement.

10. The system of claim 9, wherein the displayed advertisement has the same vertical height as at least one of the plurality of rows.

11. The system of claim 9, wherein the displayed advertisement includes one or more of graphics and video.

12. The system of claim 9, wherein the displayed advertisement includes a Uniform Resource Locator (URL) or network address.

13. The system of claim 9, wherein the displayed advertisement has the same horizontal width as at least one of the plurality of rows.

14. The system of claim 9, wherein the at least one website comprises at least two websites, the at least two websites associated with the same program.

15. The system of claim 9 wherein the control circuitry is configured to launch a web browser application and to cause the at least one website to be accessed by the web browser application.

16. The system of claim 9 wherein the advertisement is associated with a program and the at least one website is associated with a source from which the program is available.

17. A method for causing an advertisement to be simultaneously displayed with program information, comprising:
    generating for display a scrollable program information region comprising the program information;
    selecting the advertisement and a website associated with the advertisement from a plurality of advertisements using a processor, wherein the website associated with the advertisement is selected without reference to what programs are identified in the program information;

causing the selected advertisement to be displayed in a non-scrollable advertisement region, wherein the non-scrollable advertisement region is displayed simultaneously with the scrollable program information region, and wherein the non-scrollable advertisement region is not within the scrollable program information region; and in response to a user selection of the non-scrollable advertisement region, accessing a website associated with the advertisement.

18. The method of claim 17, wherein generating for display the scrollable information region comprises generating for display a plurality of rows comprising the program information.

19. The method of claim 18, further comprising receiving user input to navigate a cursor from the scrollable program information region to the non-scrollable advertisement region.

20. The method of claim 17, wherein the displayed advertisement includes one or more of graphics and video.

21. The method of claim 17, wherein accessing the website comprises launching a web browser application and causing the website to be accessed by the web browser application.

22. The method of claim 17, further comprising:

associating the non-scrollable advertisement region with the website, wherein the website is related to the advertisement;

in response to receiving a user selection of the non-scrollable advertisement region before a predetermined length of time, accessing the website related to the advertisement;

selecting a second advertisement from the plurality of advertisements, wherein a second website is related to the second advertisement;

after the predetermined length of time, automatically changing the non-scrollable advertisement region from being associated with the website related to the advertisement to being associated with the second website related to the second advertisement irrespective of changes to the displayed program information;

in response to receiving a user selection of the non-scrollable advertisement region after the predetermined length of time, accessing the second website related to the second advertisement.

23. A system for causing an advertisement to be simultaneously displayed with program information, the system comprising:

memory configured to store the program information;

input circuitry configured to receive a user selection of a non-scrollable advertisement region;

communications circuitry configured to receive information over a communications link; and control circuitry configured to:

retrieve the program information from the memory;

generate for display a scrollable program information region comprising the program information;

select the advertisement and a website associated with the advertisement from a plurality of advertisements, wherein the website associated with the advertisement is selected without reference to what programs are identified in the program information;

cause the selected advertisement to be displayed in the non-scrollable advertisement region, wherein the non-scrollable advertisement region is displayed simultaneously with the scrollable program information region, and wherein the non-scrollable advertisement region is not within the scrollable program information region; and in response to the user selection of the non-scrollable advertisement region received using the input circuitry, access the website associated with the advertisement over the communications link using the communications circuitry.

24. The system of claim 23, wherein the control circuitry is configured to generate for display the scrollable information region by being configured to generate for display a plurality of rows comprising the program information.

25. The method of claim 24, wherein the control circuitry is further configured to receive user input to navigate a cursor from the scrollable program information region to the non-scrollable advertisement region.

26. The system of claim 23, wherein the displayed advertisement includes one or more of graphics and video.

27. The system of claim 23, wherein the control circuitry is configured to access the website by being configured to:

launch a web browser application;

cause the website to be accessed by the web browser application over the communications link using the communications circuitry.

28. The system of claim 23, wherein the control circuitry is further configured to:

associate the non-scrollable advertisement region with the website, wherein the website is related to the advertisement;

in response to receiving a user selection of the non-scrollable advertisement region before a predetermined length of time using the control circuitry, access the website related to the advertisement over the communications link using the communications circuitry;

select a second advertisement from the plurality of advertisements, wherein a second website is related to the second advertisement;

after the predetermined length of time, automatically change the non-scrollable advertisement region from being associated with the website related to the advertisement to being associated with the second website related to the second advertisement irrespective of changes to the displayed program information;

in response to receiving a user selection of the non-scrollable advertisement region after the predetermined length of time using the input circuitry, access the second website related to the second advertisement over the communications link using the communications circuitry.

* * * * *